(12) United States Patent
Kato

(10) Patent No.: US 9,210,374 B2
(45) Date of Patent: Dec. 8, 2015

(54) TRANSMISSION TERMINAL, IMAGE DISPLAY CONTROL METHOD, IMAGE DISPLAY CONTROL PROGRAM, RECORDING MEDIUM, AND TRANSMISSION SYSTEM

(75) Inventor: Yoshinaga Kato, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 105 days.

(21) Appl. No.: 14/113,734

(22) PCT Filed: Apr. 6, 2012

(86) PCT No.: PCT/JP2012/060086
§ 371 (c)(1),
(2), (4) Date: Oct. 24, 2013

(87) PCT Pub. No.: WO2012/147535
PCT Pub. Date: Nov. 1, 2012

(65) Prior Publication Data
US 2014/0043431 A1    Feb. 13, 2014

(30) Foreign Application Priority Data

Apr. 28, 2011  (JP) ................................. 2011-100696
Oct. 31, 2011  (JP) ................................. 2011-238948

(51) Int. Cl.
*H04N 7/14*   (2006.01)
*H04N 7/15*   (2006.01)
(Continued)

(52) U.S. Cl.
CPC .............. *H04N 7/148* (2013.01); *G06F 3/1454* (2013.01); *H04L 12/1827* (2013.01);
(Continued)

(58) Field of Classification Search
CPC ......... H04N 7/147; H04N 7/148; H04N 7/15; H04L 12/1827; G06F 3/1454; G09G 2340/12; G09G 2340/0407; G09G 2340/0442; G09G 2340/0464; G09G 5/14

USPC .............. 345/698, 522; 348/14.12, 441, 445, 348/565, 569, 14.07; 386/232; 709/200; 715/744; 358/1.9, 1.13, 1.15, 1.17, 358/474, 537; 382/173, 209

See application file for complete search history.

(56) References Cited

U.S. PATENT DOCUMENTS 4,670,783 A * 6/1987 Nadan ........................ 348/389.1
6,832,237 B1 * 12/2004 Christensen et al. ......... 709/200
(Continued)

FOREIGN PATENT DOCUMENTS

JP          2002-325239        11/2002
(Continued)

OTHER PUBLICATIONS

International Search Report Issued May 22, 2012 in PCT/JP2012/060086 Filed on Apr. 6, 2012.
(Continued)

*Primary Examiner* — Gerald Gauthier
(74) *Attorney, Agent, or Firm* — Oblon, McClelland, Maier & Neustadt, L.L.P.

(57) ABSTRACT

A transmission terminal is connected to a display apparatus for outputting image data for displaying on the display apparatus, including: a resolution obtaining unit; a resolution determining unit; a resolution selecting unit; an image processing unit which performs a process of adding a segment area to the image data output by the display apparatus after a first resolution is selected by the resolution selecting unit; and a resolution changing unit which changes the resolution of the display apparatus to the resolution selected by the resolution selecting unit. Image data and auxiliary information may be appropriately displayed depending on capabilities of a display connected to a transmission terminal to increase viewability of information necessary for conferencing to ensure displaying of the information.

12 Claims, 44 Drawing Sheets

(51) Int. Cl.
*H04L 12/18* (2006.01)
*G06F 3/14* (2006.01)
*G09G 5/14* (2006.01)

(52) U.S. Cl.
CPC ............. *H04N 7/147* (2013.01); *H04N 7/15* (2013.01); *G09G 5/14* (2013.01); *G09G 2340/0407* (2013.01); *G09G 2340/0442* (2013.01); *G09G 2340/0464* (2013.01); *G09G 2340/12* (2013.01)

(56) References Cited

U.S. PATENT DOCUMENTS

| | | | |
|---|---|---|---|
| 7,113,200 B2 | 9/2006 | Eshkoli | |
| 7,173,666 B1* | 2/2007 | Masaki et al. | 348/445 |
| 7,528,990 B2* | 5/2009 | Lu et al. | 358/1.9 |
| 7,773,810 B2* | 8/2010 | Sakayori et al. | 382/209 |
| 7,899,246 B2* | 3/2011 | Kato et al. | 382/173 |
| 8,174,618 B2* | 5/2012 | Ko et al. | 348/569 |
| 8,243,319 B2* | 8/2012 | Sakuramata et al. | 358/1.17 |
| 8,502,845 B2* | 8/2013 | Kim | 345/698 |
| 8,749,823 B2* | 6/2014 | Kato | 358/1.15 |
| 8,787,728 B2* | 7/2014 | Maruyama et al. | 386/232 |
| 9,077,851 B2* | 7/2015 | Kato et al. | 1/1 |
| 2004/0243940 A1* | 12/2004 | Lee et al. | 715/744 |
| 2005/0259144 A1 | 11/2005 | Eshkoli | |
| 2007/0070473 A1* | 3/2007 | Lu et al. | 358/537 |
| 2007/0115491 A1* | 5/2007 | Kato et al. | 358/1.13 |
| 2008/0055464 A1* | 3/2008 | Shin | 348/441 |
| 2009/0059073 A1* | 3/2009 | Cho et al. | 348/565 |
| 2009/0091578 A1 | 4/2009 | Carnahan et al. | |
| 2009/0251594 A1* | 10/2009 | Hua et al. | 348/441 |
| 2010/0005396 A1 | 1/2010 | Nason et al. | |
| 2010/0046044 A1* | 2/2010 | Ishizu et al. | 358/474 |
| 2010/0066749 A1* | 3/2010 | Mihara et al. | 345/522 |
| 2011/0029606 A1 | 2/2011 | Ozawa | |
| 2011/0072380 A1 | 3/2011 | Jang | |
| 2012/0002003 A1 | 1/2012 | Okita et al. | |
| 2013/0250354 A1* | 9/2013 | Kato et al. | 358/1.15 |
| 2014/0043431 A1* | 2/2014 | Kato | 348/14.12 |
| 2014/0253676 A1* | 9/2014 | Nagase et al. | 348/14.12 |
| 2014/0293000 A1* | 10/2014 | Ujiie et al. | 348/14.07 |
| 2014/0313283 A1* | 10/2014 | Kato | 348/14.12 |
| 2015/0077511 A1* | 3/2015 | Mihara et al. | 348/14.12 |
| 2015/0199946 A1* | 7/2015 | Kato | 348/14.07 |

FOREIGN PATENT DOCUMENTS

| | | |
|---|---|---|
| JP | 2005-341571 | 12/2005 |
| JP | 2007-114402 | 5/2007 |
| JP | 2008-263636 | 10/2008 |
| JP | 2008-310443 | 12/2008 |
| JP | 2009-021821 | 1/2009 |
| JP | 2009-260818 | 11/2009 |
| JP | 2012-075073 | 4/2012 |

OTHER PUBLICATIONS

Extended European Search Report issued on Oct. 8, 2014, in European Patent Application No. 12777185.5.

Office Action issued on Apr. 30, 2015 in Canadian Patent Application No. 2,834,135.

* cited by examiner

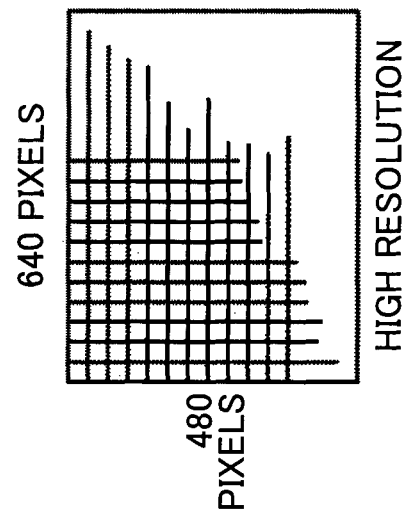
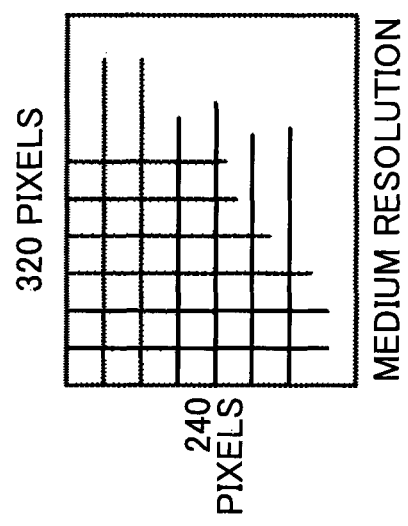
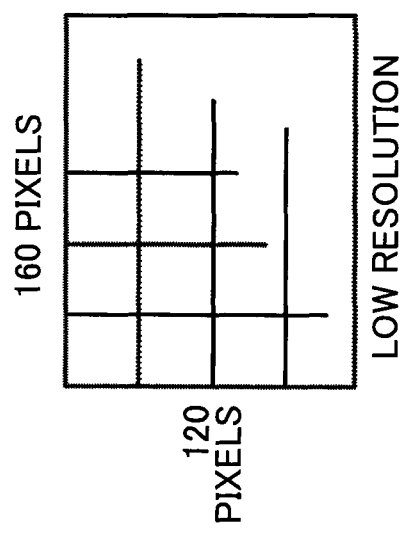
FIG.6C HIGH RESOLUTION
FIG.6B MEDIUM RESOLUTION
FIG.6A LOW RESOLUTION

FIG.7

CHANGED QUALITY MANAGEMENT TABLE

| IP ADDRESS OF RELAY DESTINATION TERMINAL | IMAGE QUALITY OF IMAGE DATA RELAYED (QUALITY OF IMAGE) |
|---|---|
| 1.3.2.4 | HIGH QUALITY |
| 1.3.1.3 | LOW QUALITY |
| 1.3.4.3 | MEDIUM QUALITY |
| ... | ... |

FIG.8

RELAY APPARATUS MANAGEMENT TABLE

| RELAY APPARATUS ID | OPERATING STATE | RECEIVED DATE/TIME | IP ADDRESS OF RELAY APPARATUS | MAXIMUM DATA TRANSMISSION SPEED (Mbps) |
|---|---|---|---|---|
| 111a | ON LINE | 2009.11.10.13:00 | 1.2.1.2 | 100 |
| 111b | ON LINE | 2009.11.10.13:10 | 1.2.2.2 | 1000 |
| 111c | OFF LINE | 2009.11.10.13:20 | 1.3.1.2 | 100 |
| 111d | ON LINE | 2009.11.10.13:30 | 1.3.2.2 | 10 |

FIG.9

TERMINAL AUTHENTICATION
MANAGEMENT TABLE

| TERMINAL ID | PASSWORD |
|---|---|
| 01aa | aaaa |
| 01ab | abab |
| 01ba | baba |
| ... | ... |

FIG.10

TERMINAL MANAGEMENT TABLE

| TERMINAL ID | OPERATING STATE | RECEIVED DATE/TIME | IP ADDRESS OF TERMINAL |
|---|---|---|---|
| 01aa | ON LINE | 2009.11.10.13:40 | 1.2.1.3 |
| 01ab | OFF LINE | 2009.11.09.12:00 | 1.2.1.4 |
| 01ba | ON LINE | 2009.11.10.13:45 | 1.2.2.3 |
| ... | ... | ... | ... |
| 01db | ON LINE | 2009.11.10.13:50 | 1.3.2.4 |

FIG.11

DESTINATION LIST MANAGEMENT TABLE

| REQUEST-ORIGINATING TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.12

SESSION MANAGEMENT TABLE

| SESSION ID FOR SELECTION | RELAY APPARATUS ID | REQUEST-ORIGINATING TERMINAL ID | DESTINATION TERMINAL ID | DELAY TIME (ms) | DELAY INFORMATION RECEIVED DATE/TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.13

ADDRESS PRIORITY MANAGEMENT TABLE

| SAME/DIFFERENT PORTIONS OF DOT ADDRESS | ADDRESS PRIORITY |
|---|---|
| SAME. SAME. SAME. DIFFERENT | 5 |
| SAME. SAME. DIFFERENT.- | 3 |
| SAME. DIFFERENT.-.- | 1 |
| DIFFERENT.-.-.- | 0 |

FIG.14

TRANSMISSION SPEED PRIORITY MANAGEMENT TABLE

| MAXIMUM DATA TRANSMISSION SPEED (Mbps) AT RELAY APPARATUS | TRANSMISSION SPEED PRIORITY |
|---|---|
| 1000~ | 5 |
| 100~1000 | 3 |
| 10~100 | 1 |
| ~10 | 0 |

FIG.15

QUALITY MANAGEMENT TABLE

| DELAY TIME (ms) | IMAGE QUALITY OF IMAGE DATA (QUALITY OF IMAGE) |
|---|---|
| 0~100 | HIGH IMAGE QUALITY |
| 100~300 | MEDIUM IMAGE QUALITY |
| 300~500 | LOW IMAGE QUALITY |
| 500~ | (HALF) |

FIG.20

| RELAY APPARATUS ID | ADDRESS PRIORITY | | TRANSMISSION SPEED PRIORITY POINT | COMBINED POINT |
|---|---|---|---|---|
| | POINT FOR TERMINAL 10aa | POINT FOR TERMINAL 10bd | | |
| 111a | 5 | 1 | 3 | 8 |
| 111b | 3 | 1 | 5 | 8 |
| 111c | – | – | – | – |
| 111d | 1 | 5 | 1 | 6 |

FIG.30

| CURRENTLY DISPLAYED RESOLUTION | : | width: 1280 height: 720 (16:9 RATIO) |
|---|---|---|
| DISPLAYABLE RESOLUTIONS | : | width: 640 height: 480 ( 4:3 RATIO)<br>width: 800 height: 600 ( 4:3 RATIO)<br>width: 1024 height: 768 ( 4:3 RATIO)<br>width: 1152 height: 864 ( 4:3 RATIO)<br>width: 1280 height: 720 (16:9 RATIO)<br>width: 1280 height: 768 ( 5:3 RATIO)<br>width: 1280 height: 800 ( 8:5 RATIO) |
| overlap FLAG | : | false |
| SEGMENT POSITION | : | — |
| AUXILIARY INFORMATION DISPLAY POSITION | : | — |
| DISPLAY CONTENTS | : | ... |

FIG.36

| ITEM NAME | RESOLUTION | overlap | SEGMENT VALUE |
|---|---|---|---|
| resolution1 | width:1280, height:800 | false | width:1280, height:80, position: lower |
| resolution2 | width:1280, height:720 | true | NA |
| resolution3 | width:1024, height:768 | false | width:1024, height:96, position: both |

FIG.37

| ITEM NAME | RESOLUTION | overlap | SEGMENT VALUE |
|---|---|---|---|
| resolution1 | width:1280, height:800 | false | width:1280, height:80, position: lower |
| resolution2 | width:1024, height:768 | false | width:1024, height:96, position: both |
| resolution3 | width:1280, height:720 | true | NA |

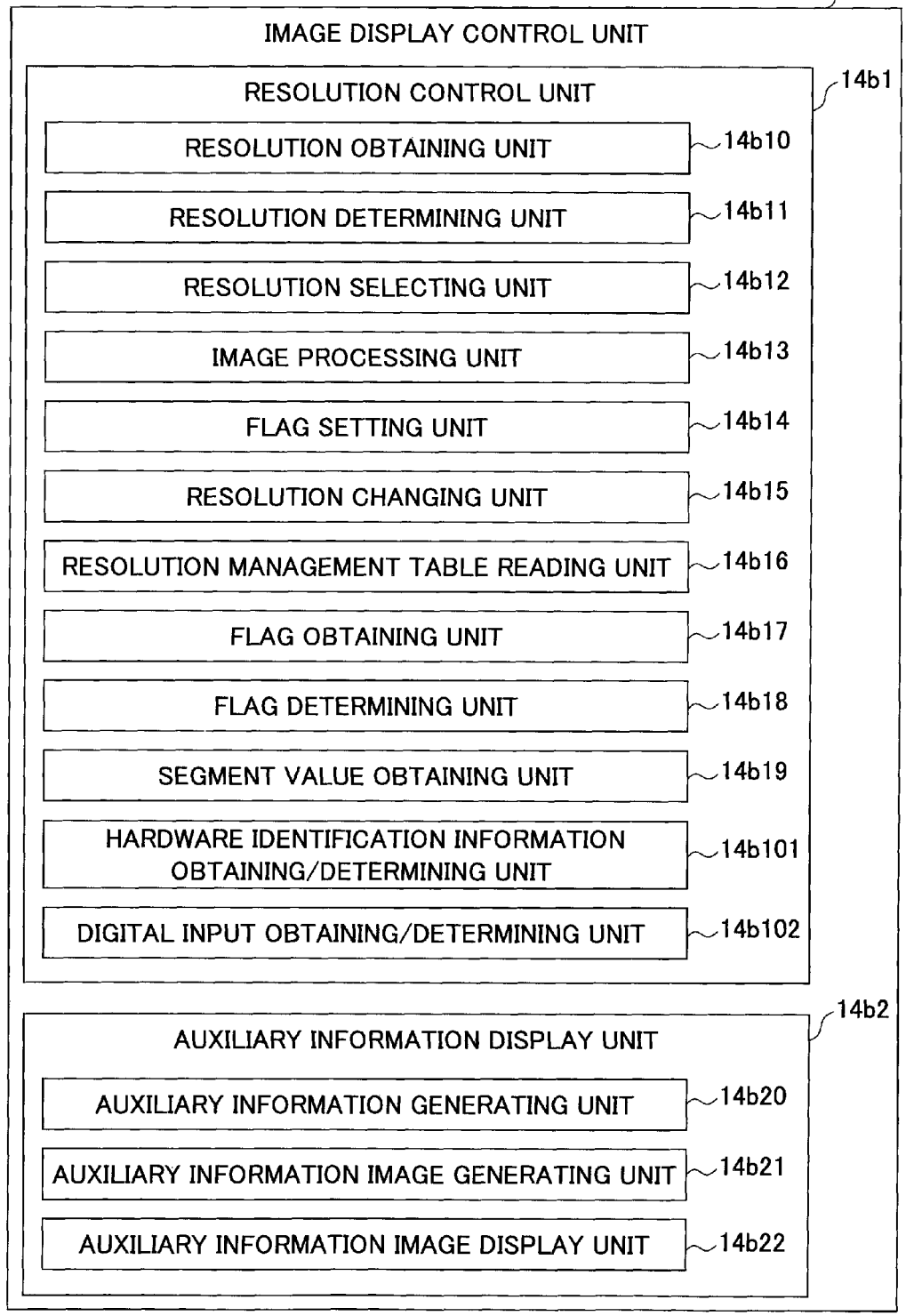

FIG.40

| | |
|---|---|
| CURRENTLY DISPLAYED RESOLUTION : | width:1280 height:720(16:9 RATIO) |
| DISPLAYABLE RESOLUTIONS : | width: 640 height:480( 4:3 RATIO)<br>width: 800 height:600( 4:3 RATIO)<br>width:1024 height:768( 4:3 RATIO)<br>width:1152 height:864( 4:3 RATIO)<br>width:1280 height:720(16:9 RATIO)<br>width:1280 height:768( 5:3 RATIO)<br>width:1280 height:800( 8:5 RATIO) |
| overlap FLAG : | false |
| SEGMENT POSITION : | — |
| AUXILIARY INFORMATION DISPLAY POSITION : | — |
| DISPLAY CONTENTS : | — |
| DIGITAL INPUT (digital) : | true |
| RECOMMENDED RESOLUTION : | width:1280 height:720(16:9 RATIO) |
| HARDWARE IDENTIFICATION INFORMATION : | TV |
| ... | |

TRANSMISSION TERMINAL, IMAGE DISPLAY CONTROL METHOD, IMAGE DISPLAY CONTROL PROGRAM, RECORDING MEDIUM, AND TRANSMISSION SYSTEM

TECHNICAL FIELD

The present invention relates to a transmission terminal which transmits and receives data of a screen to be shared with other transmission terminals and outputs image data to a display apparatus so as to display the image data thereon.

BACKGROUND ART

In recent years, a remote conferencing system for conducting a remote conference with a remote location via a communications network such as the Internet has been prevalent.

With this type of remote conferencing system, in a meeting room with one of parties such as a participant involved in the remote conference, an image of the meeting room is shot and a voice such as a speech of the party in the conference is collected using a transmission terminal (a terminal apparatus) of the remote conferencing system, and the image and the voice are converted into digital data so as to be transmitted to a transmission terminal of a counterpart, the image data is displayed on a display (a display apparatus) and the voice data is output with a speaker of a meeting room of the counterpart, so that the conference between remote locations is carried out in a condition close to a real non-remote conference.

Now, there are increasing sales of the transmission terminal for this type of remote conferencing system in combination with the display as well as sales of only the transmission terminal as a single unit. Therefore, it has recently become possible to connect the display having various resolutions to the transmission terminal.

However, this type of transmission terminal is designed to have a fixed value such as a resolution of image data transmitted and received with other transmission terminals of a width of 1280 pixels and a height of 720 pixels (an aspect ratio of 16:9), so that there may occur inconvenience with displaying depending on the resolution of the display connected.

More specifically, there is a problem that, for displaying directly on the display with the resolution of image data left as it is, when the resolution in a width direction or a height direction is higher than a designed value, a portion of an image in (either one or both of) directions of the higher resolution is displayed as being chipped off, and an area to be displayed in the first place cannot be displayed, leading to reduced viewability. In particular, contents displayed by recent transmission terminals include displaying of auxiliary information such as an operating menu and an error message besides the image of the meeting room; there is a problem that, in the event an area displaying such auxiliary information is chipped off, the user cannot operate the transmission terminal or the user cannot determine a cause of an error.

Moreover, for displaying directly on the display with the resolution of the image data left as it is, there is a problem that, when the resolution in the width direction or the height direction is lower than the designed value, a blank area appears on which no image is displayed at one end or both ends of the image in (either one or both of) directions with the lower resolution, so that a screen is not effectively utilized.

Furthermore, there is a problem that, when the whole image is displayed and displaying is made such that the image is symmetrically reduced/enlarged such that at least one of the width direction or the height direction fits to a full size, if an aspect ratio differs from the designed value, a blank area appears in which no image is displayed at one end or both ends of the image in either the width direction or the height direction, so that the screen is not effectively utilized in a manner similar to what is described above.

Moreover, if the aspect ratio differs from the designed value, when the image is non-symmetrically reduced such that both the width direction and the height direction fit to the full size, the image is distorted, leading to reduced viewability.

On the other hand, Patent document 1 discloses a method of changing an aspect ratio of an image from 16:9 to 4:3 for the purpose of preparing an image for video conferencing. However, the disclosed method can only deal with a fixed case such that the aspect ratio of an input image is 16:9 and an aspect ratio of a display is 4:3, so that the above-described problem cannot be solved.

Moreover, Patent document 2 discloses one terminal receiving display capability information of another terminal, and the one terminal referring to the display capability information to convert an application data set of the one terminal to a display resolution of another terminal for the purpose of displaying a shared screen in real time in a data conferencing system. However, it does not take into account displaying of an operating menu, or distortion of displaying, so that the above-described problem may not be solved therewith.

PATENT DOCUMENTS

Patent Document 1 JP2005-341571A
Patent Document 2 JP2002-325239A

SUMMARY OF THE INVENTION

Means for Solving the Problems

In light of the problems as described above, an object of the present invention is to appropriately display image data and auxiliary information depending on capabilities of a display connected to a transmission terminal to increase viewability of information necessary for conferencing, etc., to ensure displaying of the information.

In order to solve the problem as described above, the present invention provides a transmission terminal which is connected to a display apparatus for outputting image data for displaying on the display apparatus, including a resolution obtaining unit which obtains one or more resolutions displayable by the display apparatus; a resolution determining unit which determines whether the obtained resolutions displayable include a resolution other than a standard aspect ratio used in transmitting the image data; a resolution selecting unit which selects a first resolution other than the standard aspect ratio out of the resolutions displayable if the resolution determining unit determines that the resolution other than the standard aspect ratio is included and selects a second resolution of the standard aspect ratio out of the resolutions displayable if the resolution determining unit determines that the resolution other than the standard aspect ratio is not included; an image processing unit which performs a process of adding a segment area to the image data output by the display apparatus after the first resolution is selected by the resolution selecting unit; and a resolution changing unit which changes the resolution of the display apparatus to the resolution selected by the resolution selecting unit.

Moreover, a transmission terminal which is connected to a display apparatus for outputting image data for displaying on the display apparatus is provided, including a first resolution obtaining unit which obtains one or more resolutions displayable by the display apparatus; a resolution management table reading unit which successively reads, from a resolution management table which includes one or more data lines, the one data line, which data line includes at least a resolution and an overlap flag as elements; a second resolution obtaining unit which obtains the resolution from the read data line; a resolution determining unit which determines whether the resolutions displayable which are obtained by the first resolution obtaining unit include the resolution obtained by the second resolution obtaining unit; a flag obtaining unit which obtains the overlap flag from the read data line if the resolution determining unit determines that the resolution obtained by the second resolution obtaining unit is included; an image processing unit which performs a process of adding a segment area to the image data output on the display apparatus when the overlap flag obtained from the flag obtaining unit is false; and a resolution changing unit which changes the resolution of the display apparatus to the resolution obtained by the second resolution obtaining unit.

According to the present invention, image data and auxiliary information may be appropriately displayed depending on capabilities of a display connected to a transmission terminal to increase viewability of information necessary for conferencing, etc., to ensure displaying of the information.

BRIEF DESCRIPTION OF THE DRAWINGS

FIGS. 6A, 6B, and 6C are conceptual diagrams which explain image quality of image data;

FIG. 7 is a conceptual diagram showing a change quality management table;

FIG. 8 is a conceptual diagram showing a relay apparatus management table;

FIG. 9 is a conceptual diagram showing a terminal authentication management table;

FIG. 10 is a conceptual diagram showing a terminal management table;

FIG. 11 is a conceptual diagram showing a destination list management table;

FIG. 12 is a conceptual diagram showing a session management table;

FIG. 13 is a conceptual diagram showing an address priority management table;

FIG. 14 is a conceptual diagram showing a transmission speed priority management table;

FIG. 15 is a conceptual diagram showing a quality management table;

FIG. 20 is a diagram showing a state of computing a priority point for narrowing down the relay apparatuses;

FIG. 30 is a diagram showing exemplary data used for display control;

FIG. 36 is a diagram illustrating an example of a resolution management table;

FIG. 37 is a diagram illustrating another example of the resolution management table;

FIG. 39 is a diagram illustrating another exemplary configuration of the image display control unit;

FIG. 40 is a diagram illustrating exemplary data used in a further exemplary process of the resolution control.

DESCRIPTION OF THE REFERENCE NUMERALS

Figure 1:
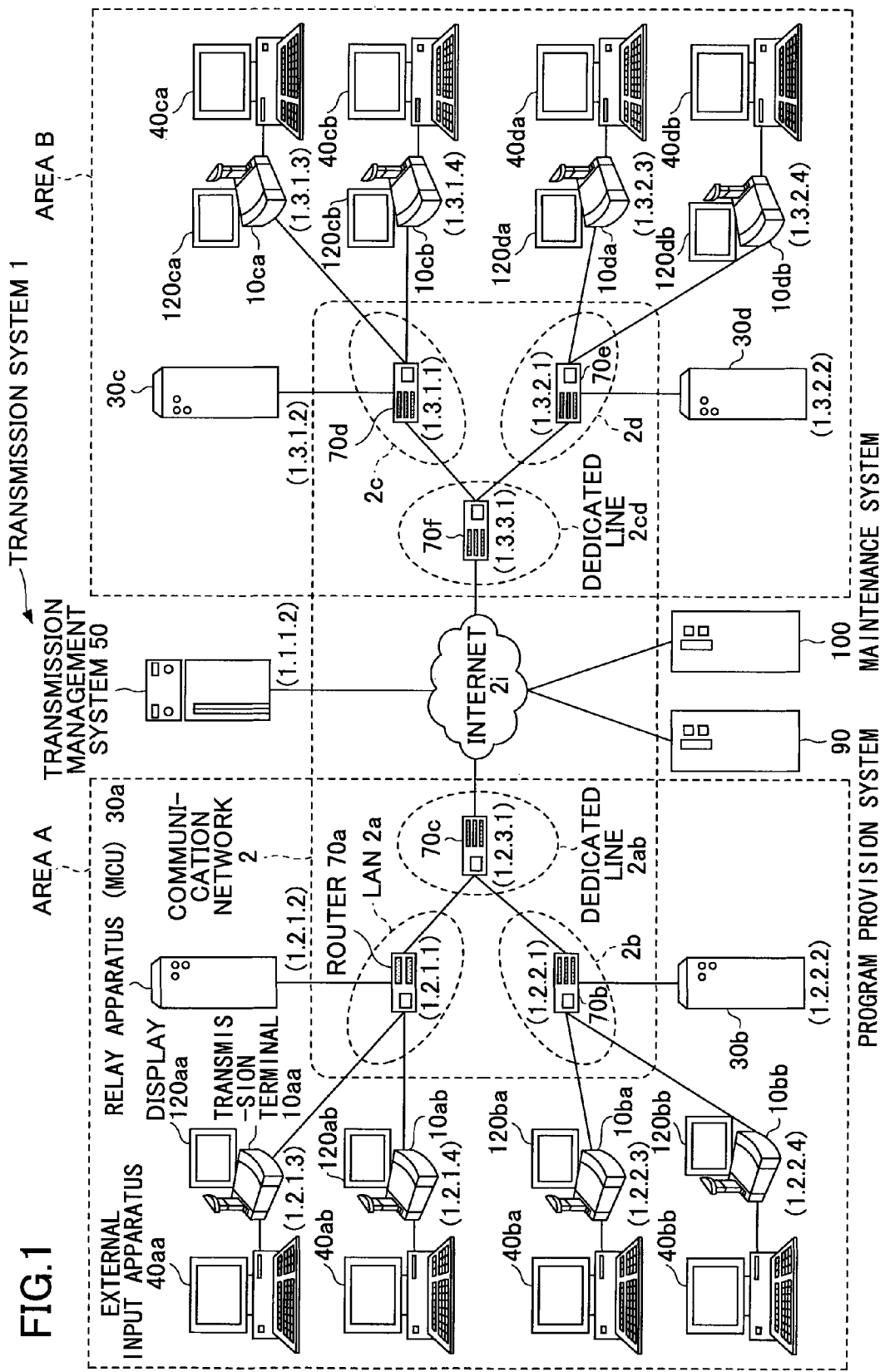
FIG. 1 is a schematic diagram of a transmission system according to an embodiment of the present invention.

1 Transmission system
10 Transmission terminal
11 Transmitting and receiving unit (an example of display data transmitting unit)
12 Operating input accepting unit
13 Log-in requesting unit
14a Imaging unit 14*b* Image display control unit
14*b*1 Resolution control unit
14*b*10 Resolution obtaining unit
14*b*11 Resolution determining unit
14*b*12 Resolution selecting unit
14*b*13 Image processing unit
14*b*14 Flag setting unit
14*b*15 Resolution changing unit
14*b*16 Resolution management table reading unit
14*b*17 Flag obtaining unit
14*b*18 Flag determining unit
14*b*19 Segment value obtaining unit
14*b*101 Hardware identification information obtaining/determining unit
14*b*102 Digital input value obtaining/determining unit
14*b*2 Auxiliary information display unit
14*b*20 Auxiliary information generating unit
14*b*21 Auxiliary information image generating unit
14*b*22 Auxiliary information image display unit
15*a* Voice input unit
15*b* Voice output unit
16 Selection processing unit
16*a* Measuring unit
16*b* Calculating unit
16*c* Selecting unit
17 Delay detecting unit
18 External information transmitting and receiving unit (an example of display data receiving unit)
19 Storing and reading processing unit
20 Detecting unit
30 Relay apparatus
31 Transmitting and receiving unit
32 State detecting unit
33 Data quality checking unit
34 Change quality managing unit
35 Data quality changing unit
40 External input apparatus
41 Transmitting and receiving unit
42 Connection detecting unit
43 Installation determining unit
44 Program obtaining unit
451 Display data obtaining unit
452 Display data transmitting unit
46 Operating input accepting unit
47 Display control unit
48 Mounting unit
49 Storing and reading processing unit
50 Transmission management system
51 Transmitting and receiving unit
52 Terminal authenticating unit
53 State managing unit
54 Terminal extracting unit
55 Terminal state obtaining unit
56 Narrowing down unit
56*a* Unit for generating session ID for selection
56*b* Terminal IP address extracting unit
56*c* Selecting unit
56*d* Priority determining unit
57 Session managing unit
58 Quality determining unit
60 Delay time managing unit
100 Maintenance system
120 Display
400 Display apparatus
1000 Storage unit (an example of destination information storage unit)
3000 Storage unit
3001 Change quality management DB
4000 Storage unit
4001 Document management DB
5000 Storage unit
5001 Relay apparatus management DB
5002 Terminal authentication management DB
5003 Terminal management DB
5004 Destination list management DB
5005 Session management DB
5006 Priority management DB
5007 Quality management DB

MODE FOR CARRYING OUT THE INVENTION

Overall Configuration of an Embodiment

Below, one embodiment of the present invention is described using FIGS. 1 to 38. First, FIG. 1, which is a schematic diagram of a transmission system 1 according to one embodiment of the present invention, is used to provide an overview of the present embodiment.

Moreover, a transmission system includes a data provision system which transmits contents data in one direction from one transmission terminal to another transmission terminal via a transmission management system and a communication system which mutually communicates information, emotion, etc., among multiple transmission terminals via the transmission management system. This communication system, which is a system for mutually transmitting information, emotion, etc., among multiple communication terminals (corresponding to "the transmission terminals") via a communication management system (corresponding to "the transmission management system"), includes, as examples, a teleconferencing system or video conferencing system, a video telephone system, a voice telephone system, a shared PC (personal computer) screen system, etc.

In the present embodiment, a transmission system, a transmission management system, and a transmission terminal are described, envisioning a teleconferencing or video conferencing system as one example of a communication system, a teleconference or video conference management system as one example of a communication management system, and a teleconferencing or video conferencing terminal as one example of a communications terminal. In other words, the transmission terminal and the transmission management system of the present invention are applied not only to the teleconferencing or video conferencing system, but also to the communication system or the transmission system.

The transmission system 1 shown in FIG. 1 is configured with multiple transmission terminals (10*aa*, 10*ab*, . . . , 10*db*); displays (120*aa*, 120*ab*, . . . , 120*db*) for the respective transmission terminals (10*aa*, 10*ab*, . . . , 10*db*); multiple relay apparatuses (30*a*, 30*b*, 30*c*, 30*d*); a transmission management system 50; a program provision system 90; and a maintenance system 100.

In the present embodiment, "a transmission terminal 10" is used when referring to an arbitrary transmission terminal of the transmission terminals (10*aa*, 10*ab*, . . . , 10*db*); "a display 120" is used when referring to an arbitrary display of the displays (120*aa*, 120*ab*, . . . , 120*db*); and "a relay apparatus 30" is used when referring to an arbitrary relay apparatus of the relay apparatuses (30*a*, 30*b*, 30*c*, 30*d*).

The transmission terminal 10 transmits and receives image data and voice data, etc., with another transmission terminal 10. An image of the image data, which is described for a moving image in the present embodiment, may be not only the moving image but also a still image. Moreover, the image of the image data may include both the moving image and the still image. The relay apparatus 30 relays the image data and the voice data, etc., with multiple transmission terminals 10. The transmission management system 50 unitarily manages the transmission terminal 10 and the relay apparatus 30.

The external input apparatus 40, which is connected to the transmission terminal 10, transmits, to the transmission terminal 10, display data for displaying document data. The document data here refers, for example, to data utilized using document creation software, spreadsheet software, presentation software, etc.

Moreover, multiple routers (70a, 70b, . . . , 70f) shown in FIG. 1 select optimal routes for the image data and the voice data. In the present embodiment, "a router 70" is used when indicating an arbitrary router of the routers (70a, 70b, . . . , 70f). The program provision system 90, which has a HD (hard disk; not shown), the HD having stored thereon a program for a transmission terminal that is for causing the transmission terminal 10 to embody various functions or units, may transmit, to the transmission terminal 10, the program for the transmission terminal. Moreover, the HD of the program provision system 90, which has also stored thereon, a program for the relay apparatus that is for causing the relay apparatus 30 to embody various functions or various units, may transmit the program for the relay apparatus to the relay apparatus 30. Furthermore, the HD of the program provision system 90, which has also stored thereon, a program for transmission management that is for causing the transmission management system 50 to embody various functions or various units, may transmit the program for the transmission management to the transmission management system 50.

Furthermore, the transmission terminal 10aa, the transmission terminal 10ab, the relay apparatus 30a, and the router 70a are communicatively connected via a LAN 2a. The transmission terminal 10ba, the transmission terminal 10bb, the relay apparatus 30b, and the router 70b are communicatively connected via a LAN 2b. Moreover, the LAN 2a and the LAN 2b, which are communicatively connected via a dedicated line 2ab including the router 70c, are configured within a predetermined area A. For example, the area A is Japan, the LAN 2a is configured within a Tokyo office, and the LAN 2b is configured within an Osaka office.

On the other hand, the transmission terminal 10ca, the transmission terminal 10cb, the relay apparatus 30c, and the router 70d are communicatively connected via a LAN 2c. The transmission terminal 10da, the transmission terminal 10db, the relay apparatus 30d, and the router 70e are communicatively connected via a LAN 2d. Moreover, the LAN 2c and the LAN 2d, which are communicably connected configured within a predetermined area B. For example, the area B is the United States, the LAN 2c is configured within a New York office, and the LAN 2d is configured within a Washington D.C. office. The respective areas A and B are communicatively connected by the routers 70c and 70f to an Internet 2i.

Moreover, the transmission management system 50 and the program provision system 90 are communicatively connected to the transmission terminal 10 and the relay apparatus 30 via the Internet 2i. The transmission management system 50 and the program provision system 90 may be installed in the area A or the area B, or in an area other than these areas.

In the present embodiment, the communications network 2 is configured with the LAN 2a, the LAN 2b, the dedicated line 2ab, the Internet 2i, the dedicated line 2cd, the LAN 2c, and the LAN 2d.

Moreover, in FIG. 1, a set of four numbers shown under the respective transmission terminals 10, the respective relay apparatuses 30, the transmission management system 50, the respective routers 70, and the program provision system 90 shows, in a simplified manner, an IP address in a nominal IPv4 format. For example, the IP address of the transmission terminal 10a is "1.2.1.3". Moreover, IPv6 may be used in lieu of IPv4; however, for brevity of explanations, IPv4 is used.

Hardware Configuration of Embodiment

Next, a hardware configuration of the present embodiment is described.

Figure 2:
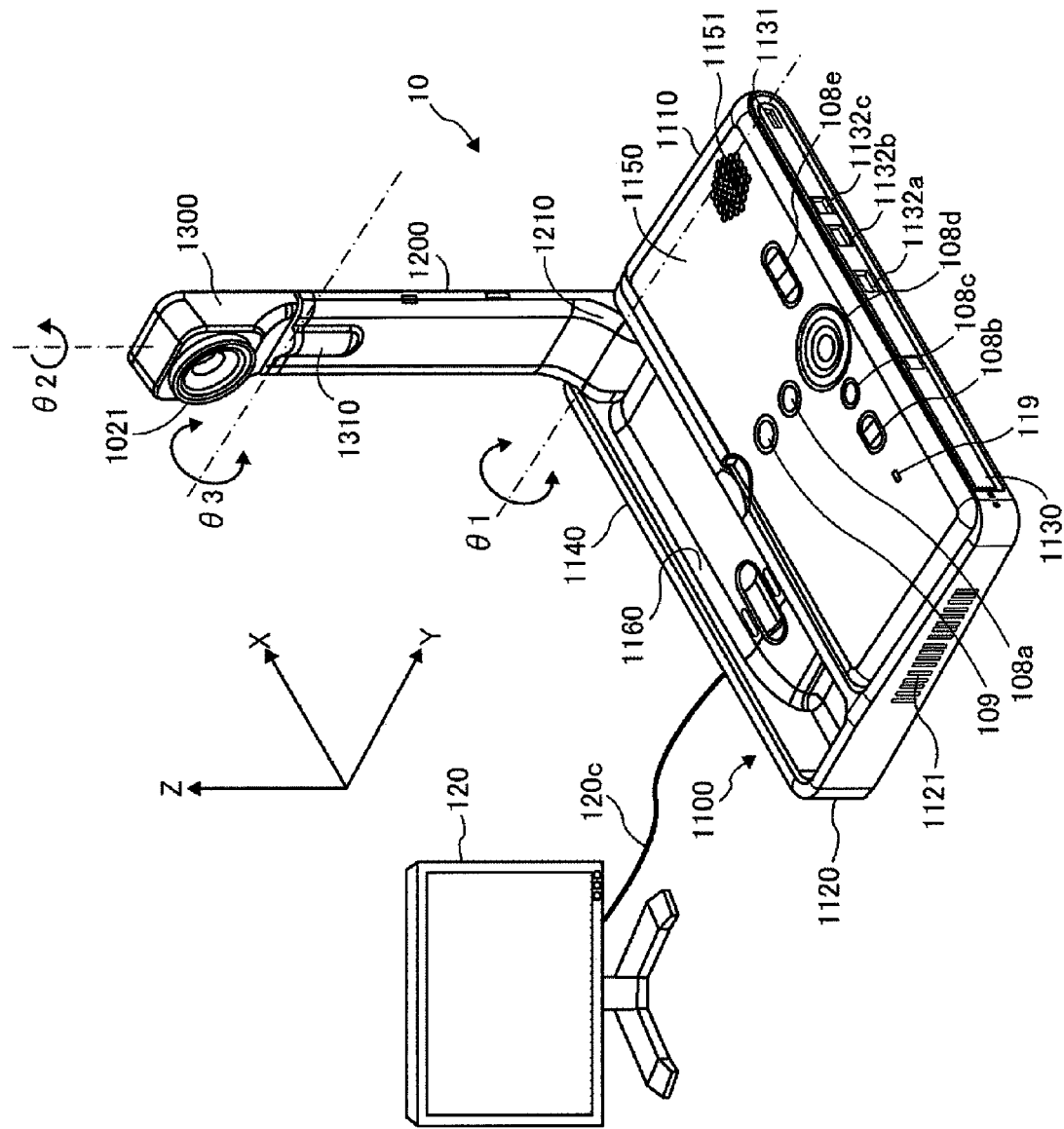
FIG. 2 is an external view of a transmission terminal according to the present embodiment.

FIG. 2 is an external view of a transmission terminal according to the present embodiment. Below explanations are given with a longitudinal direction of the transmission terminal 10 as an X-axis direction; a direction orthogonal to the X-axis direction within a horizontal plane as a Y-axis direction; and a direction (a vertical direction) orthogonal to the X-axis and Y-axis directions as a Z-axis direction.

As shown in FIG. 2, the transmission terminal 10 includes a housing 1100, an arm 1200, and a camera housing 1300. Of these, an air intake face (not shown), which is formed with multiple air intake holes, is provided at a front side wall face 1110 of the housing 1100; and an air exhaust face 1121, which is formed with multiple air exhaust holes, is provided at a back side wall face 1120 of the housing 1100. In this way, a cooling fan embedded in the housing 1100 may be driven to take in outer air in the back of the transmission terminal 10 via the air intake face (not shown), and to exhaust air to the back of the transmission terminal 10 via the air exhaust face 1121. On a right side wall face 1130 of the housing 1100 is formed a sound collecting hole 1131, making it possible to collect, with a below-described embedded microphone 114, sounds such as a voice, a sound, a noise, etc.

On the right side wall face 1130 side of the housing 1100 are formed an operating panel 1150. On this operating panel 1150 are formed below-described multiple operating buttons (108a-108e), a below-described power switch 109, and a below-described alarm lamp 119; and is formed a sound output face 1151, which is formed with multiple voice output holes for passing an output sound from a below-described embedded speaker 115. Moreover, on the left side wall face 1140 side of the housing 1100 is formed a housing unit 1160 as a concave portion that is for housing the arm 1200 and the camera housing 1300. On the right side wall face 1130 side of the housing 1100 are provided multiple connecting ports (1132a-1132c) for electrically connecting a cable to a below-described external equipment connection I/F 118. On the other hand, on the left side wall face 1140 of the housing 1100 is provided a connecting port (not shown) for electrically connecting a cable 120c for the display 120 to the below-described external equipment connection I/F 118.

Below, for explanations below, "an operating button 108" is used when indicating an arbitrary operating button of the operating buttons (108e-108e), while "a connecting port 1132" is used when indicating an arbitrary connecting port of the connecting ports (1132a-1132c)

Next, an arm 1200, which is mounted on the housing 1100 via a torque hinge 1210, is configured such that it can rotate in upward and downward directions within a range of a tilt angle θ1 of 135 degrees relative to the housing 1100. FIG. 2 shows that the tilt angle θ1 is 90 degrees.

The camera housing 1300, which is provided with an embedded camera 1021, may image a user, documents, a room, etc. Moreover, the camera housing 1300 has formed a torque hinge 1310. The camera housing 1300 is mounted on the arm 1200 via the torque hinge 1310. Then, the camera housing 1300, which is mounted on the arm 1200 via the torque hinge 1310, is configured such that it can rotate in upward and downward and left and right directions within a range of a tilt angle θ3 of ±45 degrees and within a range of a pan angle θ2 of ±180 degrees with the state shown in FIG. 2 as 0 degrees.

An external view of the relay apparatus 30, the management system 50, and the program provision system 90 is the same as that of a general-purpose server computer, so that repeated explanations of the external view are omitted.

Figure 3:
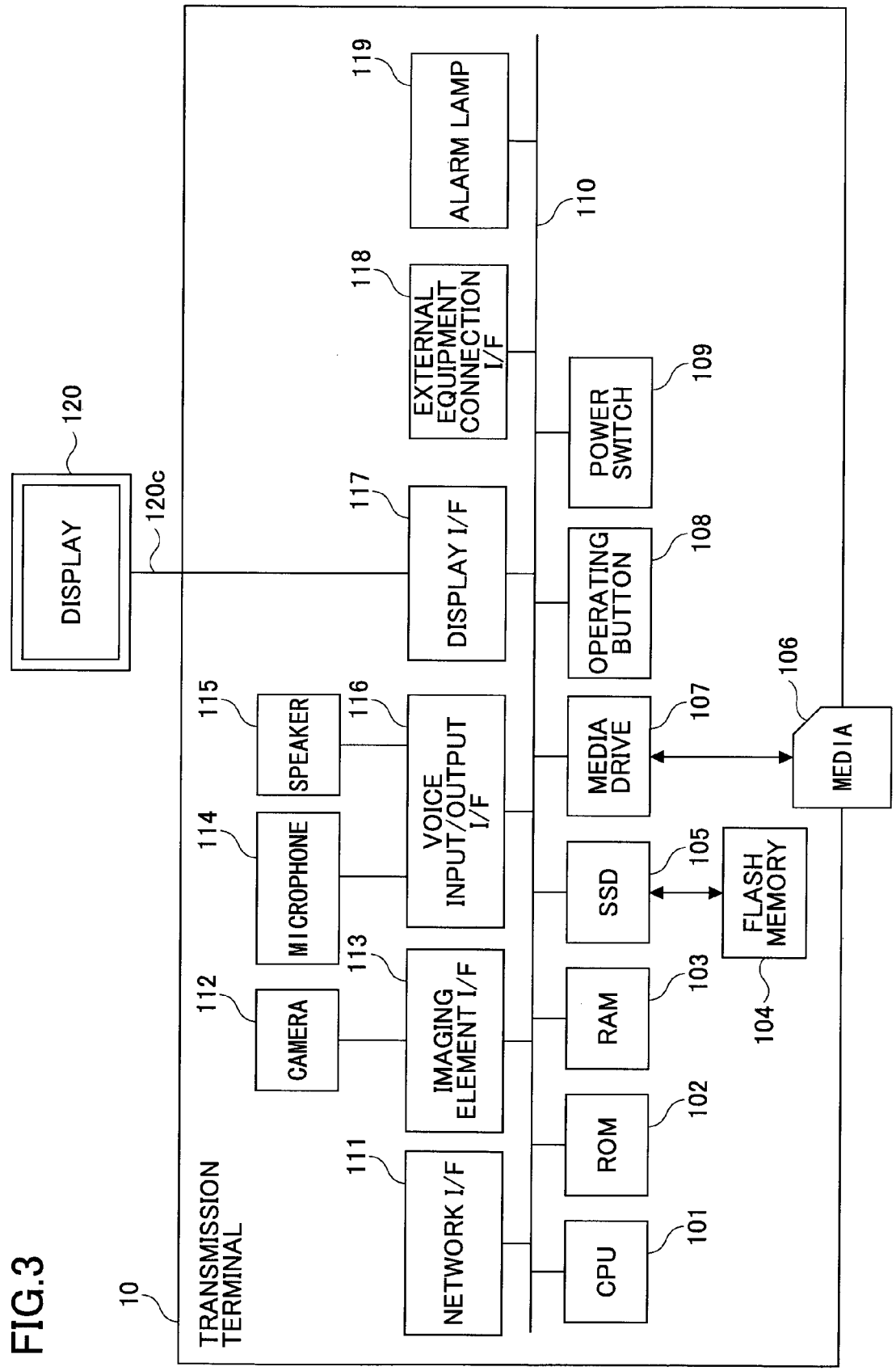
FIG. 3 is a hardware block diagram of the transmission terminal according to the embodiment of the present invention.

FIG. 3 is a hardware block diagram of the transmission terminal 10 according to an embodiment of the present invention. As shown in FIG. 3, the transmission terminal 10 of the present embodiment includes a CPU (central processing unit) 101, which controls an operation of the whole transmission terminal 10; a ROM (read only memory) 102, which has stored thereon a program for a transmission terminal; a RAM (random access memory) 103, which is used as a work area of the CPU 101; a flash memory 104, which stores various data sets such as the image data, the voice data, etc.; a SSD (solid state drive) 105, which controls reading or writing of various data with the flash memory 104 according to control by the CPU 101; a media drive 107, which controls reading or writing (storing) of data with a recording medium 106 such as a flash memory, etc.; an operating button 108, which is operated when selecting a destination of the transmission terminal 10; a power switch 109 for switching ON/OFF power of the transmission terminal 10; a network I/F 111 for conducting data transmission using the below-described communications network 2; a CCD (charged coupled device) 112, which, in accordance with control by the CPU 101, images a subject and obtains the image data; an imaging element I/F 113, which controls driving of the camera 112; a microphone 114, into which a voice is input; a loudspeaker 115, from which the voice is output; a voice input and output I/F 116 which processes input and output of a voice signal with the microphone 114 and the loudspeaker 115 in accordance with control by the CPU 101; a display I/F 117, which transmits image data to an externally-attached display 120 in accordance with the CPU 101; an external apparatus I/F 118, which transmits and receives various data sets with an external apparatus; an alarm lamp 119, which signals failures of various functions of the terminal 10; and a bus line 110, such as an address bus, a data bus, etc., for electrically connecting the above-described respective elements as shown in FIG. 3.

A display 120 is a display unit which is configured with organic EL or liquid crystal to display an operating icon, an image of a subject, etc. Moreover, the display 120 is connected to the display I/F 117 with a cable 120c. The cable 120c may be a cable for an analog RGB (VGA) signal, a cable for a component video, or a cable for a HDMI (high-definition multimedia interface) or a cable for DVI (digital video interactive) signal.

The camera 112 includes a lens and a fixed imaging element which converts light to electric charges to digitize an image (a video) of a subject; as the fixed imaging element, a CMOS (complementary metal oxide semiconductor), a CCD (charge coupled device), etc., may be used.

To the external equipment connection I/F 118 is electrically connectable, external equipment units such as an externally attached camera, an externally attached microphone, an externally attached loudspeaker, etc., with a USB (universal serial bus) cable, etc., plugged into a connecting port 1132 of the housing 1100 shown in FIG. 2. When the externally attached camera is connected, the externally attached camera is driven with a priority over the embedded camera 112 in accordance with control by the CPU 101. Similarly, when the externally attached microphone is connected, or the externally attached loudspeaker is connected, the externally attached microphone or the externally attached loudspeaker is driven with priority over the embedded microphone 114 or the embedded loudspeaker 115.

The recording medium 106 is configured to be detachably mounted in the transmission terminal 10. Moreover, a non-volatile memory which reads or writes data in accordance with control by the CPU 101 is not limited to a flash memory 104, so that an EEPROM (electrically erasable and programmable ROM), etc., may be used. Furthermore, for the camera 112, which is a fixed imaging element for converting light into electric charges to digitize the image (video) of the subject, not only a CCD, but also CMOS (complementary metal oxide semiconductor), etc., may be used as long as it is for imaging the subject. Furthermore, the display 120 is configured with an organic EL and a liquid crystal which display an operating icon and an image of the subject, etc.

Moreover, the program for transmission terminals may be arranged to be a file in an installable format or in an executable format, the file being recorded into a computer-readable recording medium such as a recording medium 106, etc., so as to be distributed.

Figure 4:
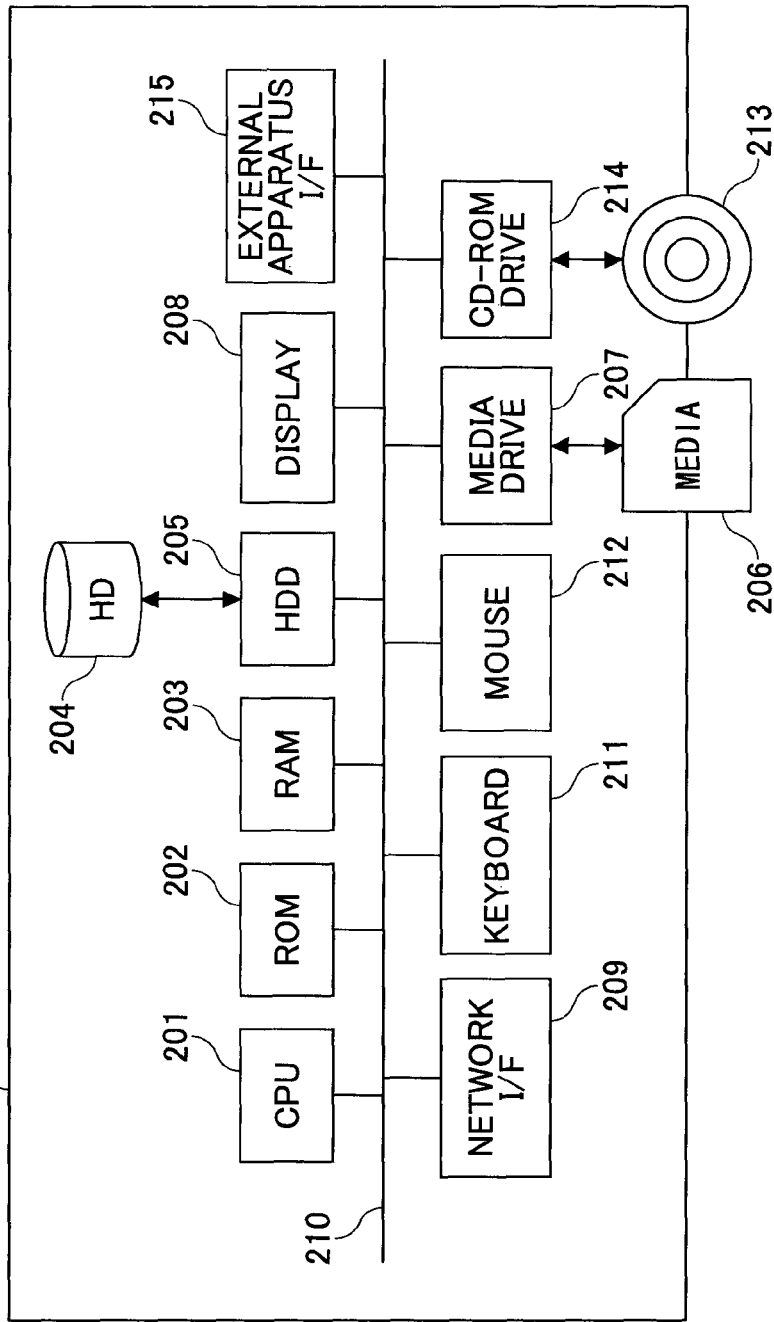
FIG. 4 is a hardware block diagram of a transmission management system, a relay apparatus, a program provision server, or an external input apparatus according to the embodiment of the present invention.

FIG. 4 is a hardware block diagram of a transmission management system according to an embodiment of the present invention. The transmission management system 50 includes a CPU 201, which controls an operation of the whole transmission management system 50; a ROM 202, which stores a program for transmission management; a RAM 203, which is used as a work area of the CPU 201; a HD (hard disk) 204, which stores various data sets; a HDD (hard disk drive) 205, which controls reading or writing of various data sets with the HD 204 in accordance with control of the CPU 201; a media drive 207 which controls reading or writing (storing) of data with a recording medium 206 such as a flash memory, etc.; a display 208, which displays various information sets such as a cursor, a menu, a window, a character, an image, etc.; a network I/F 209 for conducting data transmission using a below-described communication network 2; a keyboard 211 provided with multiple keys for inputting characters, numerical values, various instructions, etc.; a mouse 212, which selects and executes various instructions, which selects what is to be processed, and which moves the cursor; a CD-ROM drive 214, which controls reading or writing of data from or to a CD-ROM (compact disc read only memory) 213 as an example of a detachably mounted recording medium; an external apparatus I/F 215, which transmits and receives information with an external apparatus; and a bus line 210, such as an address bus and a data bus such as an address bus, a data bus, etc., for electrically connecting the above-described respective elements as shown in FIG. 4.

The program for transmission management may be arranged to be a file in an installable format or in an executable format, which file is recorded into a computer-readable recording medium such as the above-described recording medium 206 and the CD-ROM 213, etc., so as to be distributed.

Moreover, the external input apparatus 40 has the same hardware configuration as the above-described transmission management system 50, so that repeated explanations are omitted. In the ROM 202 is recorded a program for an external input apparatus for controlling the external input apparatus 40. In this case as well, the program for the external input apparatus may be arranged to be a file in an installable format or in an executable format, which file is recorded into a computer-readable recording medium such as the above-described recording medium 206 and the CD-ROM 213, etc., so as to be distributed.

Moreover, the relay apparatus 30 has the same hardware configuration as the above-described transmission management system 50, so that repeated explanations are omitted. In the ROM 202 is recorded a program for the relay apparatus for controlling the relay apparatus 30. In this case as well, the program for the relay apparatus may be arranged to be a file in an installable format or in an executable format, which file is recorded into a computer-readable recording medium such as the above-described recording medium 206 and the CD-ROM 213, etc., so as to be distributed.

Moreover, the program provision system 90 has the same hardware configuration as the above-described transmission management system 50, so that repeated explanations are omitted. In the ROM 202 is recorded a program for program provision for controlling the program provision system 90. In this case as well, the program for the program provision may be arranged to be a file in an installable format or in an executable format, which file is recorded into a computer-readable recording medium such as the above-described recording medium 206 and the CD-ROM 213, etc., so as to be distributed.

Furthermore, the maintenance system 100 is a computer for performing support, management, or maintenance of at least one of the terminal 10, the relay apparatus 30, the management system 50, and the program provision system 90. For example, when the maintenance system 100 is installed within the country and the terminal 10, while the terminal 10, the relay apparatus 30, the management system 50, or the program provision system 90 is installed outside the country, the maintenance system 100 performs maintenance of at least one of support, management, and maintenance of at least one of the terminal 10, the relay apparatus 30, the management system 50, an authentication system 80, and the program provision system 90 remotely via the communication network 2.

Moreover, the maintenance system 100 performs maintenance such as management of failure history, maintenance and inspection, customer, production number, or model number in at least one of the terminal 10, the relay apparatus 30, the management system 50, and the program provision system 90 without going through the communications network 2.

Furthermore, the program provision system 90 and the maintenance system 100 have the same hardware configuration as the above-described management system 50, so that repeated explanations are omitted. In the HD 204 is recorded a program for program provision for controlling the program provision system 90. In this case as well, the program for the program provision may be arranged to be a file in an installable format or in an executable format, which file is recorded into a computer-readable recording medium such as the above-described recording medium 206, the CD-ROM 213, etc., so as to be distributed. Moreover, the above-described program for the program provision system 90 may be arranged to be stored in the ROM 202, not the HD 204.

As another example of the detachably mounted recording medium, it may be arranged for a program to be recorded into a computer-readable recording medium such as a CD-R (compact disc recordable), a DVD (digital versatile disk), a blue-ray disc, etc., for provision.

Functional Configuration of Embodiment

Figure 5A:
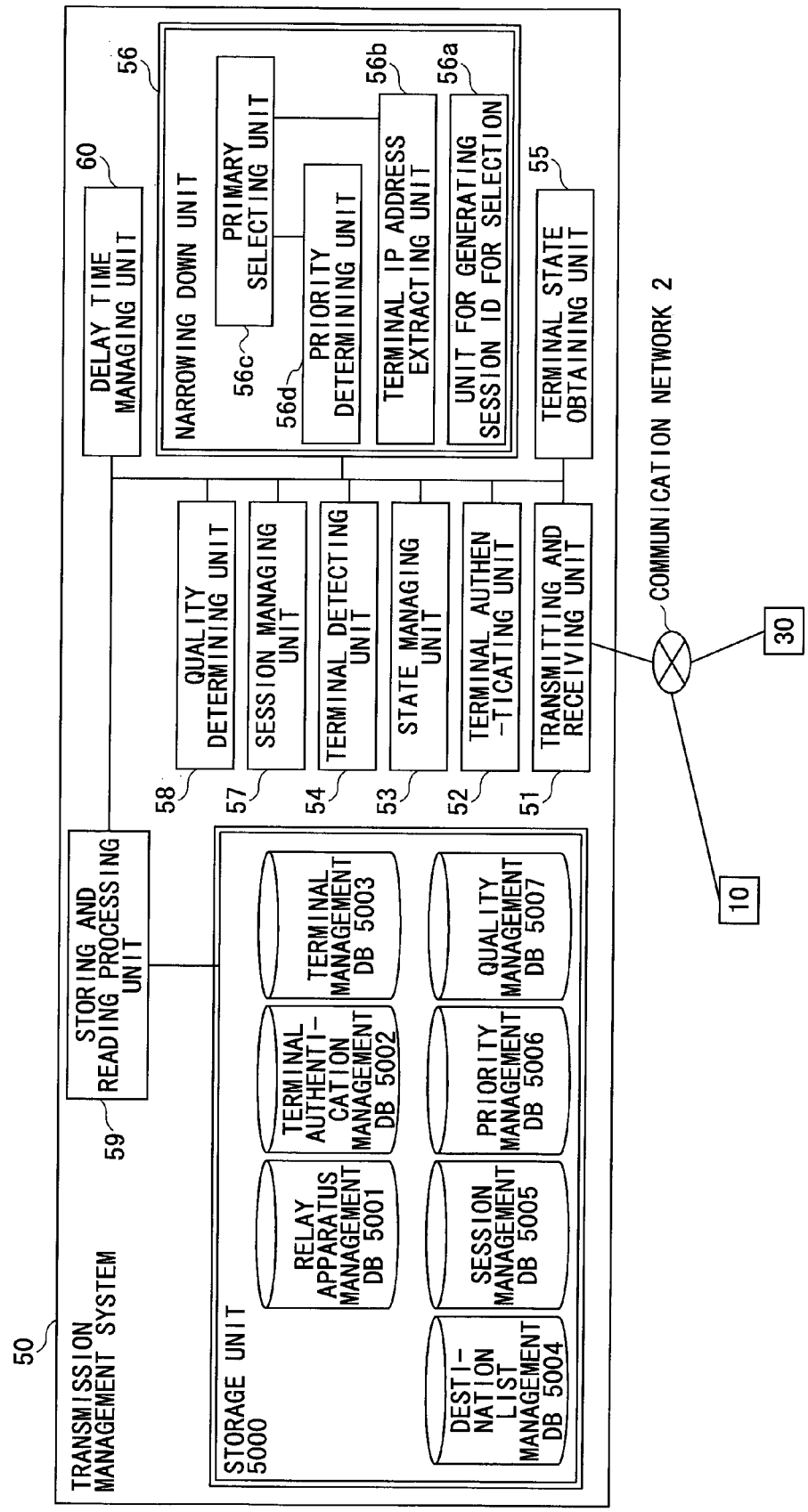
FIGS. 5A and 5B are functional block diagrams of the terminal, the apparatus, and the system, which make up the transmission system according to the embodiment of the present invention.
Figure 5B:
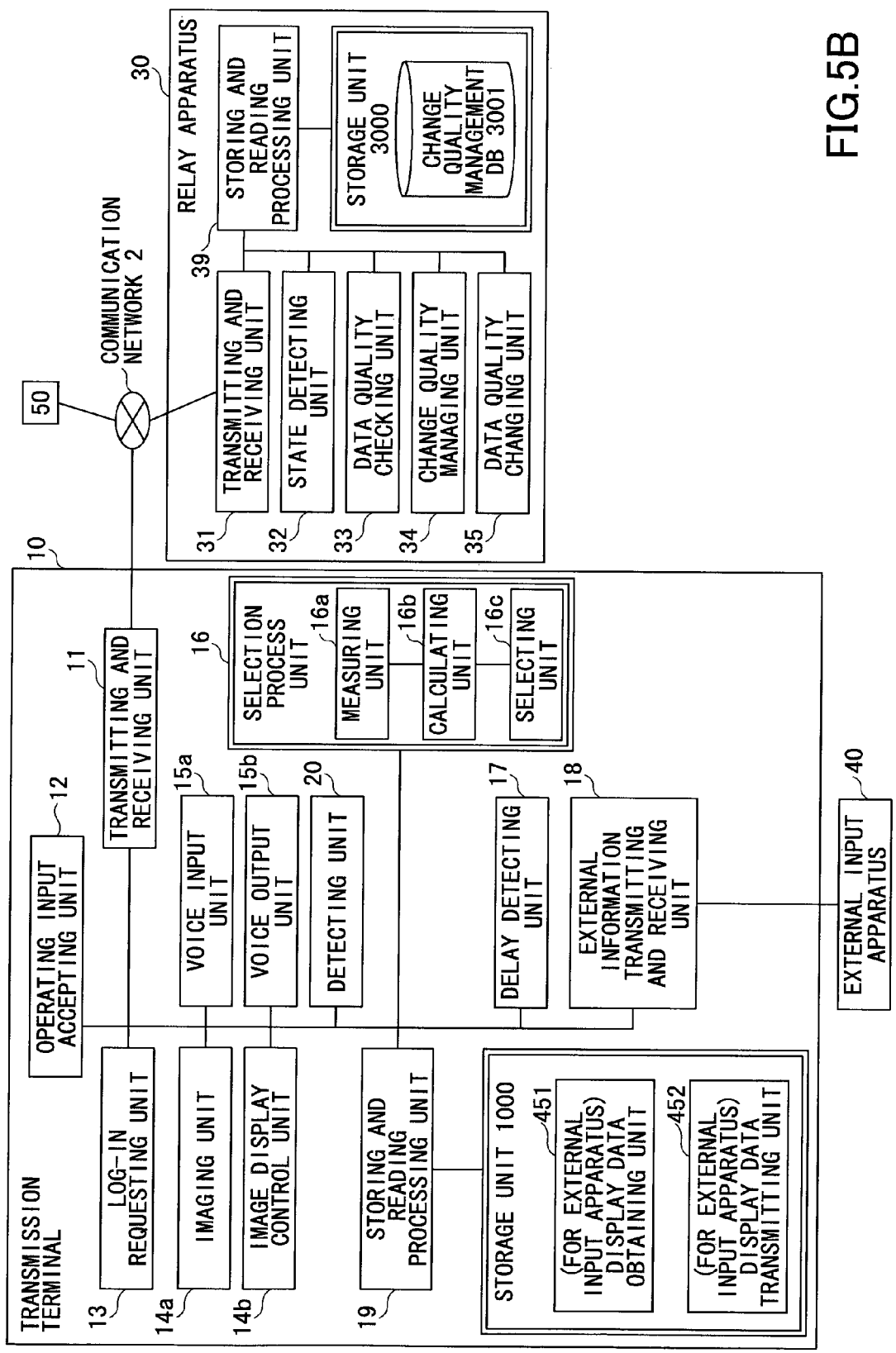
Figure 24:
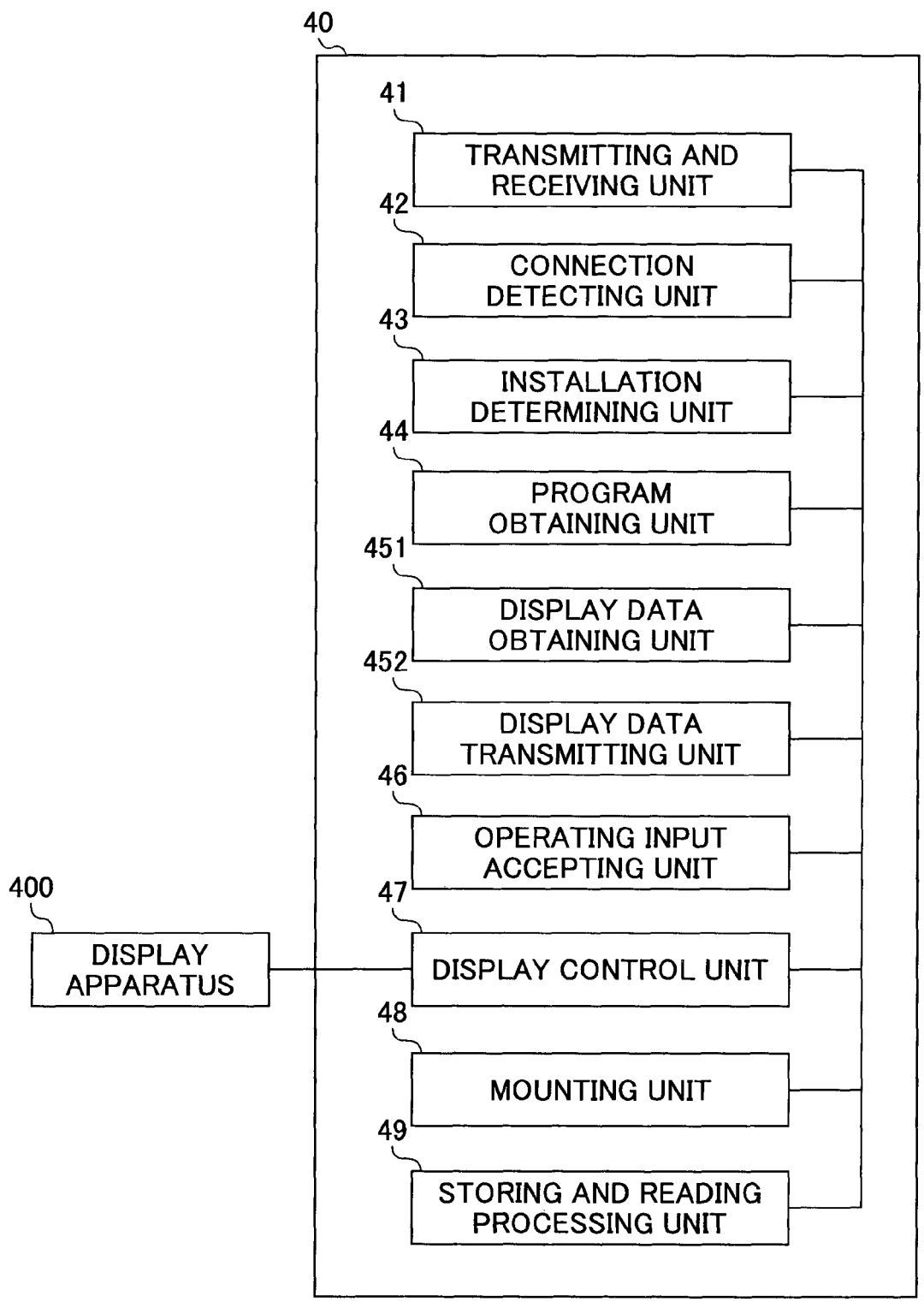
FIG. 24 is a functional block diagram of the external input apparatus.

Next, a functional configuration of the present embodiment is explained. FIGS. 5A and 5B are functional block diagrams of the terminal, apparatus, and system, which make up the transmission system 1 according to the present embodiment. In FIGS. 5A and 5B, the transmission terminal 10, the relay apparatus 30, and the transmission management system 50 are connected such that they may conduct data communications via the communications network 2. The external input apparatus 40 is connected to the transmission terminal 10 such that it may transmit and receive data with the transmission terminal 10. Moreover, FIG. 24 is a functional block diagram of the external input apparatus 40, which makes up the transmission system 1 of the present embodiment. Furthermore, the program provision system 90, which is shown in FIG. 1, is not directly related to communications in teleconferencing, so that it is omitted in FIGS. 5A and 5B.

Functional Configuration of Transmission Terminal

The transmission terminal 10 includes a transmitting and receiving unit 11; an operating input accepting unit 12; a log-in requesting unit 13; an imaging unit 14*a*; an image display control unit 14*b*; a voice input unit 15*a*; a voice output unit 15*b*; a selection processing unit 16; a delay detecting unit 17; an external information transmitting and receiving unit 18; and a storing and reading processing unit 19. Each of the units is a function or a unit which is embodied by any one of the respective elements shown in FIG. 3 operating via an instruction from a CPU 201 in accordance with a program stored in the ROM 202. Moreover, the transmission terminal 10 has a storage unit 1000 which is constructed by the SSD 105 shown in FIG. 3.

(Functional Units of Transmission Terminal)

Next, the units of the transmission terminal 10 are described in detail. The transmitting and receiving unit 11 of the transmission terminal 10, which is embodied by the network I/F 111 shown in FIG. 3, transmits and receives various data sets (information sets) with a different terminal, apparatus, or system via the communications network 2. The operating input accepting unit 12, which is embodied by the power switch 109 and the operating button 108, accepts various inputs by a user. For example, when the user turns ON the power switch 109 shown in FIG. 3, the operating input accepting unit 12 shown in FIG. 5B accepts the power ON, so that the power is turned ON. With the power ON being received, the log-in requesting unit 13, which is embodied by an instruction from the CPU 101 shown in FIG. 3, automatically transmits a current IP address of the transmission terminal 10*ab* and log-in requesting information which indicates a request for a log-in to the transmission management system 50 from the transmitting and receiving unit 11 via the communications network 2.

The imaging unit 14*a*, which is embodied by the camera 112 and the imaging element I/F 113 shown in FIG. 3, images a subject to output image data obtained from the imaging.

The image display control unit 14*b*, which is embodied by the display I/F 117 shown in FIG. 3, conducts control for transmitting image data to the externally attached display 120.

Figure 29:
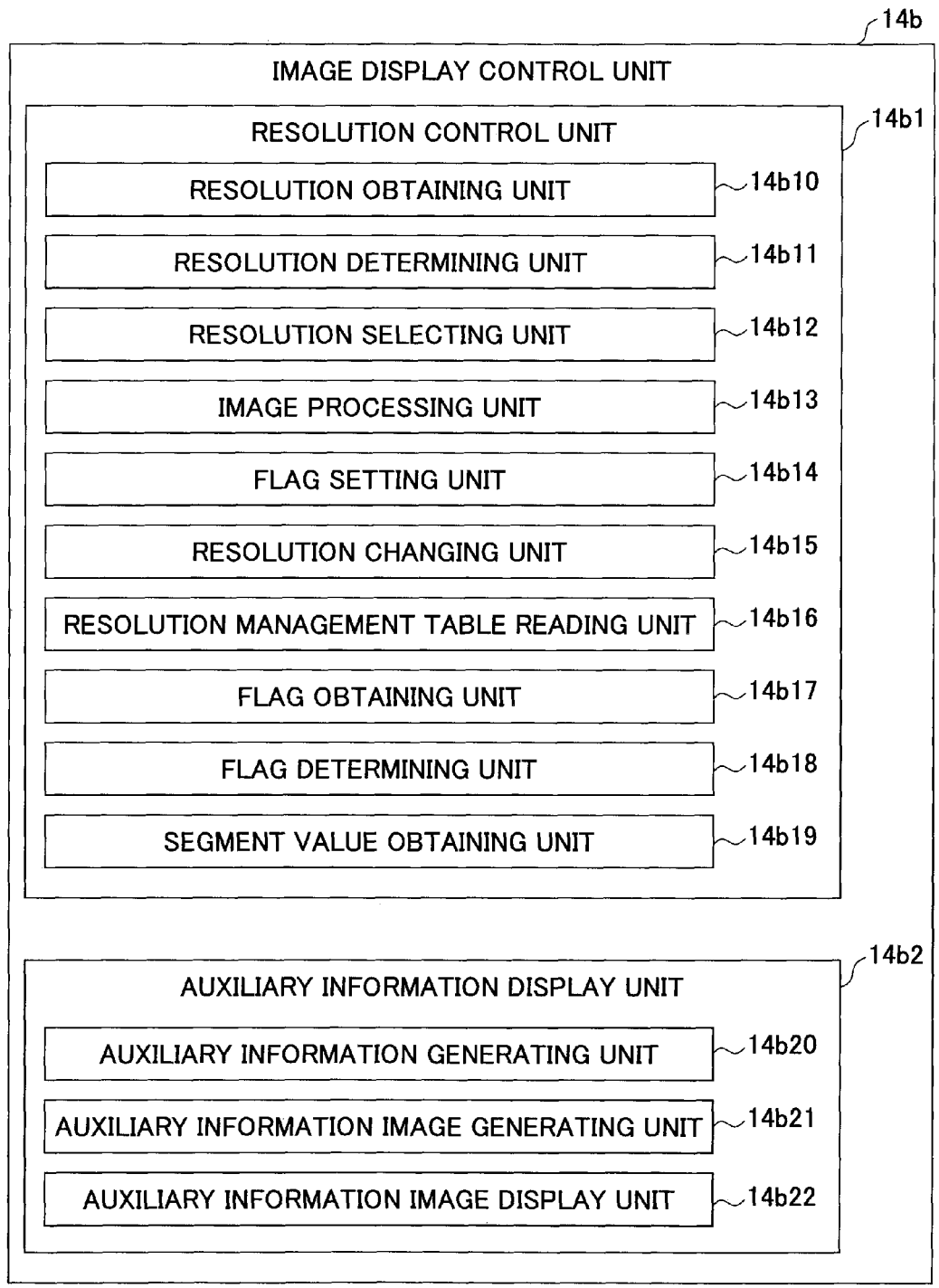
FIG. 29 is a diagram illustrating an exemplary configuration of an image display control unit.

As shown in FIG. 29, the image display control unit 14*b* includes a resolution control unit 14*b*1, which properly controls a resolution of image data output in accordance with a resolution of the display (display apparatus) 120 connected; and an auxiliary information display unit 14*b*2, which controls display of auxiliary information such as an error message, an operating menu, etc.

The resolution control unit 14*b*1 includes a resolution obtaining unit 14*b*10, which obtains multiple resolutions which can be displayed on the display 120, a currently displayed resolution, or, if a resolution management table is provided, a resolution from data read from the resolution management table; a resolution determining unit 14*b*11, which determines whether a resolution meets a certain condition; a resolution selecting unit 14*b*12, which selects a resolution at a predetermined condition from multiple resolutions which can be displayed on the display 120; an image processing unit 14*b*13, which performs processing on image data, such as expansion and reduction, as well as addition of a segment area: a flag setting unit 14b14, which sets an overlap flag; and a resolution changing unit 14b15, which changes to a selected resolution. Moreover, the resolution control unit 14b1 includes a resolution management table reading unit 14b16, which reads a data line from the resolution management table; a flag obtaining unit 14b17, which obtains the overlap flag from the read data line; a flag determining unit 14b18, which determines a value of the overlap flag; and a segment value obtaining unit 14b19, which obtains a segment value from the data line read from the resolution management table.

The auxiliary information display unit 14b2 includes an auxiliary information generating unit 14b20 which generates auxiliary information such as an operating menu, an error message, etc.; an auxiliary information image generating unit 14b21, which generates an auxiliary information image; and an auxiliary information image display unit 14b22, which displays onto the display 120 the generated auxiliary information image synthesized with original image data.

FIG. 30 shows exemplary data used for control at the image display control unit 14b, which data includes items such as "currently displayed resolution", "displayable resolutions", "overlap flag", "segment position", "auxiliary information displaying position", "display contents", etc. For "the currently displayed resolution", a resolution (width, height) which is set for displaying at the present that is obtained from the display 120 is temporarily held. The display 120 generally holds therein information on a resolution set for displaying at the present, which information may be referred to from outside. For "the displayable resolutions", one or multiple resolutions (width, height) which can be displayed on the display 120 that are obtained from the display 120 by the resolution obtaining unit 14b10 are temporarily held. The display 120 is generally arranged to display with multiple resolutions, and information on the displayable resolutions is held internally and may be referred to from outside. "The currently displayed resolution" and "the displayable resolutions" are displayed together with an aspect ratio in parentheses; the aspect ratio can be computed from the resolution, so that it may be omitted. "The overlap flag" is a flag which indicates whether auxiliary information is overlapped over the original image data, and, if not overlapped, means that auxiliary information is displayed on an added segment area, "The segment position" is information indicating a position at which the segment area is added. "The auxiliary information displaying position" is information indicating a position at which the auxiliary information is displayed. "Display contents" is information indicating contents of the auxiliary information. Besides, a setting value such as making background semi-transparent in displaying the auxiliary information.

The voice input unit 15a, which is embodied by the voice input and output I/F 116, and the microphone 114 shown in FIG. 3, inputs a voice of a user and converts the voice into a voice signal, so that voice data related to the voice signal is output. The voice output unit 15b, which is embodied by the voice input and output I/F 116, and the loudspeaker 115 shown in FIG. 3, converts the voice signal related to the voice data to the voice.

In order to perform a final narrowing down process in which multiple relay apparatuses 30 are finally narrowed down to one relay apparatus 30, the selection process unit 16 embodies the measuring unit 16a, the calculating unit 16b, and the selecting unit 16c in accordance with an instruction from the CPU 101 shown in FIG. 3. Of these, for each below-described advance transmission information set received by the transmitting and receiving unit 11, the measuring unit 16a measures a received date and time when the advance transmission information is received by the transmitting and receiving unit 11. For each advance transmission information set with the received date and time measured by the measuring unit 16a, the calculating unit 16b calculates a time required from transmission to reception of the advance transmission information based on a difference between the measured received time and the transmitted date and time included in the advance transmission information. The selecting unit 16c selects a relay apparatus 30 at which is relayed advance transmission information with the shortest required time of required times which are calculated by the calculating unit 16b.

The delay detection unit 17, which is embodied by an instruction from the CPU 101 shown in FIG. 3, detects a delay time (ms) of image data or voice data transmitted from another transmission terminal 10 via the relay apparatus 30. Moreover, the external information transmitting and receiving unit 18 transmits and receives data with an external apparatus via the external apparatus I/F 215. Furthermore, the storing and reading processing unit 19, which is executed by the SSD 105 shown in FIG. 3, performs the process of storing various data sets in the storage unit 1000 and reading various data sets stored in the storage unit 1000. In the storage unit 1000 are stored an IP address of a destination terminal; a relay apparatus ID, which identifies the relay apparatus 30 which transmits various data sets; the voice data; the image data; a password; a terminal ID (identification) for identifying the transmission terminal 10, etc. Moreover, in the storage unit 1000 are stored a display data transmitting unit 452 and a display data obtaining unit 451, which are transmitted to the external input apparatus 40 and which operate on the external input apparatus 40. The display data obtaining unit 451 is where the external input apparatus 40 obtains display data, while the display data transmitting unit 452 transmits the display data obtained by the display data obtaining unit 451 to the transmission terminal 10. The display data refer to image data, which is an image displayed on a screen of a display apparatus made into a format such as JPEG (joint photographic experts group), Bitmap, etc.; and a drawing command made into a format such as GDI (graphics device interface).

A below-described relay apparatus ID and the terminal ID of the present embodiment respectively refer to information identifying a language, a character, a symbol, or various marks used for uniquely identifying the relay apparatus 30 and the transmission terminal 10. Moreover, the relay apparatus ID and the terminal ID may be identifying information, which is a combination of at least two of the language, the character, the symbol, and various marks. Furthermore, explanations will be provided below with the transmission terminal 10 which is originating a request for starting teleconferencing referred to as "the request-originating terminal 10A" and a transmitting terminal 10, which is a destination of the request, referred to as "the destination terminal 10B".

Functional Configuration of External Input Terminal

As shown in FIG. 24, the external input apparatus 40 includes a transmitting and receiving unit 41, a connection detecting unit 42, an installation determining unit 43, a program obtaining unit 44, an operation input accepting unit 46, a display control unit 47, a mounting unit 48, and a storing and reading processing unit 49. Each of the units is a function or a unit which is embodied by any one of the respective elements shown in FIG. 4 operating via an instruction from a CPU 201 in accordance with a program stored in the ROM 202. Moreover, the external input apparatus 40 has a storage unit 4000 which is constructed by an HDD 205 shown in FIG. 4. Furthermore, the external input apparatus 40 has installed an OS (Operating System) such as Windows (registered trademark), etc., thereby having a function of executing a program when connected to another apparatus.

Functional Units of External Input Apparatus

Next, the units of the external input apparatus 40 are described in detail. The transmitting and receiving unit 41 of the external input apparatus 40, which is embodied by a network I/F 209 shown in FIG. 4, transmits and receives various data (information) from the transmission terminal 10. The connection detecting unit 42 detects that transmission and reception of data with an external apparatus is made possible with the external apparatus input and output I/F 215. The installation determining unit 43 determines whether the display data obtaining unit 451 and the display data transmitting unit 452 are installed in the external input apparatus 40. The program obtaining unit 44 obtains and installs the display data obtaining unit 451 and the display data transmitting unit 452 from the storage unit 1000 of the transmission terminal 10 connected via the transmitting and receiving unit 41. The operation input accepting unit 46 accepts an input by an operation of a user. The display control unit 47 causes an image read by a below-described storing and reading processing unit 49 to be displayed on the display apparatus 400. The mounting unit 48 has mounted a storage unit of various apparatuses connected to the external input apparatus 40. The storing and reading processing unit 49, which is executed by the HDD 205 shown in FIG. 4, performs the process of storing various data sets in the storage unit 4000 and reading various data sets stored in the storage unit 4000. In the storage unit 4000 are stored documents data, etc.

Functional Configuration of Relay Apparatus

Next, functions or units of the relay apparatus 30 are explained. The relay apparatus 30 includes a transmitting and receiving unit 31, a state detecting unit 32, a data quality checking unit 33, a changed quality managing unit 34, data quality changing unit 35, and a storing and reading processing unit 39. Each of the units is a function or a unit which is embodied by any one of the respective elements shown in FIG. 4 operating via an instruction from the CPU 201 in accordance with a program stored in the ROM 202. Moreover, the relay apparatus 30 has a storage unit 3000 which is constructed by the HD 204 shown in FIG. 4.

Changed Quality Management Table

In the storage unit 3000 is constructed a changed quality management DB 3001, which includes a changed quality management table as shown in FIG. 7. In the changed quality management table, an IP address of the transmission terminal 30 as a relay destination of the image data and an image quality of image data relayed by the relay apparatus 30 to the relay destination are managed in association.

Here, a resolution of an image of image data handled in the present embodiment is described. As shown in FIG. 6A, there are a low-resolution image to be a base image that has a width of 160 pixels and a length of 120 pixels; a medium-resolution image which has a width of 320 pixels and a length of 240 pixels as shown in FIG. 6B; and a high-resolution image which has a width of 640 pixels and a length of 480 pixels as shown in FIG. 6C. Of these, when going through a narrow-band path, low-quality image data are relayed which include only data of the low-resolution image to be the base image. When the bandwidth is relatively wide, image data of the medium image quality are relayed which include the data of the low-resolution image to be the base image and the medium-resolution image data. Moreover, when the bandwidth is very wide, the image data of low resolution to be a base image quality, medium-resolution image data, and high image quality image data which include high-resolution image data are relayed. For example, in the changed quality management table as shown in FIG. 7, when the relay apparatus 30 relays image data to a destination terminal 10*db* with an IP address of "1.3.2.4", the image quality (quality of image) of image data relayed is "high quality".

Functional Units of Relay Apparatus

Next, the constituting functional elements of the relay apparatus 30 are described in detail. Below, in explaining the units of the relay apparatus 30, a relationship with main elements for embodying each unit of the relay apparatus 30 of the respective elements shown in FIG. 3 is also explained.

The transmitting and receiving unit 31 of the relay apparatus 30 shown in FIG. 5B that is embodied by the network I/F 209 shown in FIG. 4, transmits and receives various data sets (information sets) with a different terminal, apparatus, or system via the communications network 2. The state detecting unit 32, which is embodied by an instruction from the CPU 201 shown in FIG. 4, detects an operating state of the relay apparatus 30 which includes the state detecting unit 32. As operating states, there are "ON line", "OFF line" and "Failed" states.

The data quality checking unit 33, which is embodied by an instruction from the CPU 201 shown in FIG. 4, searches the changed quality management table (see FIG. 7) with an IP address of the destination terminal 10B as a search key, and extracts an image quality of the corresponding image data relayed to check the image quality of the image data relayed. The changed quality management unit 34, which is embodied by an instruction from the CPU 201 as shown in FIG. 4, changes the contents of the changed quality management DB 3001 based on the below-described quality information transmitted from the transmission management system 50. For example, the relay apparatus 30 needs to decrease the image quality of image data relayed previously from high image quality to low image quality when a delay occurs in receiving image data at the destination terminal 10*db* when a teleconference is started via a communications network 2 by the request-originating terminal 10*bb* and the destination terminal 10*ca* which are performing a different teleconference during the time a teleconference is being conducted by transmitting and receiving high-quality image data between the request-originating terminal 10*aa*, which has a terminal ID of "01*aa*" and the destination terminal, 10*db*, which has a terminal ID of "01*db*". In such a case, the content of the changed quality management DB 3001 is changed such that image quality of image data relayed by the relay apparatus 30 is decreased from high image quality to medium image quality.

The data quality changing unit 35, which is embodied by an instruction from the CPU 201 shown in FIG. 4, changes image quality of image data sent from the transmission-originating terminal 10 based on the changed contents of the changed quality management DB 3001. The storing and reading processing unit 39, which is embodied by the HDD 205 shown in FIG. 4, performs the process of storing various data sets in the storage unit 3000 and reading various data sets stored in the storage unit 3000.

Functional Configuration of Transmission Management System

Next, functions or units of the transmission management system 50 are explained. The transmission management system 50 includes a transmitting and receiving unit 51, a terminal authenticating unit 52, a state managing unit 53, a terminal extracting unit 54, a terminal state obtaining unit 55, a narrowing down unit 56, a session managing unit 57, a quality determining unit 58, a storing and reading processing unit 59, and a delay period managing unit 60. Each of the units is a function or a unit which is embodied by any one of the respective elements shown in FIG. 4 operating via an instruction from a CPU 201 in accordance with a program stored in the ROM 202. Moreover, the transmission management system 50 has a storage unit 5000 which is constructed by the HD 204 shown in FIG. 4.

(Relay Apparatus Management Table)

In the storage unit 5000 is constructed a relay apparatus management DB 5001, which includes a relay apparatus management table as shown in FIG. 8. For each relay apparatus ID of each relay apparatus 30, the relay apparatus management table manages an operating state of the relay apparatus 30; a received date and time at which is received by the transmission management system 50 state information which indicates the operating state; an IP address of the relay apparatus 30; and a maximum data transmission speed (Mbps) in the relay apparatus 30 in association. For example, in the relay apparatus management table in FIG. 8, it is indicated that, for the relay apparatus 30a with the relay apparatus ID of "111a", the operating state is "ON line"; that the date/time at which the state information is received by the transmission management system 50 is "13:00 on Nov. 10, 2009"; that an IP address of the relay apparatus 30a is "1.2.1.2."; and that the maximum data transmission speed in this relay apparatus 30a is 100 Mbps.

(Terminal Authentication Management Table)

Moreover, in the storage unit 5000 is constructed a terminal authentication management DB 5002, which includes a terminal authentication management table as shown in FIG. 9. This terminal authentication management table manages passwords in association with terminal IDs of all transmission terminals 10 managed by the transmission management system 50. For example, the terminal authentication management table shown in FIG. 9 indicates that the terminal ID of the transmission terminal 10aa is "01aa" and the password is "aaaa".

(Terminal Management Table)

Moreover, in the storage unit 5000 is constructed a terminal management DB 5003, which includes a terminal management table as shown in FIG. 10. For the terminal ID of each transmission terminal 10, this terminal management table manages an operating state of the transmission terminal 10; a received date and time at which the below-described log-in request information is received by the transmission management system 50; and an IP address of the transmission terminal 10 in association. For example, the terminal management table shown in FIG. 10 indicates that, for the transmission terminal 10aa with the terminal ID of "01aa", the operating state is "ON line", the data and time at which the log-in request information is received by the transmission management system 50 is "13:40 on Nov. 10, 2009", and the IP address of the transmission terminal 10aa is "1.2.1.3".

(Destination Management Table)

Moreover, in the storage unit 5000 is constructed a destination list management DB 5004, which includes a destination list management table as shown in FIG. 11. The destination list management table manages, in association, all of terminal IDs of the destination terminal 10B registered as a candidate for the destination terminal 10B with the terminal ID of the request-originating terminal 10A which is requesting that a teleconference be started. For example, the destination list management table shown in FIG. 11 indicates that there are three candidates for the destination terminal 10B that may request starting the teleconference from a request-originating terminal 10aa with a terminal ID of "01aa", namely, the transmission terminal 10ab with the terminal ID of "01ab", the transmission terminal 10ba with the terminal ID of "01ba", and the transmission terminal 10db with the terminal ID of "01db". The candidates of the destination terminal 10B may be updated by adding or deleting with a request for adding or deleting to the transmission management system 50 from a request-originating terminal 10A.

(Session Management Table)

Moreover, in the storage unit 5000 is constructed a session management DB 5005, which includes a session management table as shown in FIG. 12. For each session ID for selection that is used for executing a session for selecting a relay apparatus 30, this session management table manages, in association, a relay apparatus ID of the relay apparatus 30 which is used for relaying image data and voice data; a terminal ID of a request-originating terminal 10A; a terminal ID of a destination terminal 10B; a receiving delay time (ms) when the image data are received at the destination terminal 10B; and a received date/time at which delay information in which the delay time is indicated that is transmitted from the destination terminal 10B and received at the transmission management system 50. For example, in the session management table shown in FIG. 12, it is indicated that the relay apparatus (with a relay apparatus ID "111a"), which is selected in a session executed using the session ID for selection "sel", relays the image data and the voice data between a request-originating terminal 10aa with a terminal ID of "01aa" and a destination terminal 10db with a terminal ID "01db" and a delay time of the image data at "2009.11.10 14:00" at the destination terminal 10db is 200 ms. When teleconferencing is conducted between the two transmission terminals 10, a received date/time of the delay information may be managed based on delay information transmitted from the request-originating terminal 10A, not the destination terminal 10B. When conducting teleconferencing between three or more transmission terminals 10, the received date/time of the delay information is managed based on delay information transmitted from the transmission terminal 10 on the receiver side of the image data and the voice data.

(Address Priority Management Table)

Moreover, in the storage unit 5000 is constructed a priority management DB 5006, which includes an address priority management table as shown in FIG. 13. This address priority management table manages four dot address portions of IP addresses in the nominal IPv4 format in association with address priority points such that the address priority points increase depending on whether four portions of the dot address portions are the same or different. For example, in the address priority management table shown in FIG. 13, when three values from the upper position to the lower position of the dot address are of the same IP address, the address priority points are "5". When two values from the upper position to the lower position of the dot address are of the same IP address, the points for the address priority are "3". In this case, whether the value of the lowest position dot address is the same is not related to the priority. For an IP address in which the uppermost position value of the dot address is the same and the second uppermost position value is different, the point for the address priority is "1". In this case, whether the value of the third uppermost portion and the value of the lowermost position dot address are the same is not related to the priority. For an IP address in which the uppermost position value of the dot address is different, the address priority points are "0". In this case, whether the value of the second uppermost portion, the value of the third uppermost portion, and the value of the lowermost position dot address is the same is not related to the priority.

(Transmission Speed Priority Table)

Moreover, the priority management DB 5006, which is constructed in the storage unit 5000, also includes a transmission speed priority management table as shown in FIG. 14. In this transmission speed priority management table, a value of a maximum data transmission speed (Mbps) in the relay apparatus 30 is managed in association with a transmission speed priority such that the transmission speed priority points increase depending on the value of the maximum data transmission speed (Mbps) in the relay apparatus 30. For example, in the transmission speed priority management table shown in FIG. 14, when the maximum data transmission speed at the relay apparatus 30 is no less than 1000 Mbps, the transmission speed priority points are "5". When the maximum data transmission speed in the relay apparatus 30 is no less than 100 Mbps and less than 1000 Mbps, the transmission speed priority points are "3". When the maximum data transmission speed in the relay apparatus 30 is no less than 10 Mbps and less than 100 Mbps, the transmission speed priority point is "1". When the maximum data transmission speed in the relay apparatus 30 is less than 10 Mbps, the points for the transmission speed priority are "0".

(Quality Management Table)

Moreover, in the storage unit 5000 is constructed a quality management DB 5007, which includes a quality management table as shown in FIG. 15. In the quality management table, a delay time (ms) of the image data in the request-originating terminal 10A or the destination terminal 10B is managed in association with image quality (quality of image) of the image data relayed at the relay apparatus 30.

(Functional Units of Transmission Management System)

Next, the functional units of the transmission management system 50 are described in detail. Below, in explaining each unit of the transmission management system 50, a relationship with main elements for embodying the unit of the transmission management system 50 of the respective elements shown in FIG. 4 is also explained.

The transmitting and receiving unit 51, which is executed by the network I/F 209 shown in FIG. 4, transmits and receives various data sets (information sets) with a different terminal, apparatus, or system via the communications network 2. With a terminal ID and a password which are included in log-in request information received via the transmitting and receiving unit 51 as search keys, the terminal authentication unit 52 searches the terminal authentication management DB 5002 of the storage unit 5000, and determines whether the same terminal ID and password are managed in the terminal authentication management DB 5002 to conduct terminal authentication. In order to manage the operating state of the request-originating terminal 10A which made a log-in request, the state management unit 53 stores, for management, the terminal ID of the request-originating terminal 10A, the operating state of the request-originating terminal 10A, a received date/time at which the log-in request information is received at the transmission management system 50; and the IP address of the request-originating terminal 10A in association.

With the terminal ID of the request-originating terminal 10A which made the log-in request as a key, the terminal extracting unit 54 searches the destination list management table (see FIG. 11) and reads an ID of a candidate terminal for a destination terminal 10B which may communicate with the request-originating terminal 10A to extract the terminal ID. Moreover, with the terminal ID of one request-originating terminal 10A which made the log-in request as a key, the terminal extracting unit 54 searches the destination list management table (see FIG. 11) and also extracts the terminal ID of another request-originating terminal 10A that has registered the terminal ID of the one request-originating terminal 10A as a candidate for the destination terminal 10B.

With the terminal ID of the candidate for the destination terminal 10B that is extracted by the terminal extracting unit 54 as a search key, the terminal state obtaining unit 55 searches the terminal management DB table (see FIG. 10) and reads an operating state for each terminal ID extracted by the terminal extracting unit 54. In this way, the terminal state obtaining unit 55 may obtain an operating state of a candidate of the destination terminal 10B, which may communicate with the request-originating terminal 10A which made a log-in request. Moreover, with the terminal ID extracted by the terminal extracting unit 54 as a search key, the terminal state obtaining unit 55 searches the terminal management table (see FIG. 10) and also obtains the operating state of the request-originating terminal 10A which made the log-in request.

In order to conduct a primary narrowing down process before a final narrowing down process in order to assist the final narrowing down process, which narrows down multiple relay apparatuses 30 to a final one relay apparatus 30, the narrowing down unit 56 includes a unit 56a for generating a session ID for selection; a terminal IP address extracting unit 56b; a primary selecting unit 56c; and a priority determining unit 56d. Of these, the unit 56a for generating the session ID for selection generates a session ID for selection that is used in executing a session for selecting the relay apparatus 30. The terminal IP address extracting unit 56b searches the terminal management table (see FIG. 10) based on the terminal ID of the request-originating terminal 10A and the terminal ID of the destination terminal 10B that are included in starting request information sent from the request-originating terminal 10A. The primary selecting unit 56c selects a relay apparatus ID of a relay apparatus 30 with the operating state being "ON line" of relay apparatuses 30 managed by the relay apparatus management table (see FIG. 8).

Moreover, the primary selecting unit 56c searches the relay apparatus management table (see FIG. 8) based on the IP address of the request-originating terminal 10A and the IP address of the destination terminal 10B that are extracted by the terminal IP address extracting unit 56b to investigate whether, for each dot address of the IP address of the relay apparatus 30 selected, whether the dot address is the same as or different from the corresponding dot address in the IP addresses of the request-originating terminal 10A and the destination terminal 10B. Furthermore, for each relay apparatus, the primary selecting unit 56c selects those relay apparatuses 30 with the highest two combined points, each of which combined points is a combination of a higher of points relative to the transmission terminal 10 in address priority points, and transmission speed priority points to conduct a further selection of the relay apparatus 30.

While the present embodiment is arranged to select those relay apparatuses 30 with the two highest points, it is not limited thereto, so that it may be arranged to select those relay apparatuses 30 with three or more highest points as long as even one more relay apparatus 30 may be narrowed down.

With reference to the priority management table (see FIG. 13), the priority determining unit 56d determines the address priority points for each relay apparatus 30 investigated by the primary selecting unit 56c. Moreover, the priority determining unit 56d searches the priority management table (see FIG. 14) based on the maximum data transmission speed of each relay apparatus 30 that is managed in the relay apparatus management table (see FIG. 8) to determine the transmission speed priority points for each relay apparatus 30 narrowed down by the primary selecting unit 56c.

The session managing unit 57 stores, in the session management table (see FIG. 12) of the storage unit 5000, for managing, the session ID for selection that is generated at the unit 56*a* for generating the session ID for selection; the terminal ID of the request-originating terminal; and the terminal ID of the destination terminal in association. Moreover, the session managing unit 57 stores in the session management table (see FIG. 12), for managing, a relay apparatus ID of the relay apparatus 30 which is finally selected as one relay apparatus at the selecting unit 16*c* of the transmission terminal 10.

With the delay time as a search key, the quality determining unit 58 searches the quality management table (see FIG. 15) and extracts an image quality of the corresponding image data to determine an image quality of image data for relaying by the relay apparatus 30. The storing and reading processing unit 59, which is executed by the HDD 205 shown in FIG. 4, performs the process of storing various data sets in the storage unit 5000 and reading various data sets stored in the storage unit 5000. With an IP address of the destination terminal 10B as a search key, the delay time management unit 60 searches the terminal management table (see FIG. 10) to extract the corresponding terminal ID and stores, for managing, the delay time indicated by the delay information in a session management table of the session management table (see FIG. 12) in a delay time field portion of a record in which the extracted terminal ID is included.

Process and Operation of Embodiment (Basic Process and Operation)

Figure 16:
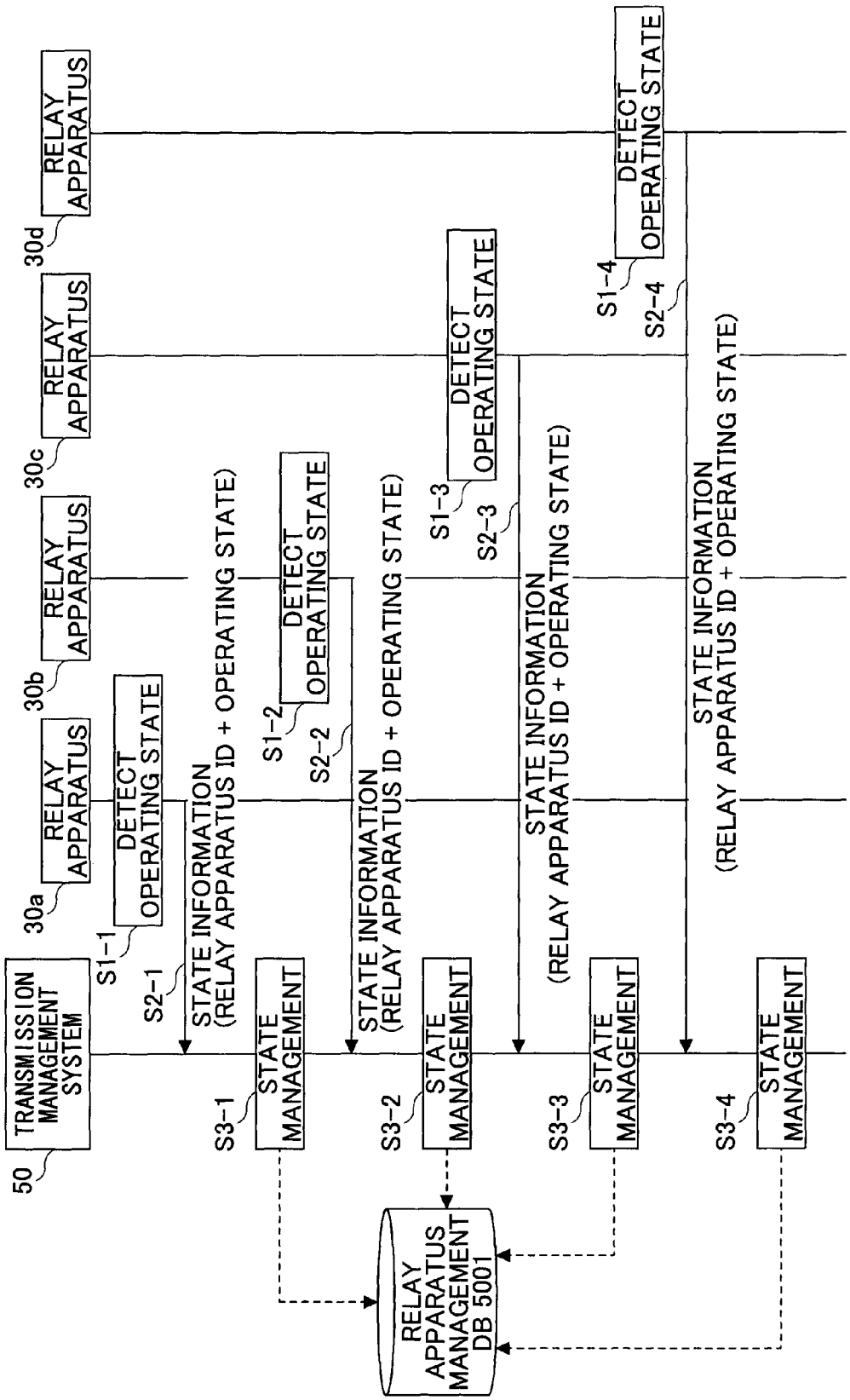
FIG. 16 is a sequence diagram showing a process which manages state information indicating an operating state of relay apparatuses.
Figure 17:
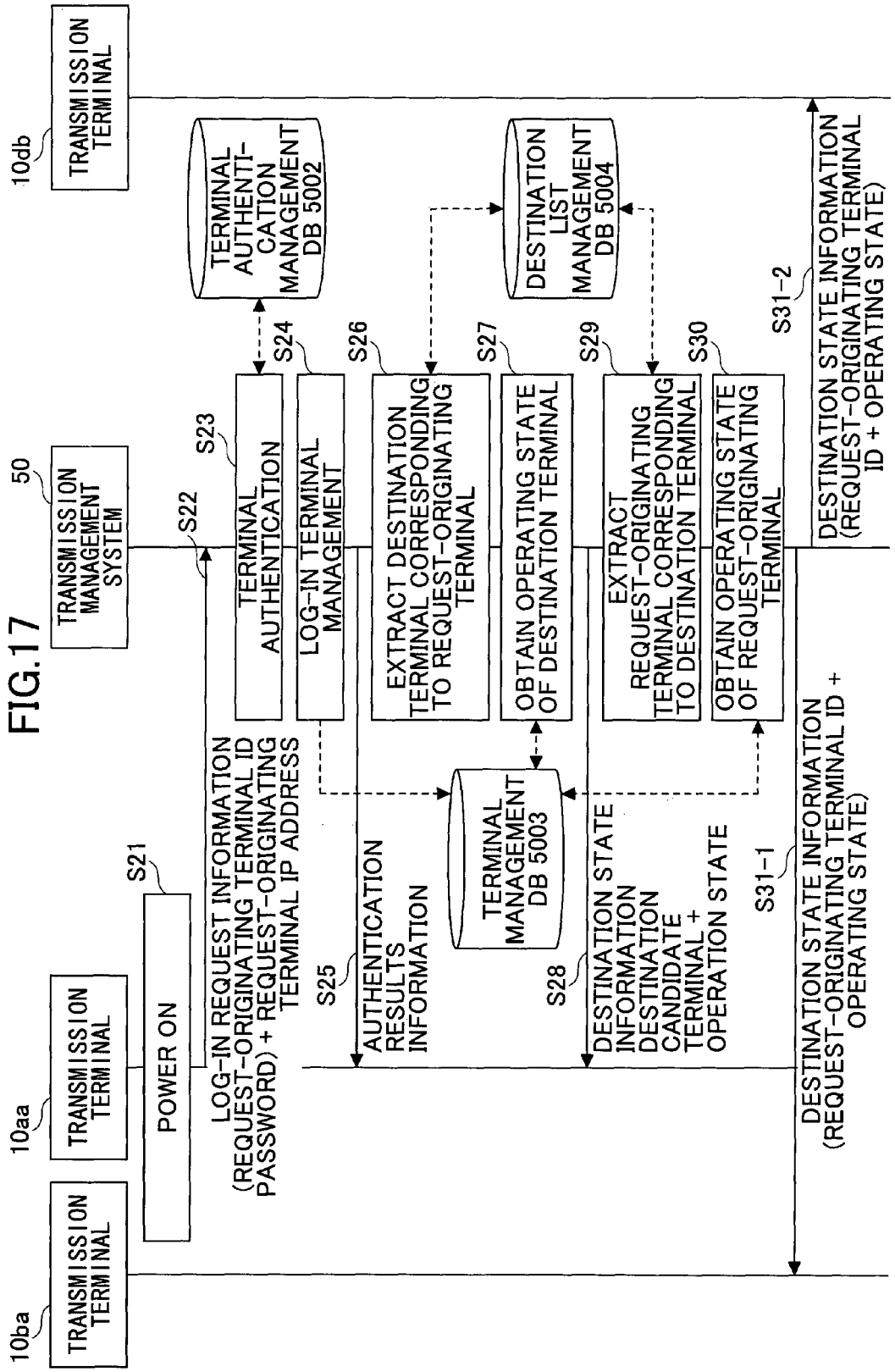
FIG. 17 is a sequence diagram showing a preparation stage process which starts communicating between transmission terminals.
Figure 18:
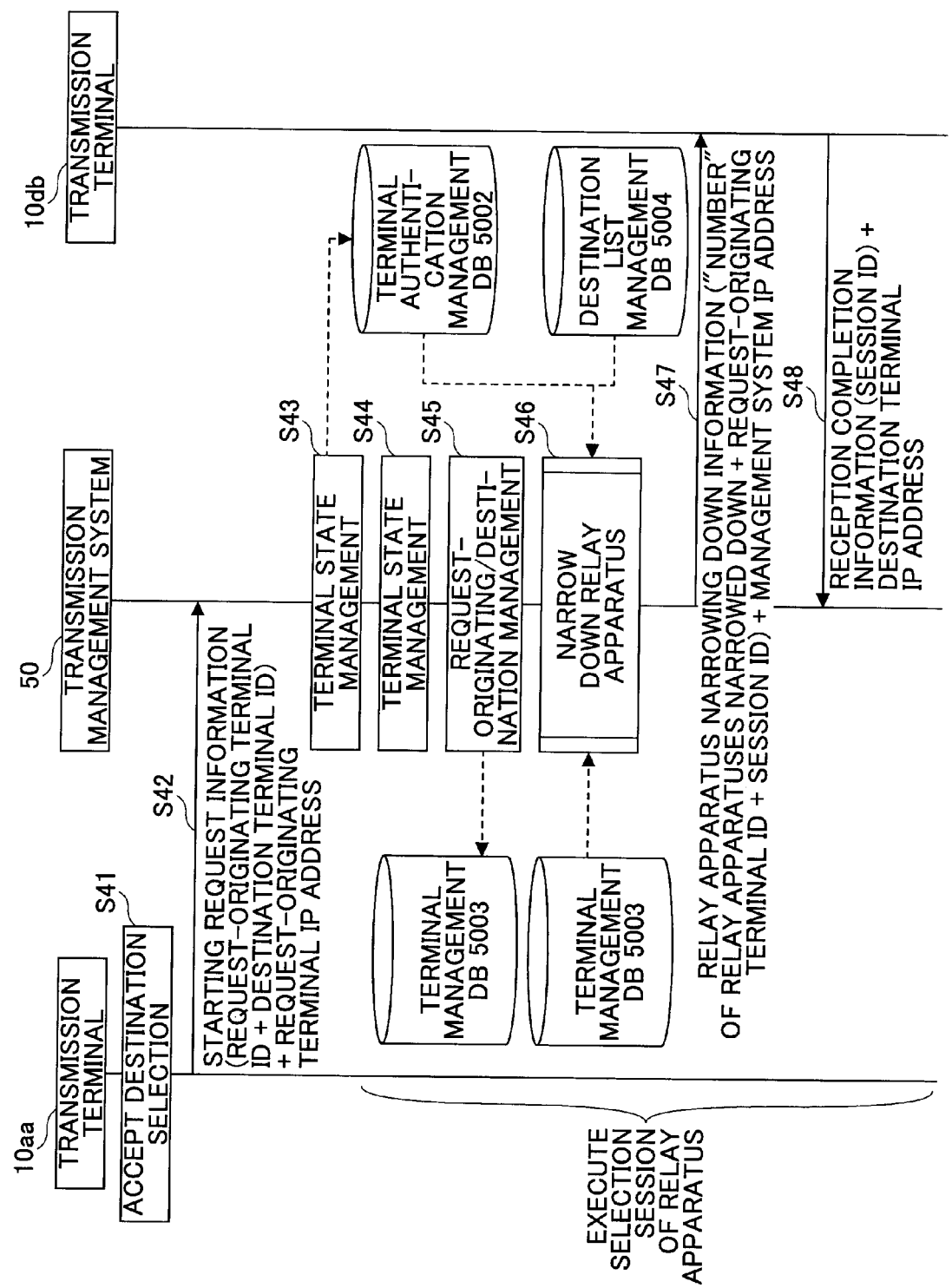
FIG. 18 is a sequence diagram showing a process which narrows down relay apparatuses.
Figure 19:
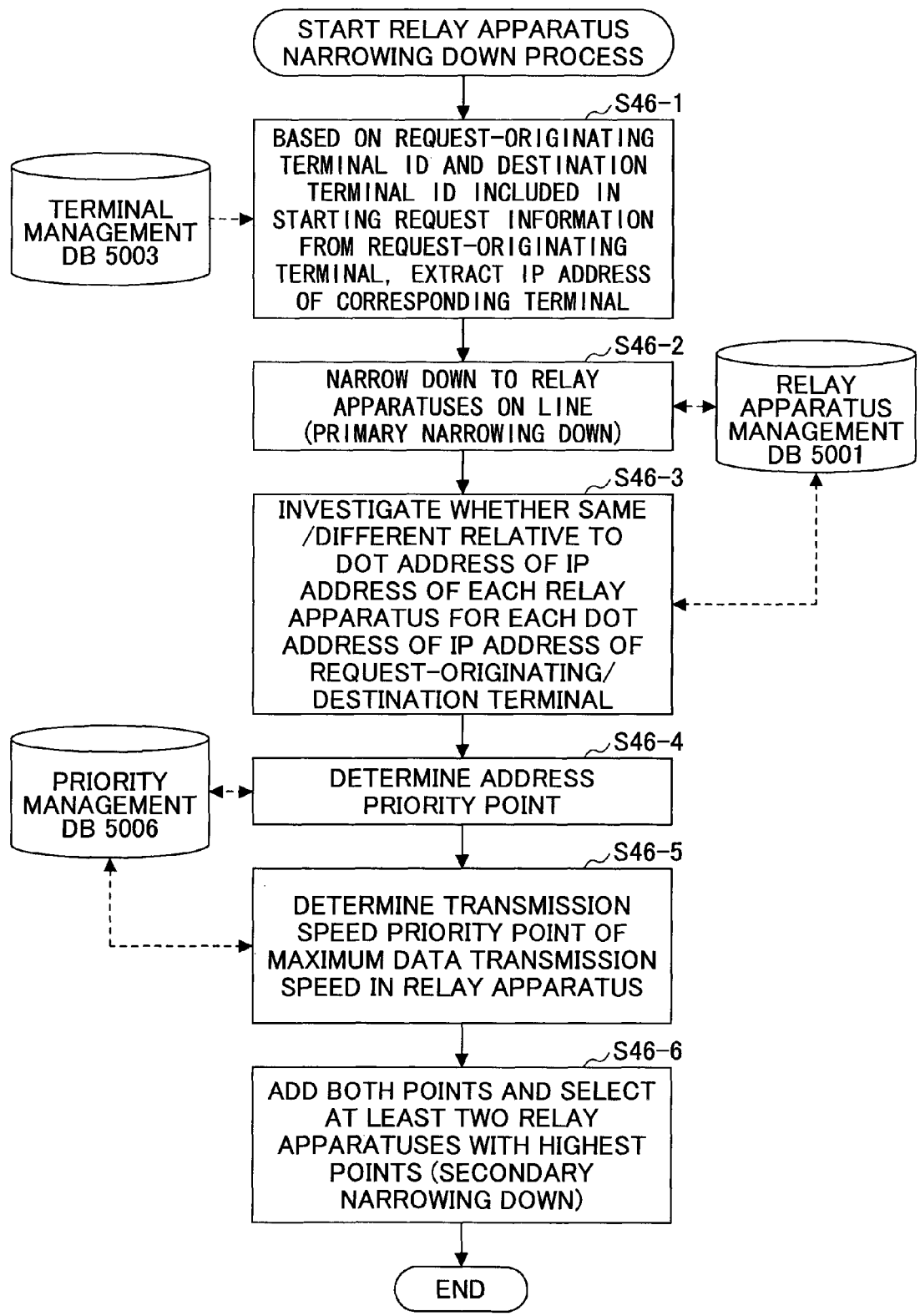
FIG. 19 is a process flow showing the process which narrows down the relay apparatuses.
Figure 21:
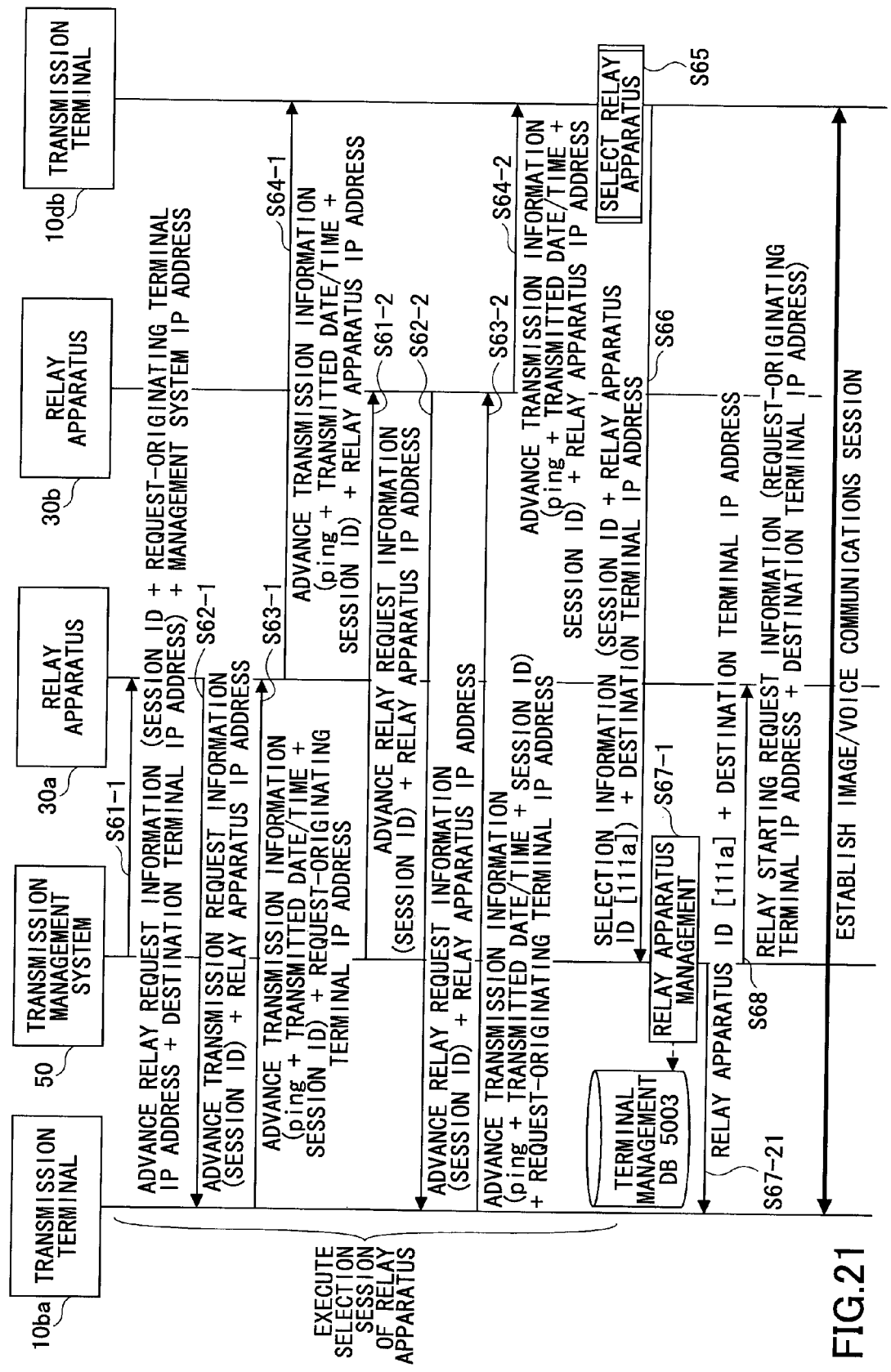
FIG. 21 is a sequence diagram showing a process for the transmission terminal to select the relay apparatus.
Figure 22:
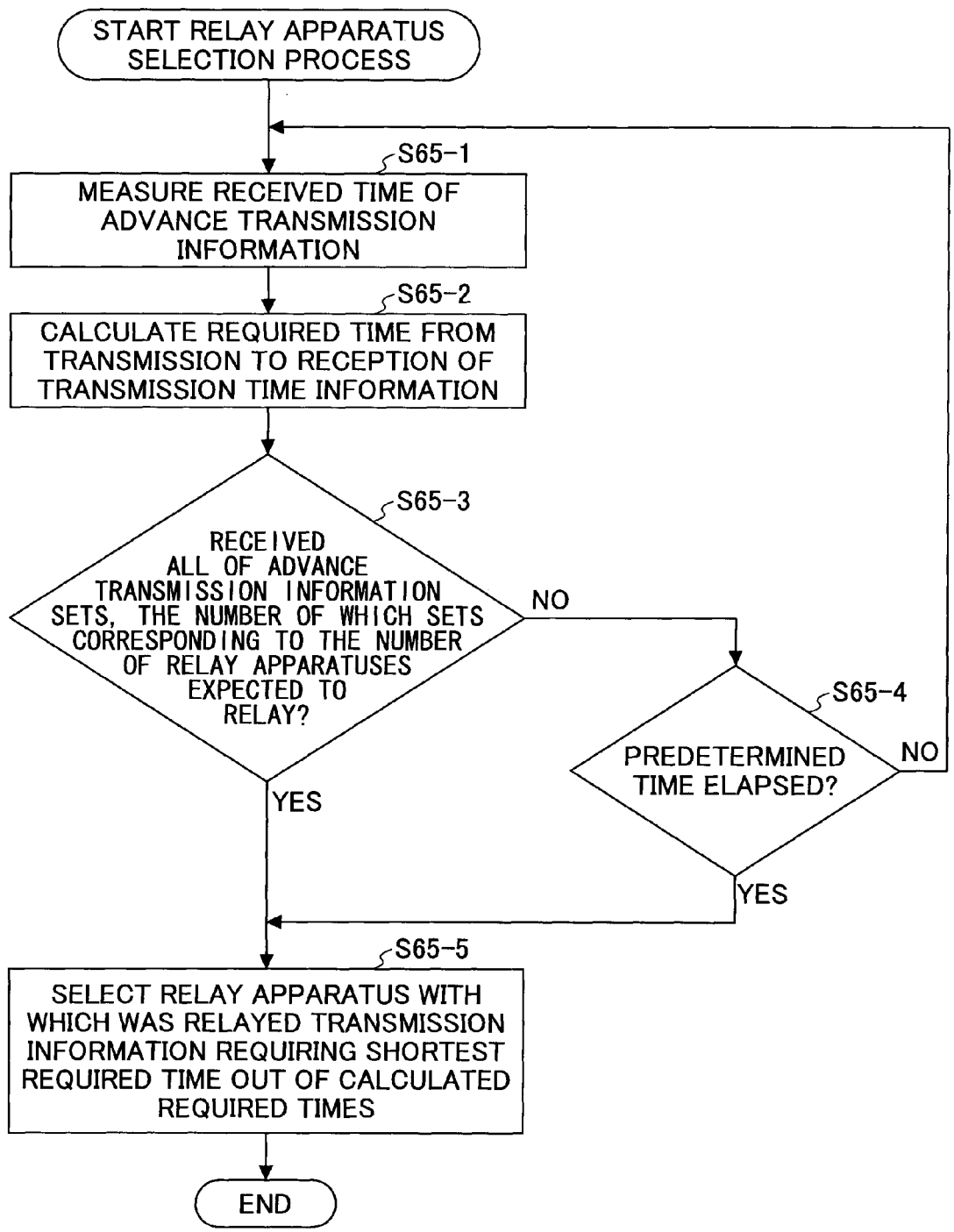
FIG. 22 is a process flow showing a process which selects the relay apparatus at the transmission terminal.
Figure 23:
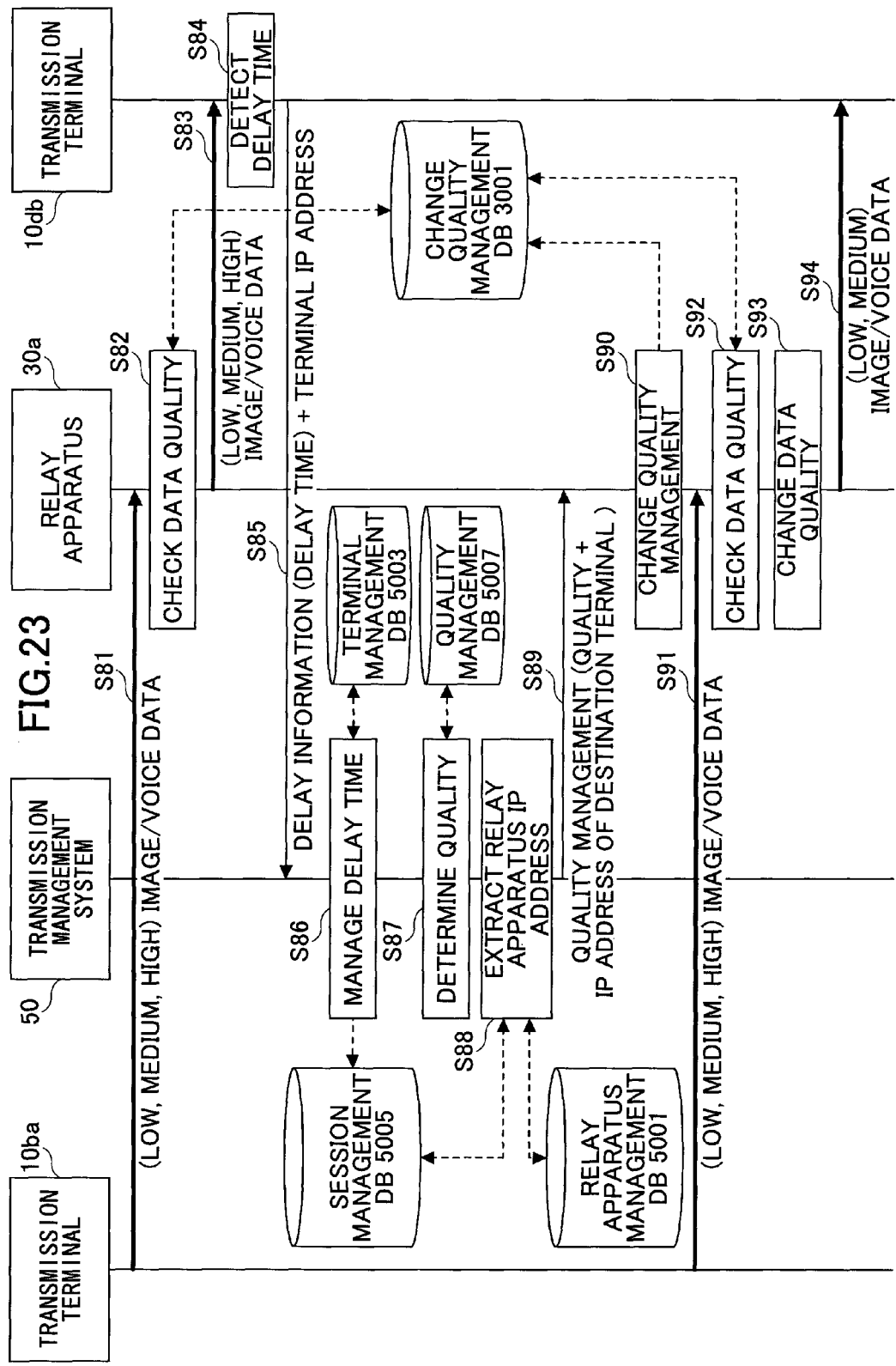
FIG. 23 is a sequence diagram which shows a process of transmitting and receiving image data and voice data between the transmission terminals.
Figure 25:
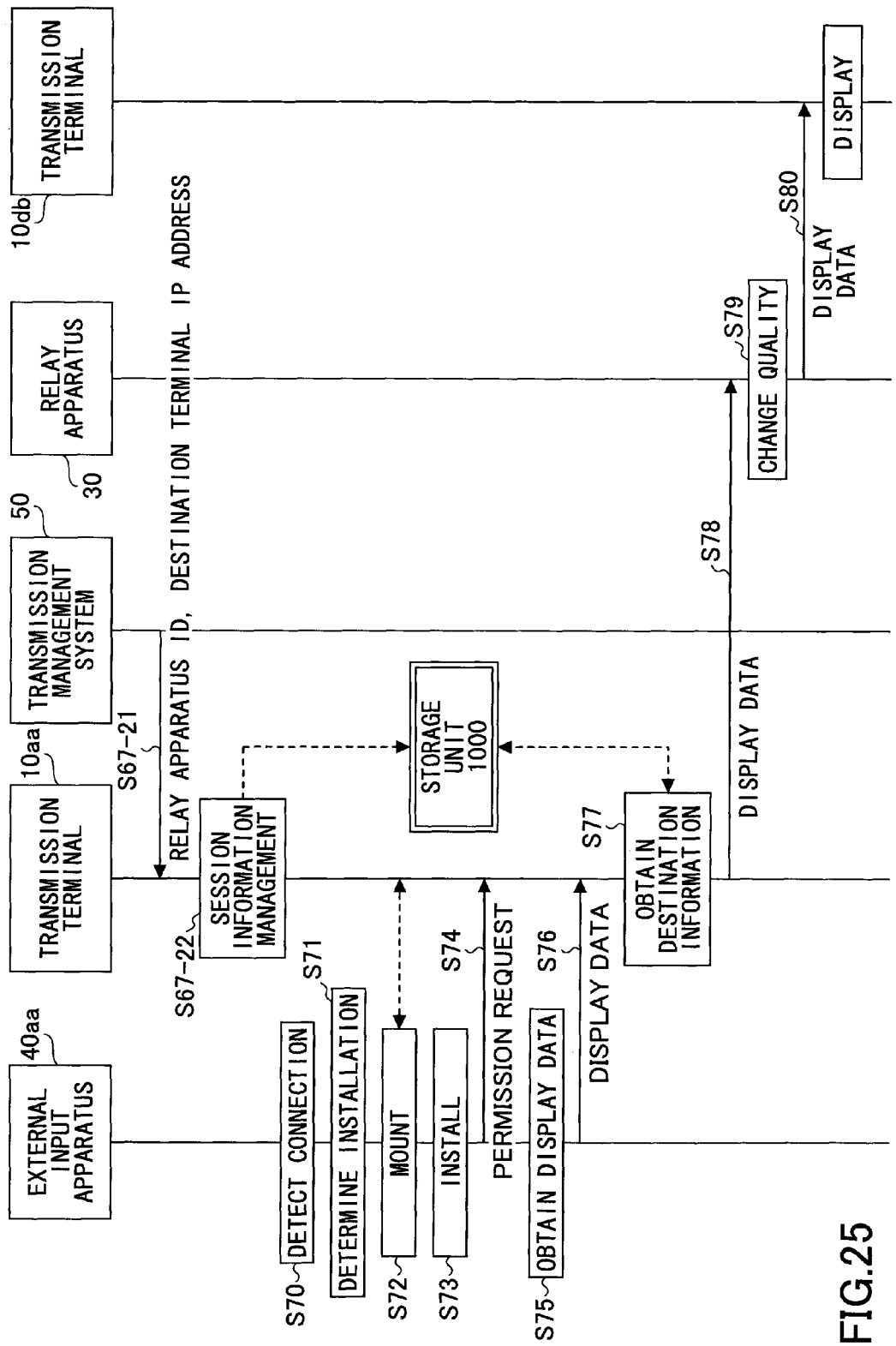
FIG. 25 is a sequence diagram which shows a process which causes display data displayed by the external input apparatus to be displayed at the transmission terminal, which is a counterpart of a conference.
Figure 26:
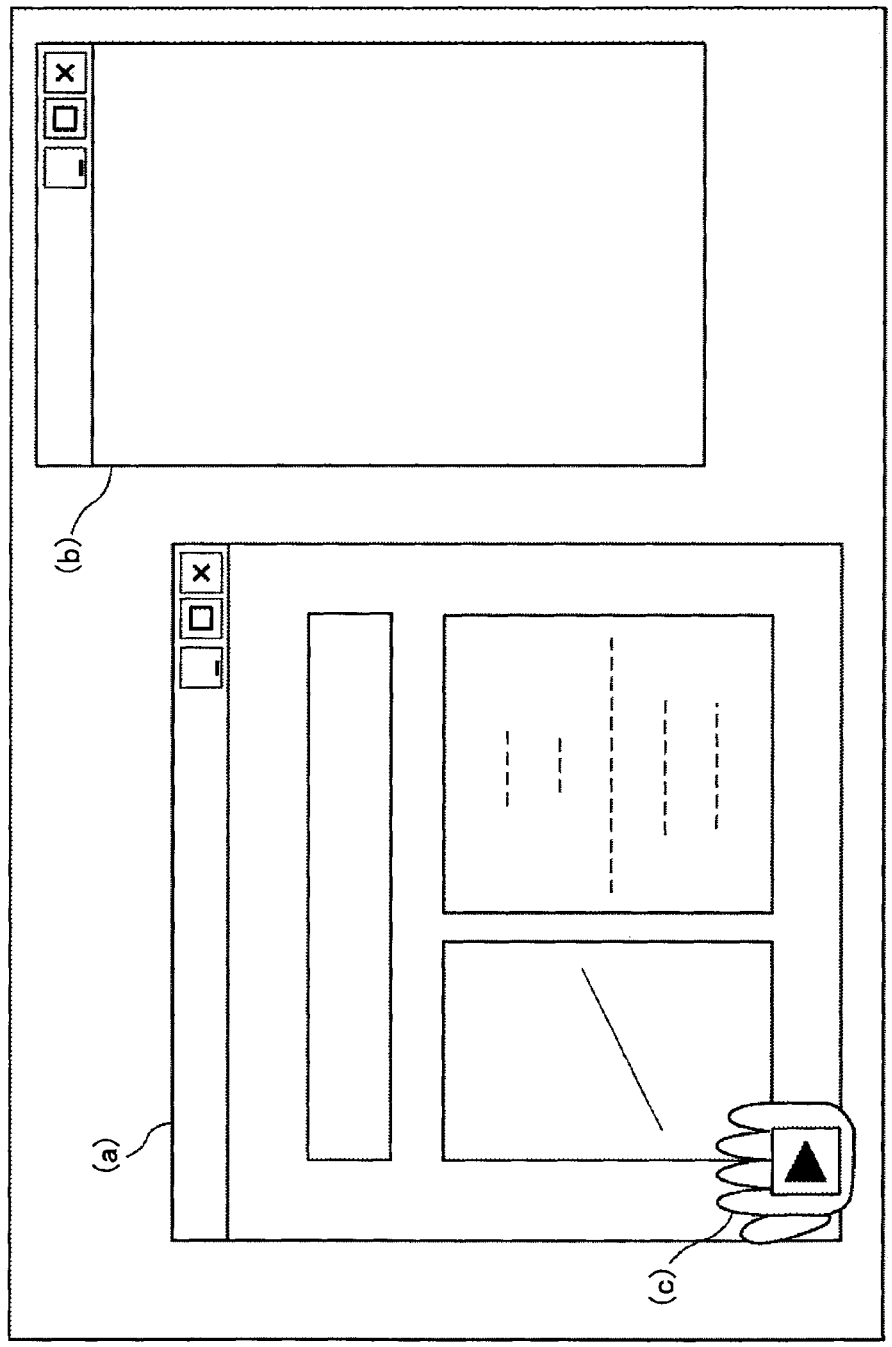
FIG. 26 is an example of a screen displayed by the external input apparatus.
Figure 27:
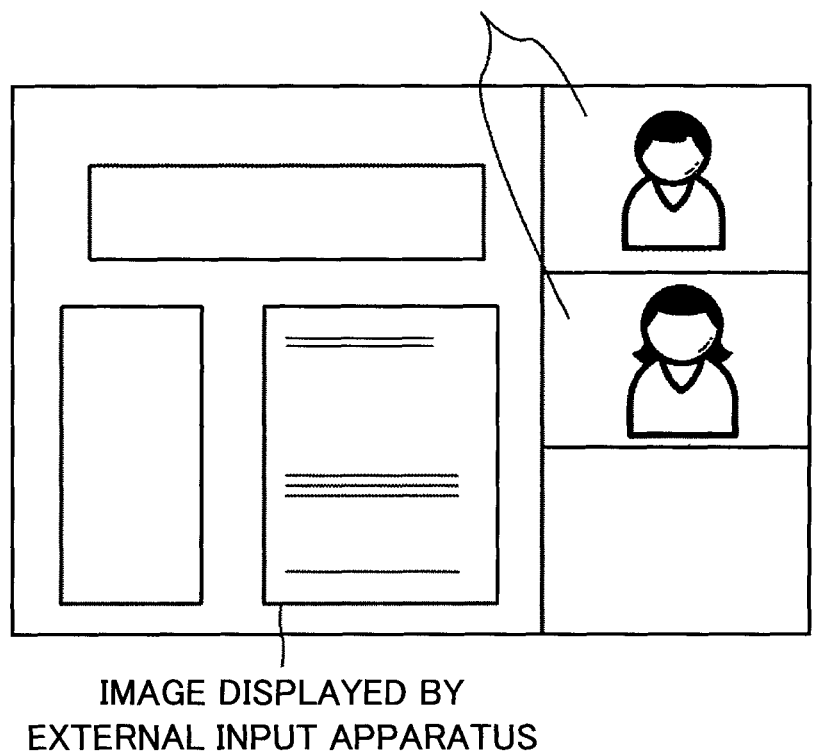
FIG. 27 is an example of the screen on which image data and display data are displayed by the transmission terminal.
Figure 28:
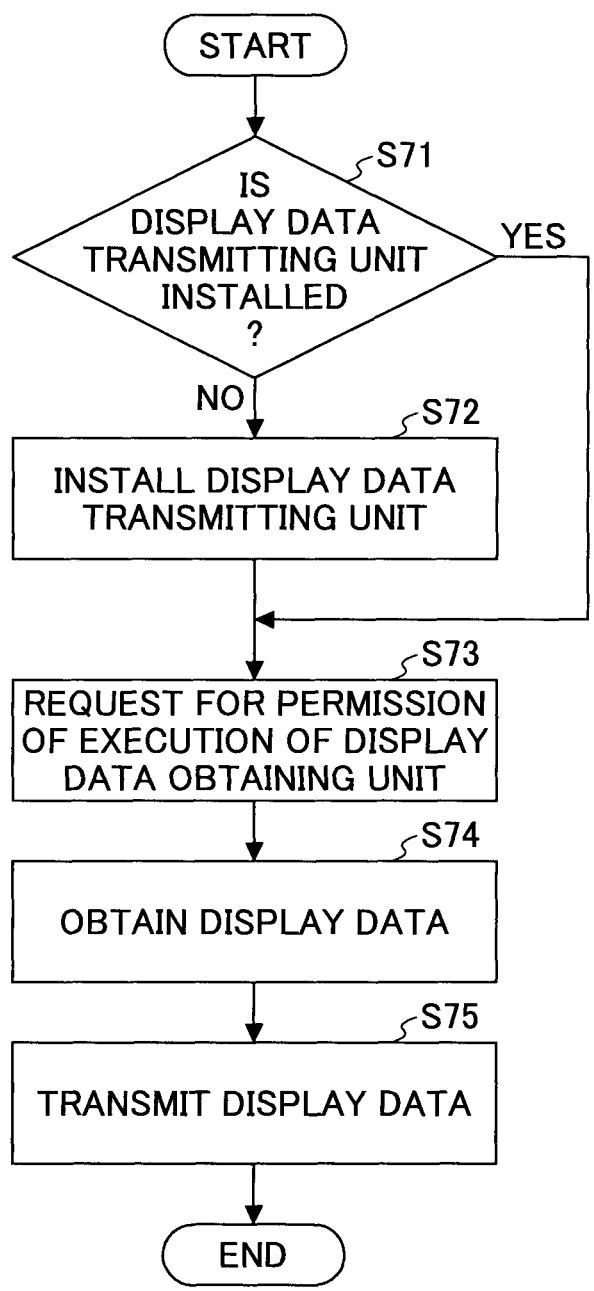
FIG. 28 is a flowchart showing a process in which the external input apparatus installs a display data obtaining unit.

The foregoing provides a description of features and functions of the transmission system 1 according to the present embodiment, and next, a method of processing in the transmission system 1 of the present embodiment is described using FIGS. 16-23, and FIG. 25-28. FIG. 16 is a sequence diagram showing a process of managing state information which indicates a state of each relay apparatus 30 that is transmitted from the relay apparatus 30 to the transmission management system 1. FIG. 17 is a sequence diagram showing a preparation stage process which starts communicating between multiple transmission terminals 10. FIG. 18 is a sequence diagram showing a process which narrows down relay apparatuses 30. FIG. 19 is a sequence diagram showing a process which narrows down relay apparatuses 30. FIG. 20 is a diagram showing a state of computing a point for narrowing down the relay apparatuses 30. FIG. 21 is a sequence diagram showing a process for the transmission terminal 10 to select the relay apparatus 30. FIG. 22 is a process flow diagram showing a process for the transmission terminal 10 to select the relay apparatus 30. FIG. 23 is a sequence diagram which shows a process of transmitting and receiving image data and voice data between the transmission terminals 10. FIG. 25 is a sequence diagram which shows a process which causes display data displayed by the external input apparatus 40 to be displayed by a transmission terminal 10, which is a counterpart of a conference. FIG. 26 is an example of a screen which is caused to be displayed by the external input apparatus 40. FIG. 27 is an example of a screen on which the image data and the display data are displayed by the transmission terminal 10. FIG. 28 is a flowchart showing a process in which the external input apparatus installs a display data obtaining unit.

Now, FIG. 16 is used to describe a process of managing state information indicating a state of each relay apparatus 30 that is transmitted from the relay apparatus 30 to the transmission management system 50. First, at each relay apparatus 30, the state detecting unit 32 shown in FIG. 5B periodically detects an operating state of the relay apparatus 30, which is an own apparatus (S1-1 to S1-4). Then, in order to cause the operating state of the relay apparatus 30 to be managed real time on the transmission management system 50 side, the transmitting and receiving unit 31 of the relay apparatus 30 periodically transmits the state information to the transmission management system 50 via the communications network 2. The respective state information sets include a relay apparatus ID for the relay apparatus 30, and an operating state detected at the state detecting unit 32 of the relay apparatus 30 related to the respective apparatus IDs. In the present embodiment, a case is shown such that the relay apparatuses (30*a*, 30*b*, 30*d*) are operating normally, being "ON line", while the relay apparatus 30*c* is in operation, but is "OFF line", as some failure has occurred in a program which executes a relay operation of the relay apparatus 30*c*.

Next, in the transmission management system 50, the state information set sent from each relay apparatus 30 is received at the transmitting and receiving unit 51, and the state information set is stored, for managing, in the relay apparatus management table (see FIG. 8) of the storage unit 5000 for each relay apparatus ID (steps S3-1-S3-4). In this way, either one operating state of "ON line", "OFF line", or "failed" is stored, for managing, in the relay apparatus management table shown in FIG. 8 for each relay apparatus ID. Moreover, at this time, for each relay apparatus ID, a received date/time at which the state information is received at the transmission management system 50 is also stored for managing. When the state information is not sent from the relay apparatus 30, an operating state field portion and a received date/time field portion in the corresponding record of the relay apparatus management table shown in FIG. 8 become blank or respectively show the operating state and the received data/time as previously received.

Next, using FIG. 17, a process of a preparation stage before starting communications between the transmission terminal 10*aa* and the transmission terminal 10*db* is described. First, when the user turns ON the power switch 109 shown in FIG. 3, the operation input accepting unit 12 shown in FIG. 5B accepts the power ON, so that the power is turned ON (step S21). Then, on receiving the power ON, the log-in requesting unit 13 automatically transmits log-in request information indicating a log-in request to the transmission management system 50 from the transmitting and receiving unit 11 via the communications network 2 (step S22). This log-in request information includes a password and a terminal ID for identifying a transmission terminal 10*aa*, which is an own apparatus as a request originator. These terminal IDs and the passwords are data read from the storage unit 1000 via the storing and reading processing unit 19 and sent to the transmitting and receiving unit 11. When the log-in request information is transmitted from the transmission terminal 10*aa* to the transmission management system 50, the transmission management system 50, which is the receiver, may grasp an IP address of the transmission terminal 10*ab*, which is the transmitter side.

Next, with a terminal ID and a password which are included in the log-in request information received via the transmitting and receiving unit 51 as search keys, the terminal authenticating unit 52 of the transmission management system 50 searches the terminal authentication management table (see FIG. 9) of the storage unit 5000, and determines whether the same terminal ID and password are managed in the terminal authentication management DB 5002 to conduct terminal authentication (step S23). As the same terminal ID and password are managed by the terminal authenticating unit 52, when it is determined to be a log-in request from the terminal apparatus 10 which has a valid usage privilege, the state managing unit 53 stores in the terminal management table (see FIG. 10) the terminal ID of the transmission terminal 10*aa*; the operating state; the received date/time at which the log-in request information is received; and the IP address of the transmission terminal 10*aa* (step S24) in association. In this way, in the terminal management table shown in FIG. 10, the transmission terminal ID "01*aa*", the operating state "ON line"; the received date/time "2009.11.10.13:40"; and the terminal IP address "1.2.1.3" are managed in association.

Then, the transmitting and receiving unit 51 of the transmission management system 50 transmits authentication results information in which are shown authentication results obtained by the terminal authentication unit 52 via the communications network 2 to the request-originating terminal 10*aa*, which made the log-in request (step S25). In the present embodiment, a case is described below where it is determined by the terminal authenticating unit 52 that the terminal is a terminal having a valid usage privilege.

With the terminal ID "01*aa*" of the request-originating terminal 10*aa* which made the log-in request as a search key, the terminal extracting unit 54 of the transmission management system 50 searches a destination list management table (see FIG. 11) and reads and extracts a terminal ID of a candidate for a destination terminal 10B which may communicate with the request-originating terminal 10*aa* (step S26). Here, the respective terminal IDs "01*ab*", "01*ba*", and "01*db*" of the destination terminals (10*ab*, 10*ba*, 10*db*) corresponding to the terminal ID "01*aa*" of the request-originating terminal 10*aa* are extracted.

Next, with the terminal. IDs ("01*ab*", "01*ba*", "01*db*") of the candidates for the destination terminal 10B extracted by the terminal extracting unit 54 as a search key, the terminal state obtaining unit 55 searches the terminal management table (see FIG. 10) to read the operating state ("OFF line", "ON line", "ON line") for each terminal ID extracted in the terminal extracting unit 54, the operating state of the transmission terminal (10*ab*, 10*ba*, 10*db*) is obtained (step S27).

Next, the transmitting and receiving unit 51 transmits destination state information including terminal IDs ("01*ab*", "01*ba*", "01*db*") as search keys used in step S27, and operating states ("OFF line", "ON line", and "ON line") of the corresponding destination terminals (10*ab*, 10*ba*, 10*db*) via the communications network 2 to the request-originating terminal 10*aa* (step S28). In this way, the request-originating terminal 10*aa* may grasp the respective present operating states ("OFF line", "ON line", "ON line") of the transmission terminals (10*ab*, 10*ba*, 10*db*) as candidates for the destination terminal 10B, which may communicate with the request-originating terminal 10*aa*.

Moreover, with the terminal ID "01*aa*" of the request-originating terminal 10*aa* which made the log-in request as a search key, the terminal extracting unit 54 of the transmission management system 50 searches the destination list management table (see FIG. 11) and extracts terminal IDs of other request-originating terminals 10A that have registered the terminal ID "01*aa*" of the one request-originating terminal 10*aa* as candidates of the destination terminal 10B (step S29). In the destination list management table shown in FIG. 11, the terminal IDs of the other request-originating terminals 10A extracted are "01*ab*", "01*ba*", and "01*db*".

Next, with the terminal ID "01*aa*" of the request-originating terminal 10*aa* which made the log-in request as a search key, the terminal state obtaining unit 55 of the transmission management system 50 searches the terminal management table (see FIG. 10) and obtains the operating state of the request-originating terminal 10*aa* which made the log-in request (step S30).

Then, to transmission terminals (10*ba*, 10*db*) with the operating state of "ON line" in the terminal management table (see FIG. 10) of transmission terminals (10*ab*, 10*ba*, 10*db*) related to the terminal ID ("01*ab*", "01*ba*", and "01*db*") extracted in step S29, the transmitting and receiving unit 51 transmits destination state information including the terminal ID "01*aa*" of the request-originating terminal 10*aa* that is obtained in step S30 and the operating state "ON line". When the transmitting and receiving unit 51 transmits the destination state information to the transmission terminals (10*ba*, 10*db*), it refers to the IP addresses of the terminals managed in the terminal management table shown in FIG. 10 based on the respective terminal IDs ("01*ba*", "01*db*"). In this way, each of other destination terminals (10*db*, 10*ba*) which may communicate with, as a destination, the request-originating terminal 10*aa* which made the log-in request may be informed of the operating state "ON line" and the terminal ID "01*aa*" of the request-originating terminal 10*aa* which made the log-in request.

On the other hand, even in the other transmission terminals 10, as in step S21, when the power switch 109 shown in FIG. 4 is turned ON by a user, the operating input accepting unit 12 shown in FIG. 5B accepts the power ON, and the same process as the process of steps S22-31-1 and 31-2 is performed, so that a repeated explanation is omitted.

Next, using FIG. 18, a process of narrowing down the relay apparatuses 30 is described. In the present embodiment, with the destination state information received in step S28, the request-originating terminal 10*aa* may communicate with at least one of transmission terminals (10*ba*, 10*db*) with the operating state of ON line. Now, a case is described below of a user of the request-originating terminal 10*aa* selecting that communications are started with the destination terminal 10*db*.

First, when a user presses an operating button 108 shown in FIG. 3, the operating input accepting unit 12 shown in FIG. 5B accepts a request for starting communications with the transmission terminal 10*db* (step S41). Then, the transmitting and receiving unit 11 of the transmission terminal 10*aa* transmits, to the transmission management system 50, starting request information including a terminal ID "01*db*" of the destination terminal 10*db* and a terminal ID "01*aa*" of the request-originating terminal 10*aa* and indicating a desire to start communications (step S42). In this way, the transmitting and receiving unit 51 of the transmission management system 50 receives the start request information and grasps the IP address "1.2.1.3" of the request-originating terminal 10*aa*, which is the transmitter. Then, based on the terminal ID "01*db*" of the destination terminal 10*db* and the terminal ID "01*aa*" of the request-originating terminal 10*aa* included in starting request information, the state management unit 53 changes field portions of the operating state of the records in which the respective terminal IDs "01*aa*" and "01*db*" are included in the terminal management table (see FIG. 10) to "busy" (step S43). In this state, the request-originating terminal 10*aa* and the destination terminal 10*db* have not started communications (a call), but are in a busy state, so that, when the other transmission terminal 10 tries to communicate with the request-originating terminal 10*aa* or the destination terminal 10*db*, a voice or a display indicating a so-called busy state is output.

Next, a process of executing a session for selecting a relay apparatus 30 is described in steps S44 to S48, and steps S61-1 to S66. First, the unit 56*a* for generating a session ID for selection generates a session ID for selection that is used in executing a session for selecting the relay apparatus 30 (step S44). Then, the session management unit 57 stores, for managing, in the session management table (see FIG. 12) of the storage unit 5000, the session ID "sel" for selecting that is generated in step S44; the terminal ID "01aa" of the request-originating terminal 10aa, and the terminal ID "01db" of the destination terminal 10db in association (step S45).

Next, based on the relay apparatus management DB 5001, the terminal management DB 5003, and the priority management DB 5006, the narrowing down unit 56 of the transmission management system 50 undergoes primary narrowing down of the relay apparatuses 30 for relaying communications between the request-originating terminal 10aa and the destination terminal 10db (step S46).

Here, using FIG. 19, a process in step S46 is further described in detail. First, the terminal IP address extracting unit 56b searches the terminal management table (see FIG. 10) based on the terminal ID "01db" of the destination terminal 10db and the terminal ID "01aa" of the request-originating terminal 10aa that are included in starting communication information sent from the request-originating terminal 10aa to extract the IP addresses ("1.2.1.3", "1.3.2.4") of the corresponding transmission terminals (10aa, 10db) (step S46-1). Next, in step S46-2, the primary selecting unit 56c selects the respective relay apparatus IDs (111a, 111b, 111d) of the relay apparatuses (30a, 30b, 30d) with the operating state being "ON line" out of the operating states of the relay apparatuses managed in the relay apparatus management table (see FIG. 8). Moreover, the primary selecting unit 56c searches the relay apparatus management table (see FIG. 8) based on the IP address "1.2.1.3" of the request-originating terminal 10aa and the IP address "1.3.2.4" of the destination terminal 10db that are extracted in step S46-1 to investigate, for each dot address of the respective IP addresses ("1.2.1.2", "1.2.2.2", "1.3.2.2") of the relay apparatuses (30a, 30b, 30d) selected in step S46-2, whether the dot address is the same as the respective dot address in the respective IP addresses ("1.2.1.3", "1.3.2.4") of the request-originating terminal 10aa and the destination terminal 10db (step S46-3).

Next, in step S46-4, with reference to the priority management table (see FIG. 13), the priority determining unit 57c determines address priority points for each relay apparatus (30a, 30b, 30d) investigated in step 46-3. Indicating results of the determining process in a table looks like what is shown in FIG. 20. FIG. 20 is a diagram showing a state of computing priority points for narrowing down the relay apparatuses 30. In FIG. 20, address priority points, transmission speed priority points, and combined points are indicated for each relay apparatus ID. Moreover, for the address priority points are shown points relative to the destination terminal 10db and points relative to the request-originating terminal 10aa of each relay apparatus 30. The combined points are a sum of higher points of the two address priority points, and the transmission speed priority points.

In the present embodiment, the IP address "1.2.1.2" of the relay apparatus 30a is "same, same, same, different" relative to the IP address "1.2.1.3" of the request-originating terminal 10aa, so that the address priority points become "5" as shown in FIG. 20. Moreover, the IP address "1.2.1.2" of the relay apparatus 30a is "same, different, different, different" relative to the IP address "1.3.2.4" of the request-originating terminal 10db, so that the address priority point becomes "1". Furthermore, the IP address "1.2.2.2" of the relay apparatus 3ba is "same, same, different, different" relative to the IP address "1.2.1.3" of the request-originating terminal 10aa, so that the address priority points become "3". Moreover, the IP address "1.2.2.2" of the relay apparatus 30b is "same, different, same, different" relative to the IP address "1.3.2.4" of the request-originating terminal 10db, so that the address priority point becomes "1". Furthermore, the IP address "1.3.2.2" of the relay apparatus 30d is "same, different, different, different" relative to the IP address "1.2.1.3" of the request-originating terminal 10aa, so that the address priority point becomes "1". Furthermore, the IP address "1.3.2.2" of the relay apparatus 30d is "same, same, same, different" relative to the IP address "1.3.2.4" of the destination terminal 10db, so that the address priority points become "5".

Next, returning to FIG. 19, in step S46-5, the priority determining unit 57d searches the priority management table (see FIG. 14) based on the maximum data transmission speed of the respective relay apparatuses 30 managed in the relay apparatus management table (see FIG. 8) to determine the transmission speed priority points for each relay apparatus (30a, 30b, 30d) narrowed down in a primary narrowing down process in step S46-2. In the present embodiment, as shown in FIG. 8, the maximum data transmission speed of the relay apparatus 33a is 100 Mbps, so that, with reference to the transmission speed priority shown in FIG. 14, the transmission speed priority becomes points. Similarly, computing the maximum data transmission speed of the relay apparatus 30b yields 1000 Mbps, so that the transmission speed priority becomes 5 points. Similarly, computing the maximum data transmission speed of the relay apparatus 30d yields 10 Mbps, so that the transmission speed priority becomes 1 point.

Next, for each relay apparatus (30a, 30b, 30d), the primary selecting unit 56c selects relay apparatuses with the two highest combined points, each of which combined points is a combination of the transmission speed priority points and a higher of the address priority points for the transmission terminals (10aa, 10db). In the present embodiment, as shown in FIG. 20, the relay apparatus IDs (111a, 111b, 111d) have the respective combined points of "8", "8", and "6", so that the relay apparatus 30a related to the relay apparatus ID "111a" and the relay apparatus 30b related to the relay apparatus ID "111b" are selected.

When the narrowing down process in step S46 is completed, the transmitting and receiving unit 51 shown in FIG. 5A transmits relay apparatus narrowing down information for communicating the number of the narrowed down relay apparatuses 30 to the destination terminal 10db via the communications network 2. The relay apparatus narrowing down information includes the number "2" of relay apparatuses 30 narrowed down in step S46; the terminal ID "01aa" of the request-originating terminal 10aa and the session ID for selection "sel". In this way, in executing a session in the session ID for selection "sel", the transmission terminal 10db may grasp what the number of relay apparatuses 30 is and from which transmission terminal 10 a request was made to start teleconferencing, as well as the IP address "1.1.1.2" of the transmission management system 50, which is the transmitter of the relay apparatus narrowing down information.

Then, the transmission terminal 10db transmits reception completion information indicating that reception of the relay apparatus narrowing down information is completed to the transmission management system 50 via the communications network 2 from the transmitting and receiving unit 11. The reception completion information includes a session ID "sel". In this way, the transmission management system 50 may grasp that communication of the number of relay apparatuses executed with the session ID "sel" has been completed as well as the IP address "1.3.2.4" of the destination terminal 10db, which is the transmitter.

Next, using FIG. 21, a process of the destination terminal 10aa selecting the relay apparatus 30 is described. First, in steps S61-1 and S61-2, the transmission management system 50 transmits advance relay request information that a relay is requested in advance to each of the relay apparatuses (30a, 30b) narrowed down in step S46. The advance relay request information includes the session ID "sel"; the IP address "01aa" of the request-originating terminal 10aa; and the destination terminal 10db. In this way, the relay apparatuses (30a, 30b) may grasp which session for selection, which request-originating terminal 10A and which destination terminal 10B, as well as the IP address "1.1.1.2" of the transmission management system 50, which is the transmitter of the advance relay request information.

Next, in steps S62-1 and S62-2, each of the relay apparatuses (30a, 30b) transmits advance transmission request information indicating that advance transmission information including the below-described ping (packet internet groper) be transmitted to each of the relay apparatuses (30a, 30b) as an own apparatus before starting teleconferencing to the request-originating terminal 10aa grasped in steps S61-1 and S61-2. The advance transmission information includes a session ID "sel". In this way, in a process of selecting the relay apparatuses executed with the session ID "sel", the request-originating terminal 10aa may grasp that advance transmission information is to be transmitted to the respective relay apparatuses (30a, 30b) as well as the IP addresses ("1.2.1.2", "1.2.2.2") of the relay apparatuses (30a, 30b), which are the transmitters of the advance transmission request information.

The reason that the IP address of the destination terminal 10db is not directly reported from the transmission management system 50 to the request-originating terminal 10ba, but, as in step S61-1, the IP address of the destination terminal 10db is reported to the relay apparatus 10aa, and as in step S61-2, is that the relay apparatus 10aa requests the request-originating terminal 10ba to transmit the advance transmission request information to the own apparatus (the relay apparatus 10aa) to ensure that one transmission terminal 10 does not become aware of the IP addresses of the other transmission terminals 10 to maintain security.

Next, in steps S63-1 and S63-2, the request-originating terminal 10aa transmits advance transmission information to the relay apparatuses (30a, 30b) via the communications network 2 from the transmitting and receiving unit 11. The advance transmission information is information which is transmitted to the destination terminal 10db via each relay apparatus (30a, 30b) instead of the image data and the voice data prior to transmission of the image data and the voice data so as to be used for measuring required time from transmission at the request-originating terminal 10aa to reception at the destination terminal 10db. Moreover, the advance transmission information includes pinging to check that the request-originating terminal 10aa, the relay apparatuses (30a, 30b), and the destination terminal 10db are communicatively connected; a transmitted date/time at which the advance transmission information was transmitted from the request-originating terminal 10aa; and the session ID "sel". In this way, in executing a session in the session ID "sel" for selection, the respective relay apparatuses (30a, 30b) may grasp that the advance transmission information has been sent to them, and may grasp the IP address "1.2.1.3" of the request-originating terminal 10aa, which is the transmitter of the advance transmission information.

Next, in steps 64-1 and S64-2, the respective relay apparatuses (30a, 30b) relay the advance transmission information to the IP address "1.3.2.4" of the destination terminal 10db included in the advance relay request information received in steps S61-1 and S61-2. In this way, in executing a session in the session ID "sel" for selection, the destination terminal 10db may grasp that the advance transmission information has been sent thereto, and may grasp the IP addresses ("1.2.1.2" and "1.2.2.2") of the relay apparatuses (30a, 30b), which are the transmitters (which are the relay originating parties) of the advance transmission information.

Next, based on the advance transmission information, the selection processing unit 16 of the destination terminal 10db finally narrows down the one relay apparatus 30 which relays image data and voice data in a teleconference (step 65).

Here, using FIGS. 5 and 25, a process in step S65 is further described in detail. First, for advance transmission information sets relayed by the respective apparatuses (30a, 30b), a measuring unit 16a of the selection processing unit 16 shown in FIG. 5B measures a received date/time at which the advance transmission information sets are received at the transmitting and receiving unit 11 of the transmission terminal 10db (step S65-1). Next, for the advance transmission information sets for which the received time/date is measured, the computing unit 16b computes a time required from transmission to reception of each of the advance transmission information sets based on a difference between the above-described received date/time, and the above-described transmitted date/time included in the advance transmission information sets (step S65-2). Next, in executing a session in the session ID "sel", it is determined whether all of advance transmission information sets, the number of which corresponds to "2" of the relay apparatuses 30 which are expected to relay them, have been received (step 65-3). Then, if not all of the advance transmission information sets have been received (NO), the selecting unit 16c determines whether a certain time (here, one minute) has elapsed since receiving the advance transmission information at the transmission terminal 10db (step S65-4). Furthermore, if the certain time has not elapsed (NO), the process returns to step S65-1. On the other hand, if all have been received (YES) in step S65-3 or if the certain time has elapsed (YES) in step S65-4, the selecting unit 16c selects one relay apparatus 30 which relayed advance transmission information which required the shortest required time of required times computed by the calculating unit 16b (step S65-5). In the present embodiment, an example is shown such that the relay apparatus 30a is selected as a required time from transmission to reception is shorter for the advance transmission information relayed by the relay apparatus 30a than that for advance transmission information relayed by the relay apparatus 30b.

While the above-described embodiment narrows down the relay apparatus 30a on the destination terminal 10db side, it is not limited thereto, so that it may be arranged for the destination terminal 10db to transmit, to the request-originating terminal 20aa or the transmission management system 50, all of required time information sets which indicate a required time from transmission to reception of the advance transmission information to eventually narrow down to one relay apparatus 30a on the request-originating terminal 10aa side or the transmission management system 50 side.

Next, the destination terminal 10db transmits selection information indicating that the relay apparatus 30a has been selected to the transmission management system 50 via the communications network 2 from the transmitting and receiving unit 11 (step S66). This selection information includes the session ID "sel" and the relay apparatus ID "111a" of the selected relay apparatus 30a. In this way, in executing a session in the session ID "sel", the transmission management system 50 may grasp that the relay apparatus 30a has been selected as well as the IP address "1.3.2.4" of the destination terminal 10db, which is the transmitter of the selection information.

Next, the session managing unit 57 of the transmission management system 50 stores, for managing, the relay apparatus ID "111a" of the relay apparatus 30a, which is the one eventually selected in a relay apparatus ID field portion of a record in which the session ID "sel" for selection is included in a session management table (see FIG. 12) of the session management DB 5005 (step S67-1); and the transmitting and receiving unit 51 transmits the replay apparatus ID "111*a*" and the IP address "1.3.2.4" of the destination terminal 10*db* to the request-originating terminal 10*aa* (steps S67-71). Then, the transmitting and receiving unit 51 of the transmission management system 50 transmits relay starting request information which indicates a request to start relaying via the communications network 2 to the relay apparatus 30*a* (step S68). The relay starting request information includes the respective IP addresses ("1.2.1.3" and "1.3.2.4") of the request-originating terminal 10*aa* and the destination terminal 10*db* for relaying. In this way, the relay apparatus 30*a* establishes a session for communicating with voice data and three image data sets of low, medium, and high resolutions between the transmission terminals (10*aa*, 10*db*). In this way, the transmission terminals (10*aa*, 10*db*) may start teleconferencing.

While the selection process of the relay apparatuses (step S65) is conducted on the destination terminal 10*db* side via steps S48 to S64-1, and S64-2 in conjunction with the transmission management system 50 transmitting the relay apparatus narrowing down information to the destination terminal 10*db* in step S47, it is not limited thereto; thus, it may be arranged for the transmission management system 50 to transmit relay apparatus narrowing down information to the relay-originating terminal 10*aa*, so that, subsequently, up to steps S64-1 and S64-2, the transmitter and the receiver of each information set may be interchanged between the request-originating terminal 10*aa* and the destination terminal 10*db*. In this way, the request-originating terminal 10*aa* may conduct a process of selecting a relay apparatus in lieu of step S65 and may also transmit selection information in lieu of step S66.

Next, using FIGS. 5 and 23, a process is described of transmitting and receiving image data and voice data in order to conduct teleconferencing between the request-originating terminal 10*aa* and the destination terminal 10*db*. First, the request-originating terminal 10*aa* transmits image data of a subject imaged at the imaging unit 14*a* and voice data of a voice input at the voice input unit 15*a* to the relay apparatus 30*a* via the communications network 2 from the transmitting and receiving unit 11 (step S81). In the present embodiment, voice data and image data of high image quality that include low resolution, medium resolution, and high resolution shown in FIGS. 6A, 6B, and 6C are transmitted. In this way, in the relay apparatus 30*a*, the transmitting and receiving unit 31 receives voice data and image data of above-described three resolutions. Then, with the IP address "1.3.2.4" of the destination terminal 10*db* as a search key, the data quality checking unit 33 searches the change quality management table (see FIG. 7) and extracts corresponding image quality of image data relayed to check the quality of the image of the image data relayed (step S82). In the present embodiment, the checked image quality of the image of the image data is "high image quality", which is the same as the image quality of the image data that is received at the transmitting and receiving unit 31, so that the image data with the image quality kept as it is and the voice data with the sound quality kept as it is are transferred to the destination terminal 10*db* (step S83). In this way, the destination terminal 10*db* may receive voice data and image data at the transmitting and receiving unit 11, the image display control unit 14*b* may cause an image based on the image data to be displayed on the display 120, and the voice output unit 15*b* may cause voice based on the voice data to be output.

Next, the delay detecting unit 17 of the transmission terminal 10*db* detects, for each specific time period (for example, every second), a delay time of receiving image data received at the transmitting and receiving unit 11 (Step S84). In the present embodiment, explanations are continued below for a delay time of 200 ms.

The transmitting and receiving unit 11 of the destination terminal 10*db* transmits delay information indicating a delay time "200 ms" to the transmission management system 50 via the communications network 2 (step S85). In this way, the transmission management system 50 may grasp the delay time and grasp the IP address "1.3.2.4" of the transmission terminal 10*db*, which is the transmitter of delay information.

Next, with the IP address "1.3.2.4" of the destination terminal 10*db* as a search key, the delay time management unit 60 of the transmission management system 50 searches the terminal management table (see FIG. 10) to extract the corresponding terminal ID "01*db*", and stores, for managing, the delay time "200 ms", shown in the above delay information in a delay time field portion in a record of the terminal ID "01*db*" in the session management table (see FIG. 12) of the session management DB 5005 (step S86).

Next, with the delay time "200 ms" as a search key, the quality determining unit 58 searches the quality management table (see FIG. 15) and extracts an image quality "medium image quality" of the corresponding image data to determine an image quality of image data for as "medium image quality" (step S87).

Next, with a relay apparatus ID "111*a*", which is associated with the terminal ID "01*db*" in the session management table (see FIG. 12), as a search key, the transmitting and receiving unit 51 searches the relay apparatus management DB table (see FIG. 8), and extracts the IP address "1.2.1.2" of the corresponding relay apparatus 30*a* (step S88). Then, in step S89, the transmitting and receiving unit 51 transmits quality information indicating an image quality "a medium image quality" of the image data that is determined in step S87 to the relay apparatus 30*a* via the communications network 2. This quality information includes the IP address "1.3.2.4" of the destination terminal 10*db* used as the search key in step S86. In this way, in step S90, in the relay apparatus 30*a*, the change quality management unit 34 stores, for managing, the image quality "medium image quality" of the image data relayed and the IP address "1.3.2.4" of the transmission terminal 10 of the transmitting destination (here, the destination terminal 10*db*) in association in the change quality management table (see FIG. 7).

Next, in a manner similar to step S81, the transmission terminal 10*aa* transmits voice data and image data of high image quality which includes the three image qualities of low, medium, and high to the relay apparatus 30*a* (step S91). In this way, in a manner similar to step S82, with the IP address "1.3.2.4" of the destination terminal 10*db* as a search key, the relay apparatus 30*a* searches the change quality management table (see FIG. 7) and extracts corresponding image quality "medium image quality" of image data relayed to check the quality of the image of the image data relayed (step S92). In the present embodiment, the checked image quality of the image data, which is "medium image quality" and which becomes lower than the image quality "the high image quality" of the image data received at the transmitting and receiving unit 31, so that the data quality changing unit 35 lowers the image quality of the image data from "high image quality" to "medium image quality" to change the quality of the image in the image data (step S93). Then, the transmitting and receiving unit 31 transmits image data in which the image quality of the image data is changed to "medium image quality" and voice data in which sound quality of the voice is not changed to the transmission terminal 10*db* via the communications network 2. In this way, when a reception delay occurs at the destination terminal 10*db* which receives image data, the relay apparatus 30*a* may change quality of image and ensure that a participant in the teleconferencing does not feel uncomfortable.

Next, FIG. 25 is used to describe a process of sharing the whole screen on which is displayed documents data stored in the storage unit 4000 of the external input apparatus 40 after the relay apparatus 30 is determined. Here, an example is described of causing the transmission terminal 10*db*, which is a destination terminal, to display information displayed by the external input apparatus 40*aa* which is connected to the transmission terminal 10*aa*.

As described above, when the relay apparatus 30 is determined, the IP address "1.3.2.4" of the destination terminal 10*db* and the relay apparatus ID "111*a*" that are transmitted by the transmission management system 50 in step S67-21 are received by the transmitting and receiving unit 11 of the transmission terminal 10*aa*, and the storing and reading processing unit 19 causes the received IP address "1.3.2.4" and relay apparatus ID "111*a*" to be stored in the storage unit 1000 (step S67-22).

Moreover, the connection detecting unit 42 of the external input apparatus 40*aa* detects when the external input apparatus 40*aa* and the transmission terminal 10*aa* are mutually connected (step S70). As shown in FIG. 28, when the connection detecting unit 42 detects that the external input apparatus 40*aa* and the transmission terminal 10*aa* are mutually connected, the installation determining unit 43 determines whether the display data transmitting unit 452 has already been installed (step S71). In step S71, if it is determined that the display data transmitting unit 452 has not been installed, the program obtaining unit 44 obtains and installs the data transmitting unit 452 stored in the transmission terminal 10*aa* (step S72). In step S72, when the display data transmitting unit 452 is installed, the external input apparatus 40*aa* requests the transmission terminal 01*aa* for permission for the display data obtaining unit 451 to execute the process (step S73). When the transmission terminal 10*aa* gives the external input apparatus 40*aa* the permission for executing the process of the display data obtaining unit 451, the display data obtaining unit 451 obtains the display data (step S74). Next, the display data transmitting unit 452 transmits the display data obtained by the display data obtaining unit 451 to the transmission terminal 10*aa* (step S75).

If it is determined in step S71 that the display data transmitting unit 452 has been installed, the process moves to step S73 and beyond.

When the external information transmitting and receiving unit 18 of the transmission terminal 10*aa* receives the display data, the storing and reading processing unit 19 obtains the IP address "1.3.2.4" of the transmission terminal 10*db* to be the destination and the relay apparatus ID "111*a*" stored in the storage unit 1000 (step S77). Then, in step S78, the transmitting and receiving unit 11 transmits the IP address "1.3.2.4" of the transmission terminal 10*db* to be the destination and the display data to the relay apparatus 30 shown with the relay apparatus ID "111*a*" which is obtained in step S77. When the display data transmitted from the transmission terminal 10*aa* is received in step S78, the relay apparatus 30, based on the IP address "1.3.2.4" of the transmission terminal 10*db*, changes the quality of the display data (step S79) and transmits the display data to the transmission terminal 10*db* (step S80). Details of the process in step S77 are the same as the process (steps S81-S94) of changing the quality of the image data and the voice data as described above, so that a repeated explanation is omitted. When the transmitting and receiving unit 11 of the transmission terminal 10*db* receives the display data transmitted from the relay apparatus 30, the image display control unit 14*b* is displayed. In the example shown in FIG. 27, the image displayed with the external input apparatus 40*aa* is displayed on the left portion of the screen based on the display data, and image data imaged by the imaging unit 14*a* of the transmission terminal 10*aa* and transmitted by the transmitting and receiving unit 11 are displayed on the upper right-hand side of the screen. Moreover, image data imaged by the imaging unit 14*a* of the transmission terminal 10*db* are displayed on the lower-right of the screen.

Process and Operation of Display Control

Figure 31A:
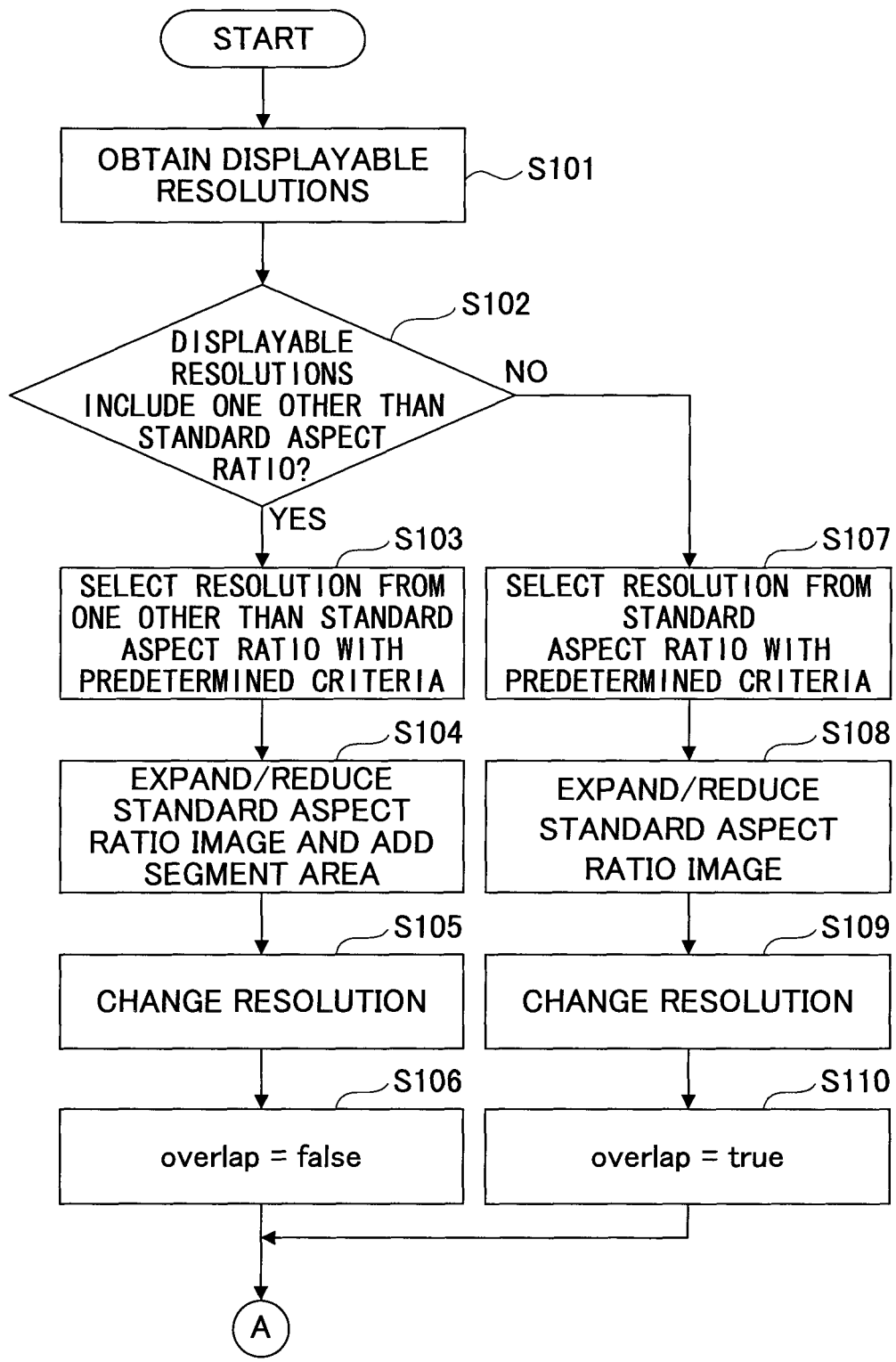
FIGS. 31A and 31B are flow diagrams illustrating an exemplary process of resolution control.
Figure 31B:
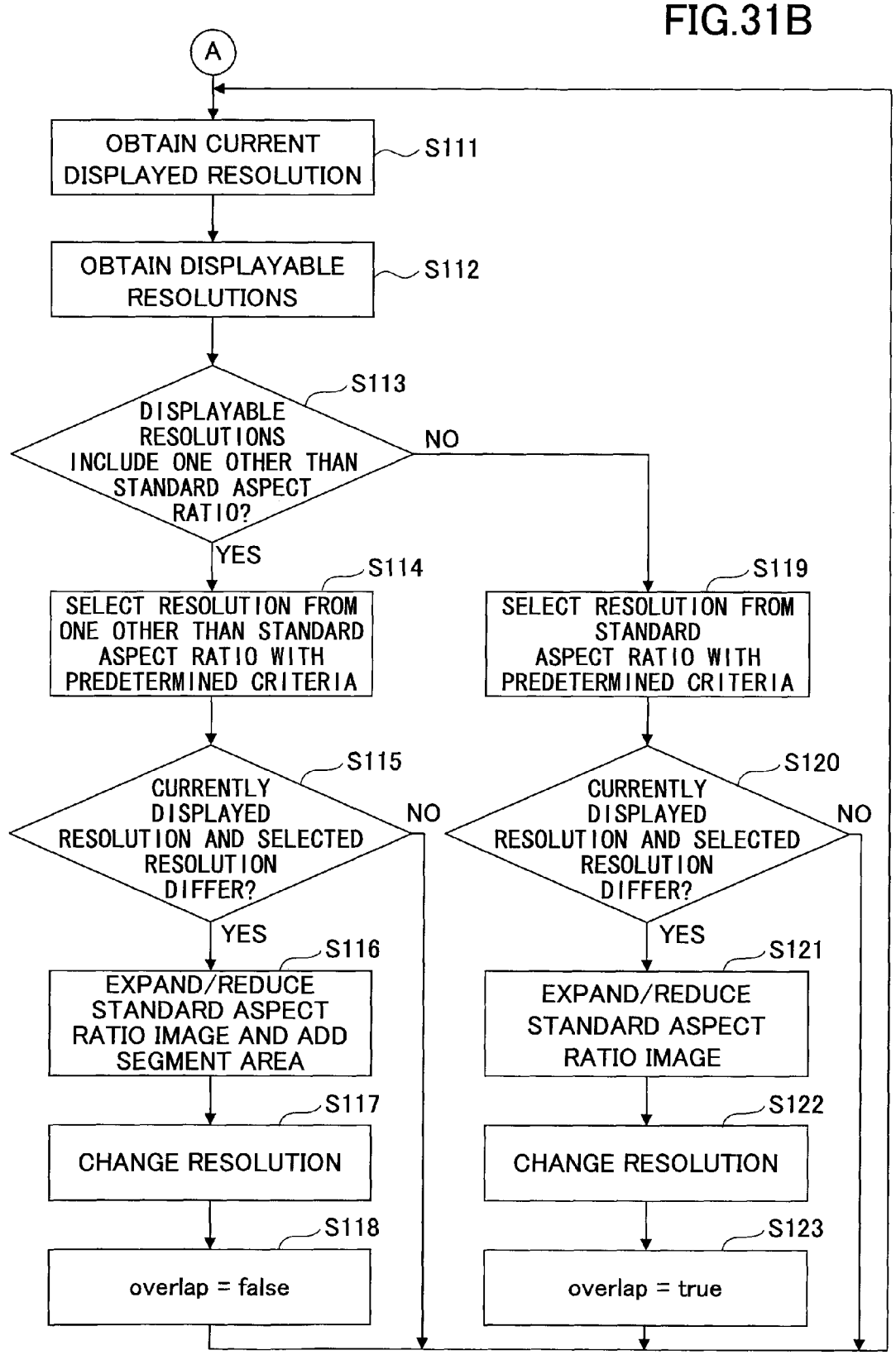

FIGS. 31A and 31B are flow diagrams which show an exemplary process of resolution control by the image display control unit 14*b* of the transmission terminal 10.

In FIG. 31A, when the process is started with a power ON of the transmission terminal 10, the resolution obtaining unit 14*b*10 of the image display control unit 14*b* accesses the display 120 to obtain displayable resolutions (step S101).

Next, the resolution determining unit 14*b*11 determines whether a resolution other than a standard aspect ratio (e.g., 16:9; resolution of 1280×720) used in transmitting image data between the transmission terminal 10 and the relay apparatus 30 is included in the displayable resolutions (step S102). The reason for determining whether a resolution other than the standard aspect ratio is included is, if possible, to allow selecting a resolution other than the standard aspect ratio and adding a segment area for displaying auxiliary information.

If resolutions other than the standard aspect ratio are included (Yes in step S102), the resolution selecting unit 14*b*12 selects a resolution from the resolutions other than the standard aspect ratio in accordance with predetermined criteria (step S103). As the predetermined criteria, various criteria may be used such as a priority selection of the highest resolution (one with the maximum width×height value); a priority selection of a resolution with a specific aspect ratio (8:5, for example); a selection of the resolution suitable for the size or the number of characters of the auxiliary information; a user definition of a resolution to be prioritized (e.g., WXGA (1280×800), XGA (1024×768)), etc.

Next, the image processing unit 14*b*13 expands or reduces image data internally generated with the standard aspect ratio to a selected resolution and adds a segment area (step S104). More specifically, the image processing unit 14*b*13 conducts the process as follows: First, an image before conversion is symmetrically expanded or reduced such that a width thereof matches that of the image after the conversion. When the width before the conversion is the same as the width after the conversion, expansion or reduction is not conducted (in other words, an enlargement rate or a reduction rate of 1). Next, a height of the image after the expansion or reduction is investigated, and a segment area is added to a lower end of the image after the expansion or reduction such that it becomes a height after the conversion. The position at which the segment area is added is not limited to the lower end, so that it may be added to an upper end, or a segment area with half the height may be added to the upper and lower ends of the image.

Figure 32B:
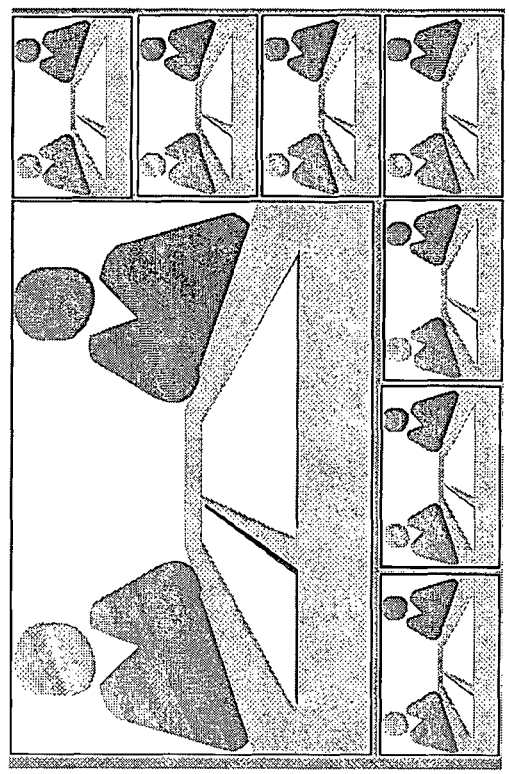
FIGS. 32A and 32B are exemplary screens when a segment area is added and when the segment area is not added.
Figure 32A:
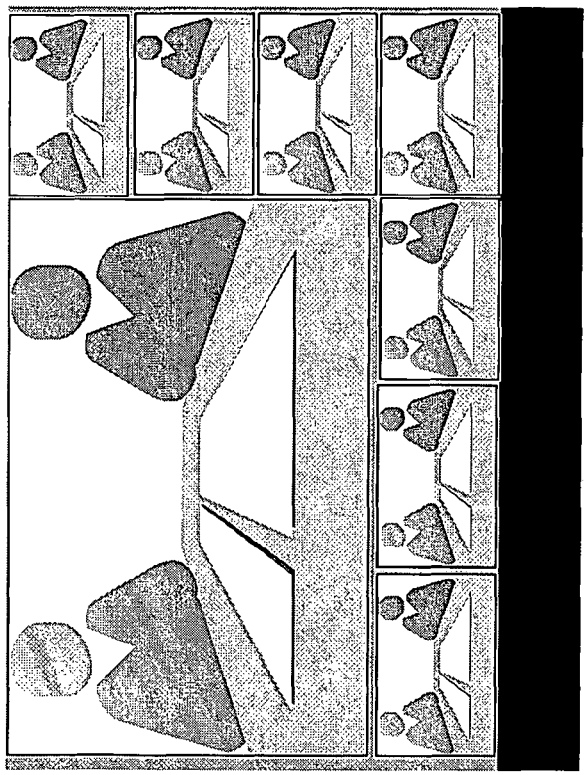

FIG. 32A, which is an example of a case such that a resolution with an aspect ratio of 8:5 is selected against image data with the standard aspect ratio of 16:9, indicates a state in which one segment area is added as shown at the lower end of the image data in black. The original image data of 16:9 ratio are image data of 8 locations including an own location that are received from relay apparatuses and combined with the resolution of 1280×720. Moreover, FIG. 35A, which is an example of a case such that a resolution with an aspect ratio of 4:3 is selected against image data with the standard aspect ratio of 16:9, indicates a state in which two segment areas are added at the corresponding upper and lower ends of the image data.

Next, returning to FIG. 31A, the resolution changing unit 14b15 changes the resolution of the display 120 to the resolution selected (step S105). With this process, the display 120 is displayed with a changed resolution.

Next, the flag setting unit 14b14 sets an overlap flag to false (step S106). This flag is referred to when the image display control unit 14b detects an error, etc., to perform display control of auxiliary information which is different from current displayed image data. A value of overlap takes a value of true when the auxiliary information is caused to be displayed such that it overlaps image data, and takes a value of false when it is controlled such that it does not overlap. Details of the process of controlling the auxiliary information are described below.

On the other hand, if the resolutions other than the standard aspect ratio are not included (No in step S102), the resolution selecting unit 14b12 selects a resolution from the standard aspect ratio using the predetermined criteria (step S107). The predetermined criteria are the same as in step S103.

Next, the image processing unit 14b13 expands or reduces image data internally generated with the standard aspect ratio to a selected resolution (step S108). This case represents an expansion or reduction with the aspect ratio being the same, so that no blank area occurs in either direction of width and height of the image data, so that the segment area is not added. FIG. 32B shows an exemplary screen which is expanded and reduced without the segment area being added.

Next, returning to FIG. 31A, the resolution changing unit 14b15 changes the resolution of the display 120 to the resolution selected (step S109).

Next, the flag setting unit 14b14 sets the overlap flag to true (step S110).

The foregoing shows an initial process at the time of a power ON of the transmission terminal 10. Thereafter is shown a loop process for responding when the display 120 is replaced after the power ON.

The resolution obtaining unit 14b10 accesses the display 120 to obtain the resolution which is presently being displayed (step S111).

Next, the resolution obtaining unit 14b10 accesses the display 120 to obtain the displayable resolution (step S112).

Next, the resolution determining unit 14b11 determines whether the resolutions other than the standard aspect ratio (16:9, for example) used in transmitting image data between the transmission terminal 10 and the relay apparatus 30 are included in the displayable resolutions (step S113).

If the resolutions other than the standard aspect ratio are included (Yes in step S113), the resolution selecting unit 14b12 selects a resolution from the resolutions other than the standard aspect ratio in accordance with the predetermined standard (step S114). The predetermined standard is the same as in step S103.

Next, the resolution determining unit 14b11 determines whether the currently displayed resolution and the selected resolution are different (step S115).

If the currently displayed resolution and the selected resolution are different (Yes in step S115), the image processing unit 14b13 expands or reduces image data internally generated with the standard aspect ratio to the selected resolution and adds the segment area (step S116).

Next, the resolution changing unit 14b15 changes the resolution of the display 120 to the selected resolution (step S117).

Next, the flag setting unit 14b14 sets the overlap flag to false (step S118).

If the currently displayed resolution and the selected resolution are the same (No in step S115), the process in steps S116-S118 is not performed. This is because it is not necessary to change the resolution.

On the other hand, if the resolutions other than the standard aspect ratio are not included (No in step S113), the resolution selecting unit 14b12 selects a resolution from the standard aspect ratio in accordance with the predetermined criteria (step S119). The predetermined criteria are the same as in step S103.

Next, the resolution determining unit 14b11 determines whether the currently displayed resolution and the selected resolution are different (step S120).

If the currently displayed resolution and the selected resolution are different (Yes in step S120), the image processing unit 14b13 expands or reduces image data internally generated with the standard aspect ratio to the selected resolution (step S121).

Next, the resolution changing unit 14b15 changes the resolution of the display 120 to the selected resolution (step S122).

Next, the flag setting unit 14b14 sets the overlap flag to true (step S123).

If the currently displayed resolution and the selected resolution are the same (No in step S120), the process in steps S121-S123 is not performed.

The above described process is repeated during the time the program is being launched. Thus, even when a reconnection is made to a different display 120 with a different resolution, the process in FIGS. 31A and 31B still continues. The repeated process which corresponds to a process of periodically monitoring change in a resolution of the display 120 can also be executed by introducing an event mechanism known in a Windows (registered trademark) program. In this case, it is registered at the time of launching the program such that an event notification is made when there is a change in resolution due to a connection made to the different display 120. Thereafter, every time the event occurs, the process from the step S111 in FIG. 31B may be executed in the image display control unit 14b. This event notification, which simply signals that the resolution has been changed, does not signal that a temporary storage of the resolution information is completed. Therefore, if a process from step S111 is executed immediately upon receiving the event notification despite the fact that the temporary storage has not been completed, it may not be processed correctly. In order to avoid this problem, it is arranged to cause the process to stand by for a certain time period before step S111. The same problem may occur immediately after starting the process, in which case a process is added such as to cause the process to standby for a certain time period before step S101. The stand by time may be added to ensure that correct resolution information is referred to.

Figure 33:
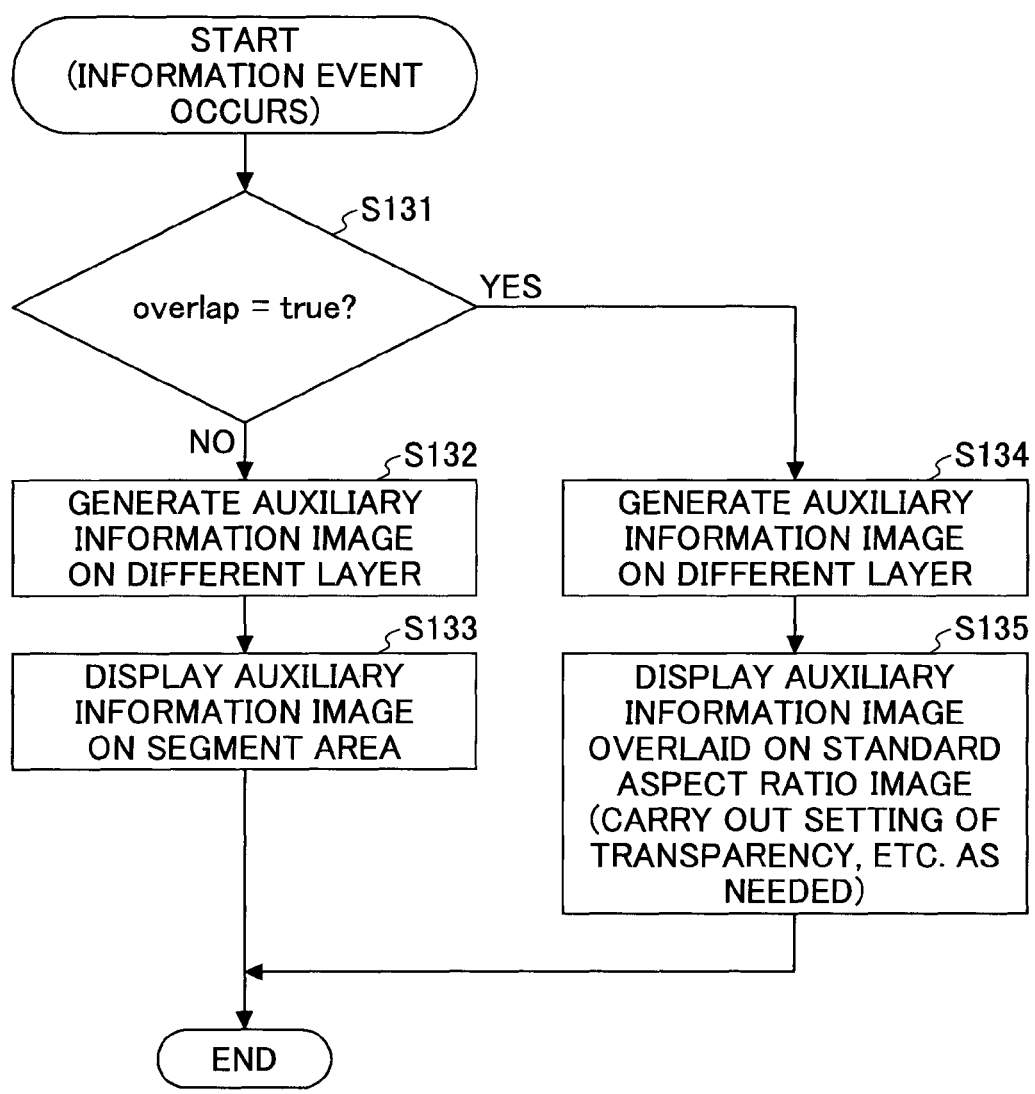
FIG. 33 is a flow diagram illustrating an exemplary process of auxiliary information displaying.

FIG. 33 is a flow diagram illustrating an exemplary process of auxiliary information displaying.

In FIG. 33, when an information event occurs which displays auxiliary information such as an operating menu and an error message, etc., so that a process is started, the auxiliary information image generating unit 14b21 of the image display control unit 14b determines whether the overlap flag is true (step S131).

If the overlap flag is false (No in step S131), the auxiliary information image generating unit 14b21 generates an auxiliary information image in a layer different from one for the image data (step S132).

Figure 34A:
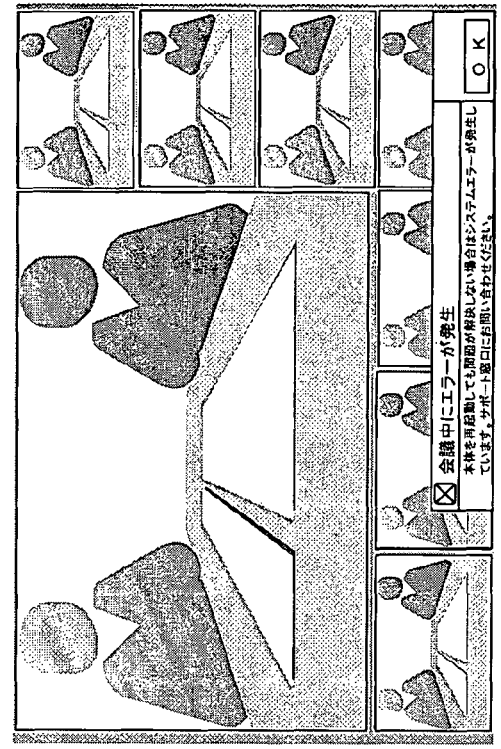
FIGS. 34A and 34B are exemplary screens of the auxiliary information displaying when a segmented area is added and when the segmented area is not added.
Figure 35B:
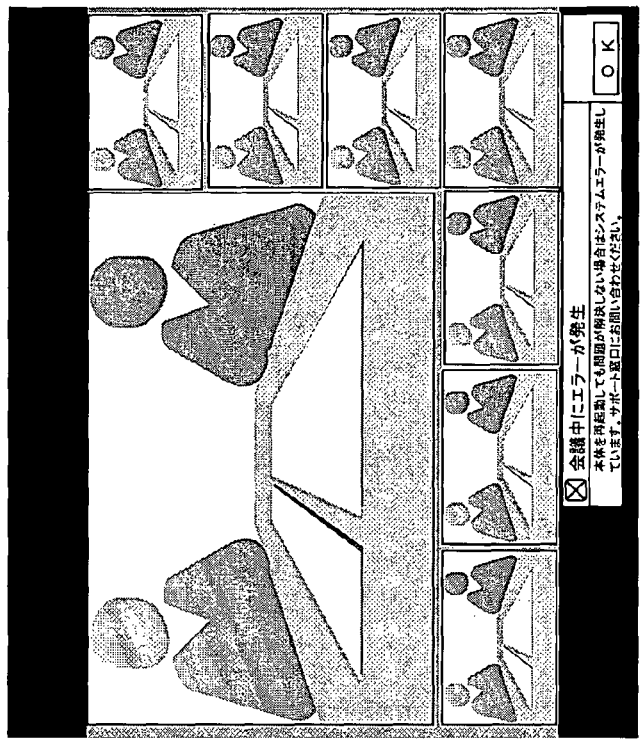
FIGS. 35A and 35B are exemplary screens when the segmented area is added to an upper end and when the segmented area is added to a lower end.
Figure 35A:
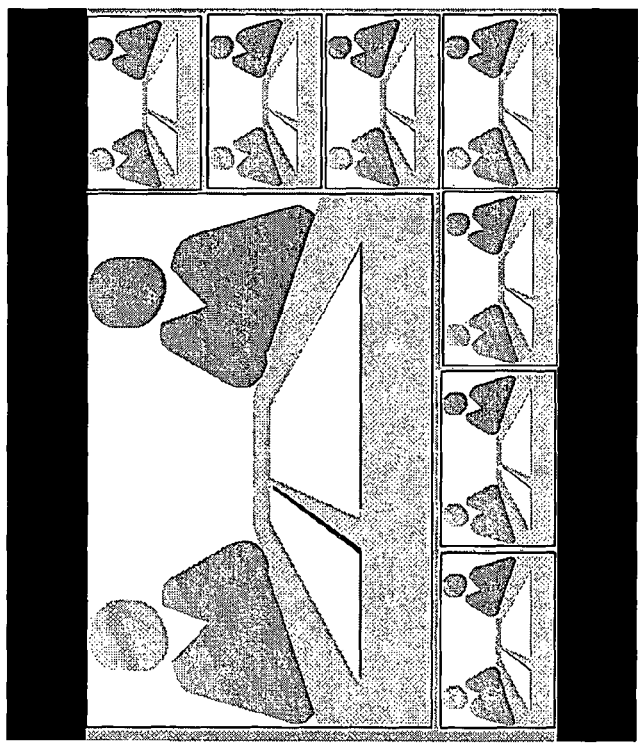

Next, in step S133, the auxiliary information image display unit 14b22 displays the generated auxiliary information image in a segment area already added in the resolution control process (steps S104 and S116 in FIGS. 31A and 31B). Then, the process is completed. FIG. 34A shows that auxiliary information (an error message and an operating button) is displayed in the segment area added at the lower end of the screen. When a user presses down an OK button which is displayed in a right-hand area with the error message being displayed, the operating input accepting unit 12 of the transmission terminal 10 accepts the press down input. Thereafter, the image display control unit 14b stops displaying the error massage to cause displaying of the display 120 to return to the state shown in FIG. 32A. FIG. 35B shows that auxiliary information (an error message and an operating button) is displayed on the lower end side within the segment area added at the upper and lower ends of the screen.

While the above exemplary screen shows error information as auxiliary information, it is not limited thereto, so that it may be applied to a case in which it is necessary to display information other than the image data. For example, if the user wishes to display an operating menu which requests the display 120 to complete in order for the user to complete a conference, when the operating input accepting unit 12 accepts pressing down of a cut-off button of the transmission terminal 10, the image display control unit 14b causes the operating menu to be displayed. In this case, what may be caused to be displayed at the screen is changed to "Completing conference?", "Completing conference if OK is selected", "Continuing conference if cancel is selected", etc., it may be arranged to add a cancel button in the right-hand area in addition to displaying of the OK button, and to accept a user selection from both buttons (not shown). In addition, information on participants of the conference and information of the transmission terminal managed by the transmission management system, etc., may be displayed as the auxiliary information.

Next, returning to FIG. 33, if the overlap flag is true (Yes in step S131), the auxiliary information image generating unit 14b21 generates an auxiliary information image in a layer different from one for the image data (step S134).

Figure 34B:
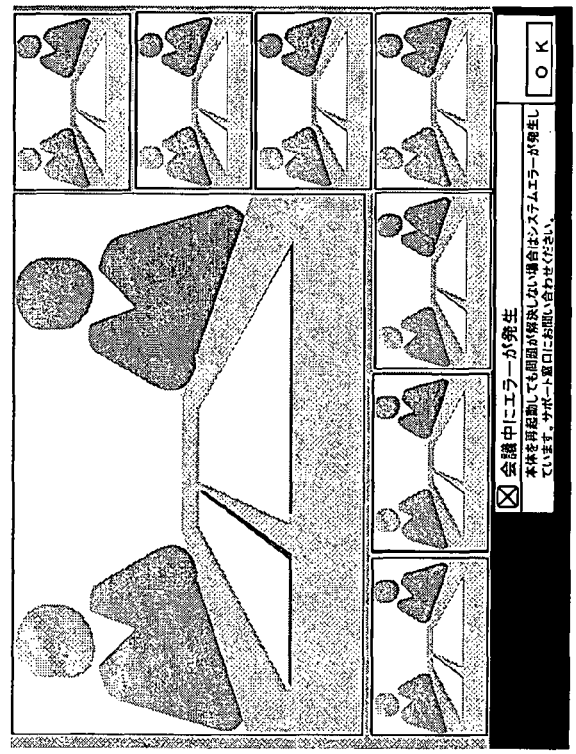

Next, the auxiliary information image display unit 14b22 displays the generated auxiliary information image such that it is overlapped onto a lower portion, for example, of the image portion of the standard aspect ratio (step S135). Here, displaying such that it is overlapped means that a pixel of the auxiliary information is displayed in lieu of a pixel of an image data that exist in the first place in the display range of the auxiliary information image. With a background portion of the auxiliary information being transparent or semi-transparent, a pixel of the original image data existing in the first place in the back thereof may be displayed as it is, or a pixel of a color mixed with a pixel of the image data existing in the first place may also be displayed. In practice, it may be realized by specifying the auxiliary information image and the display position with an image processing function provided by a computer OS (operating system) which makes up the transmission terminal 10, specifying that the auxiliary information image is displayed on a front-most face, and specifying the degree of transparency as needed. Then, after the auxiliary information image is displayed, the process is completed. FIG. 34B shows that the auxiliary information (the error message and the operating button) is displayed in a lower portion of a main image portion of the screen.

Such a process makes it possible to enhance the viewability of both the image data existing in the first place and the auxiliary information in accordance with the capability of the display 120 connected to the transmission terminal 10 and to effectively utilize the screen area. In other words, an appropriate resolution of resolutions displayable by the display 120 may be selected for displaying to enhance the viewability. Moreover, a method of displaying the auxiliary information may be changed in accordance with the aspect ratio to ensure the viewability of the auxiliary information. As already stated, a method of displaying auxiliary information includes a method of displaying it in a segment area added to the image data and a method of displaying it such that it overlaps the image data. The overlapping display generally causes implementation of layers to be complex, so that the process becomes slow. In the present embodiment, a resolution selection which allows displaying without overlapping is favored, so there is also an advantage that a resolution which leads to quick displaying may be favored without placing a burden on the user operation.

Next, FIGS. 36-38 show other embodiments of display control. While the previously described embodiment represents a process in accordance with an aspect ratio of the display 120, the present embodiment introduces a resolution management table, making it possible to finely set up display control for each resolution.

FIGS. 36 and 37 show exemplary resolution management tables for use in the present embodiment. The resolution management tables in FIGS. 36 and 37 have items of "item name", "resolution", "overlap (overlap flag)", and "segment value". The "item name" is a symbol which identifies data corresponding to one line (line data). The "resolution", which is a resolution specified with the line data, has values for width and height, respectively indicating the number of pixels for the width and for the height. The "overlap (overlap flag)" is a flag indicating whether the auxiliary information is to be overlapped on the image data existing in the first place, so that true is set if yes, while false is set if no. If no, the auxiliary information is displayed in an added segment area. The "segment value", which is information showing a position and a magnitude (size) of the segment, controls the segment area to be added if the overlap is false and has values for the width, the height, and the position. The width and the height respectively indicate the number of pixels for width and for the height, so that the segment area of such a magnitude is added to image data. Moreover, the position has values of lower, upper, and both, respectively indicating that a segment area defined by the width and height values is added to the lower portion of the screen, the upper portion of the screen, and both portions of the screen. When the overlap is true, the segment value is arranged to be NA (not available, or no data); when this value is held, the segment area is not added.

FIG. 36 is an example such that the higher resolution one is arranged at the upper portion (on a line closer to the head). FIG. 37 is an example such that what is not overlapped (a resolution such that the overlap is false) is arranged toward the upper portion. In FIG. 37, a resolution which does not overlap the image data is favored for display when displaying the auxiliary information, so that it is effective when trying to improve the display speed such as due to a design policy, or trying not to overlap the auxiliary information onto the image data even temporarily. Besides, it is also possible to cause displaying to be made with different criteria depending on the configuration of the resolution management table.

Figure 38A:
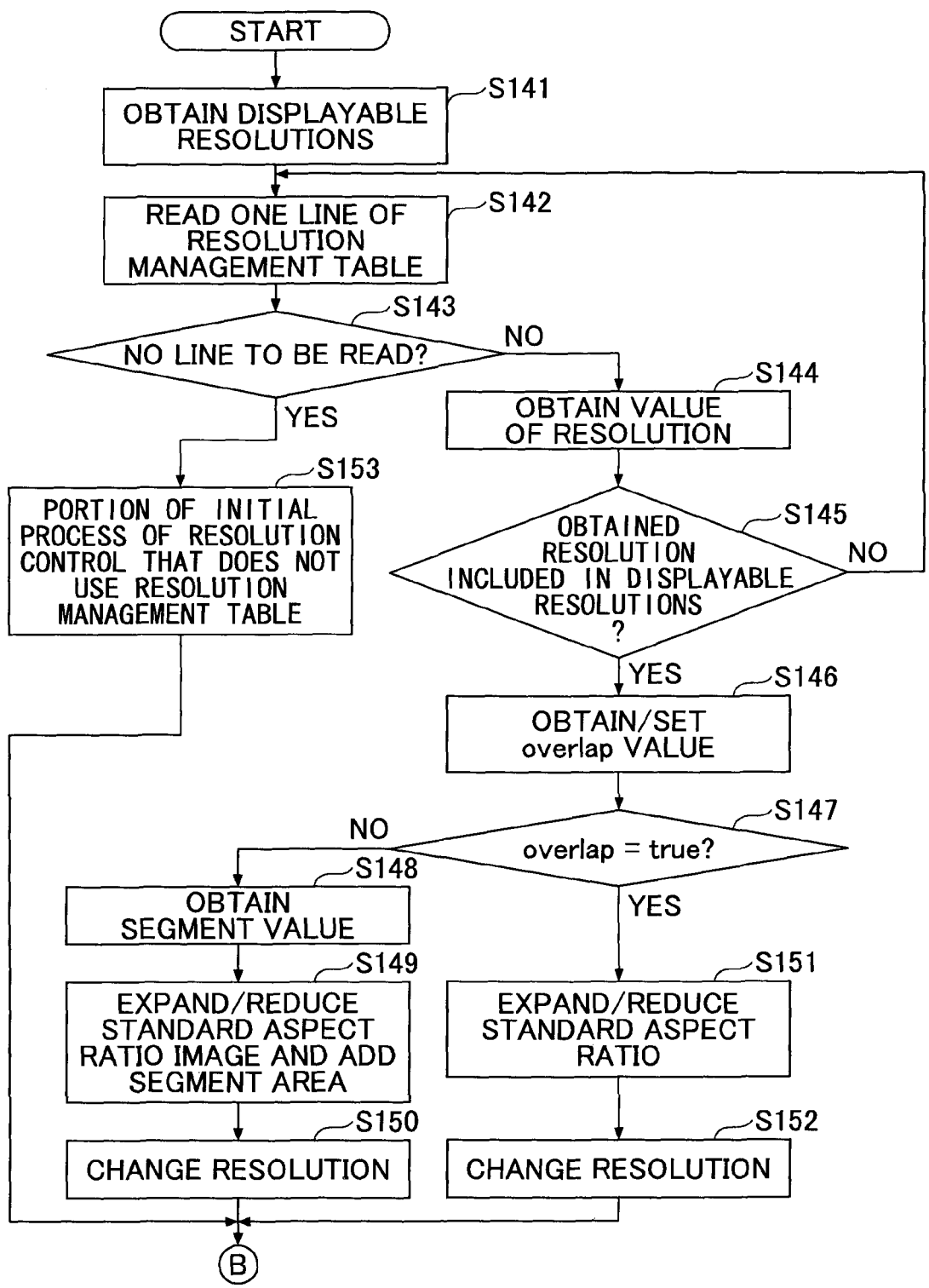
FIGS. 38A and 38B are flow diagrams illustrating another exemplary process of the resolution control.
Figure 38B:
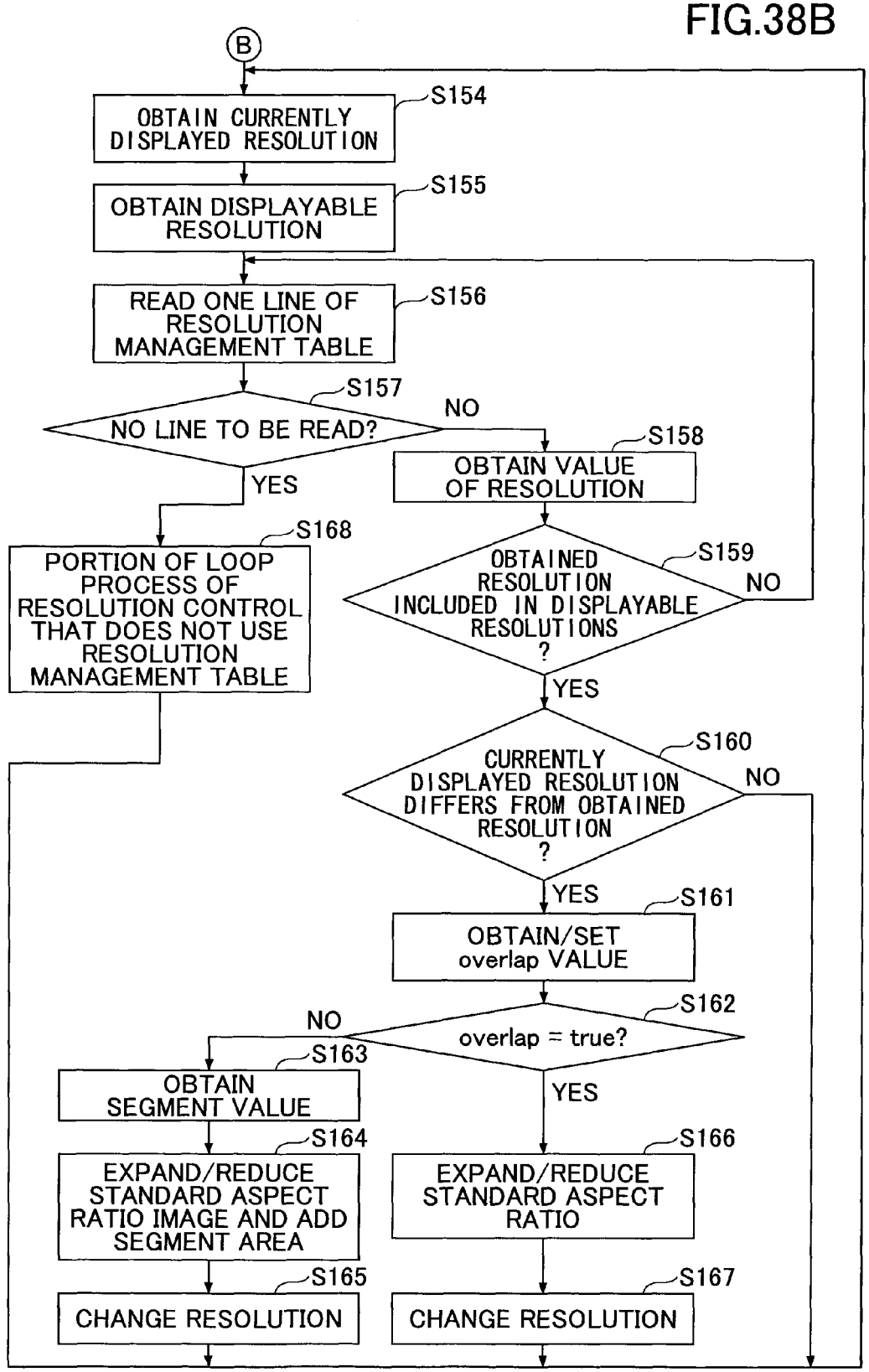

FIGS. 38A and 38B are flow diagrams showing an exemplary process of a control process in the present embodiment.

In FIG. 38A, when the process is started with a power ON of the transmission terminal 10, the resolution obtaining unit 14b10 of the image display control unit 14b accesses the display 120 to obtain displayable resolutions (step S141).

Next, the resolution management table reading unit 14b16 reads line data corresponding to one line of the resolution management table (step S142) and determines whether there is a line to be read (step S143).

If there is a line to be read (No in step S143), the resolution obtaining unit 14b10 obtains the resolution values (the width and height values) from the read line data (step S144).

Next, the resolution determining unit 14b11 determines whether the obtained resolution is included in displayable resolutions (step S145). If the obtained resolution is not included in the displayable resolutions (No in step S145), the process returns to reading data of the next line from the resolution management table (step S142).

If the obtained resolution is included in the displayable resolutions (Yes in step S145), the flag obtaining unit 14b17 obtains the value of the overlap flag from the read line data, and the flag setting unit 14b14 sets the obtained value to the overlap flag for managing (step S146).

Next, the flag determining unit 14b18 determines whether the obtained and set overlap flag is true (step S147).

If the overlap flag is false (No in step S147), the segment value obtaining unit 14b19 obtains the segment value from the read line data (step S148).

Next, the image processing unit 14b13 expands or reduces image data internally generated with the standard aspect ratio to the obtained resolution and adds a segment area based on the obtained segment value (step S149). In other words, the image is symmetrically expanded or reduced in line with the width of the resolution of the obtained image data. Then, a segment area specified with the width and the height of the obtained resolution is created and added at a location specified with a position to the expanded or reduced image data.

Next, the resolution changing unit 14b15 changes the resolution of the display 120 to the obtained resolution (step S150).

Moreover, if the overlap flag is true (Yes in step S147), the image processing unit 14b13 expands or reduces image data internally generated with the standard aspect ratio to the obtained resolution (step S151).

Next, the resolution changing unit 14b15 changes the resolution of the display 120 to the obtained resolution (step S152).

Moreover, if there is no line to be read (Yes in step S143), a part of the initial process of resolution control which does not use the resolution management table, or the process similar to steps S102-S110 in FIG. 31A is performed (step S153).

The foregoing shows an initial process at the time of a power ON of the transmission terminal 10. Thereafter is shown a loop process for responding when the display 120 is replaced after the power ON.

The resolution obtaining unit 14b10 accesses the display 120 to obtain the currently displayed resolution (step S154).

Next, the resolution obtaining unit 14b10 accesses the display 120 to obtain the displayable resolutions. (step S155).

Next, the resolution management table reading unit 14b16 reads line data corresponding to one line of the resolution management table (step S156) and determines whether there is a line to be read (step S157).

If there is a line to be read (No in step S157), the resolution obtaining unit 14b10 obtains the resolution values from the read line data (step S158).

Next, the resolution determining unit 14b11 determines whether the obtained resolution is included in displayable resolutions (step S159). If the obtained resolution is not included in the displayable resolutions (No in step S159), the process returns to reading data of the next line from the resolution management table (step S156).

If the obtained resolution is included in the displayable resolutions (Yes in step S159), the resolution determining unit 14b11 determines whether the currently displayed resolution and the obtained resolution differ (step S160).

If the currently displayed resolution and the obtained resolution differ (Yes in step S160), the flag obtaining unit 14b17 obtains the value of the overlap flag from the read line data, and the flag setting unit 14b14 sets the obtained value in the overlap flag for managing (step S161).

Next, the flag determining unit 14b18 determines whether the obtained and set overlap flag is true (step S162).

If the overlap flag is false (No in step S162), the segment value obtaining unit 14b19 obtains the segment value from the read line data (step S163).

Next, the image processing unit 14b13 expands or reduces image data internally generated with the standard aspect ratio to the obtained resolution and adds a segment area based on the obtained segment value (step S164).

Next, the resolution changing unit 14b15 changes the resolution of the display 120 to the obtained resolution (step S165).

Moreover, if the overlap flag is true (Yes in step S162), the image processing unit 14b13 expands or reduces image data internally generated with the standard aspect ratio to the obtained resolution (step S166).

Next, the resolution changing unit 14b15 changes the resolution of the display 120 to the obtained resolution (step S167).

Moreover, if the currently displayed resolution and the obtained resolution are the same (No in step S160), the process in steps S161-S167 is not performed.

Moreover, if there is no line to be read (Yes in step S157), a part of the loop process of resolution control which does not use the resolution management table, or the process similar to steps S113-S123 in FIG. 31B is performed (step S168).

The above described process is repeated during the time the program is being launched in a manner similar to the previously-described embodiment. Thus, even when a reconnection is made to a different display 120 with a different resolution, the process in FIGS. 38A and 38B still continues. As described previously, this may also be realized with an event mechanism.

The process of displaying the auxiliary information is similar to what is shown in FIG. 33.

The present embodiment makes it possible to change the display format standard by rewriting the resolution management table, so there is an advantage of better maintainability relative to a case of changing a program. In other words, even when a need arises in the future to change display control, it suffices to add, delete, or change items of the resolution management table, making it possible to easily manage display control relative to changing the program directly. This is advantageous in being able to control the resolution of a new display with an easy method when a display having an even higher resolution with good viewability appears in the future.

Next, FIGS. 39-41 show further embodiments of display control. In the above-described embodiment, no distinction is made as to whether the display 120 connected to the transmission terminal 10 is analog or digital. However, when the display 120 of a digital scheme is connected, a user almost always uses a digital input and an aspect ratio for the digital scheme is actually the same as the standard aspect ratio of the transmission terminal 10. With the digital scheme becoming the main stream in the future, the transmission terminal 10 is designed such that the standard aspect ratio thereof is matched to 16:9, which is the aspect ratio of the digital television. Therefore, if the connected display 120 recognizes that it is a digital input, resolution control is simplified, making it possible to increase the processing speed.

FIG. 39 is a diagram illustrating an exemplary configuration of an image display control unit. Herein, a hardware identification information obtaining and determining unit 14b101 and a digital input obtaining and determining unit 14b102 are newly added to the feature of the resolution control unit 14b1 of the image display control unit 14b shown in FIG. 29. The hardware identification information obtaining and determining unit 14b101 obtains hardware identification information of the transmission terminal 10 and determines whether the value is "TV", which indicates that it is a digital television enabled. The digital input obtaining and determining unit 14b102 obtains information indicating whether it is a digital input state from the display 120 connected and determines whether it is in the digital input state.

FIG. 40 is a diagram illustrating exemplary data used in an exemplary process of resolution control. Items such "a digital input (digital)", "recommended resolution", "hardware identification information", etc., are newly added to items shown in FIG. 30. "The digital input (digital)" is information indicating whether the present image input signal obtained from the display 120 is a digital input. The "recommended resolution" is a recommended resolution obtained from the display 120. The recommended resolution is a resolution displayable without expansion or reduction (dot by dot) that corresponds to the number of displayed pixels at the time of a full screen. For the "hardware identification information", which is information identifying hardware set in advance to the transmission terminal 10 at the time of shipping, "TV" is set when it is digital television enabled, and "D1" is selected for analog television.

Figure 41A:
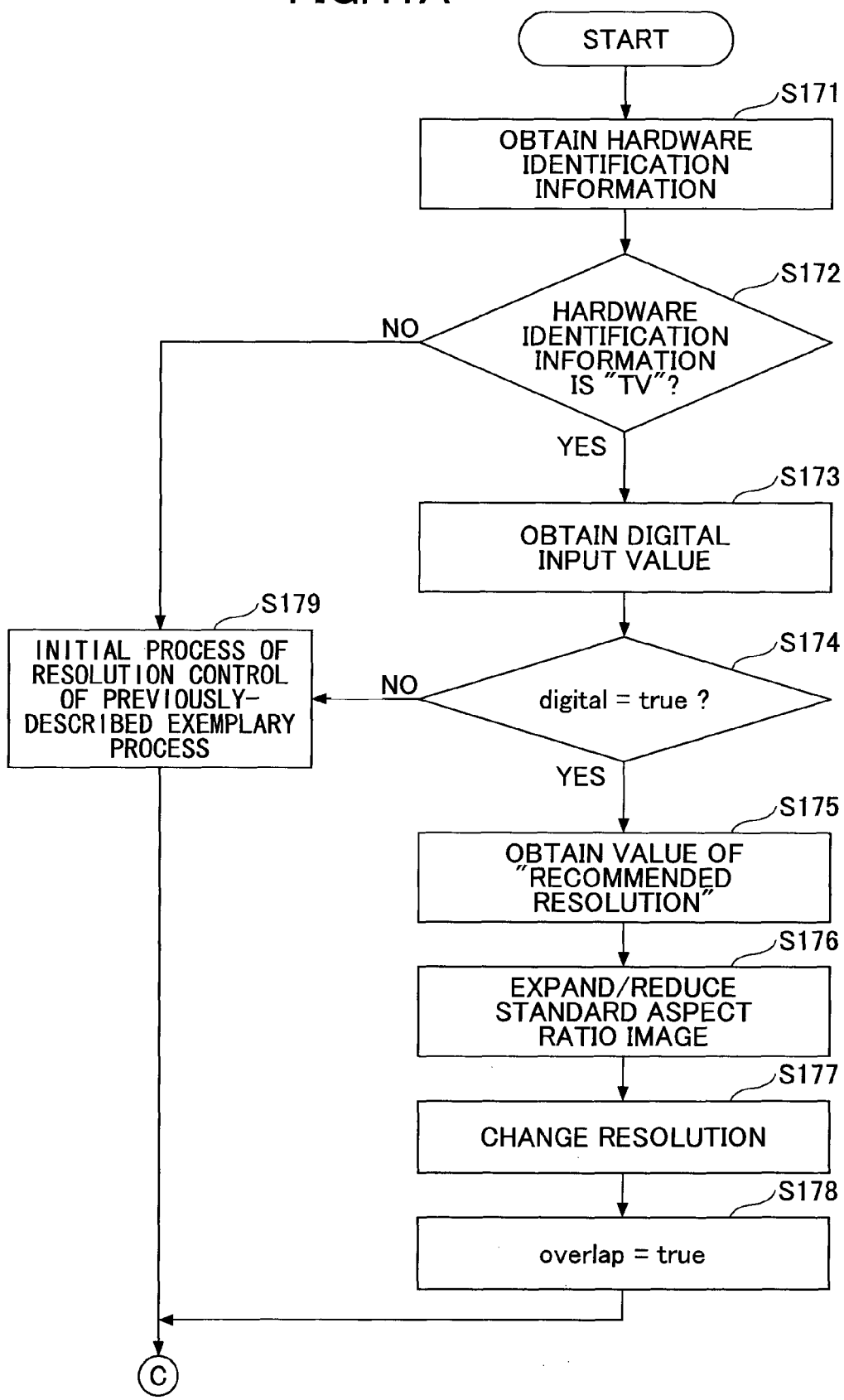
FIGS. 41A and 41B are flow diagrams illustrating a further exemplary process of the resolution control.
Figure 41B:
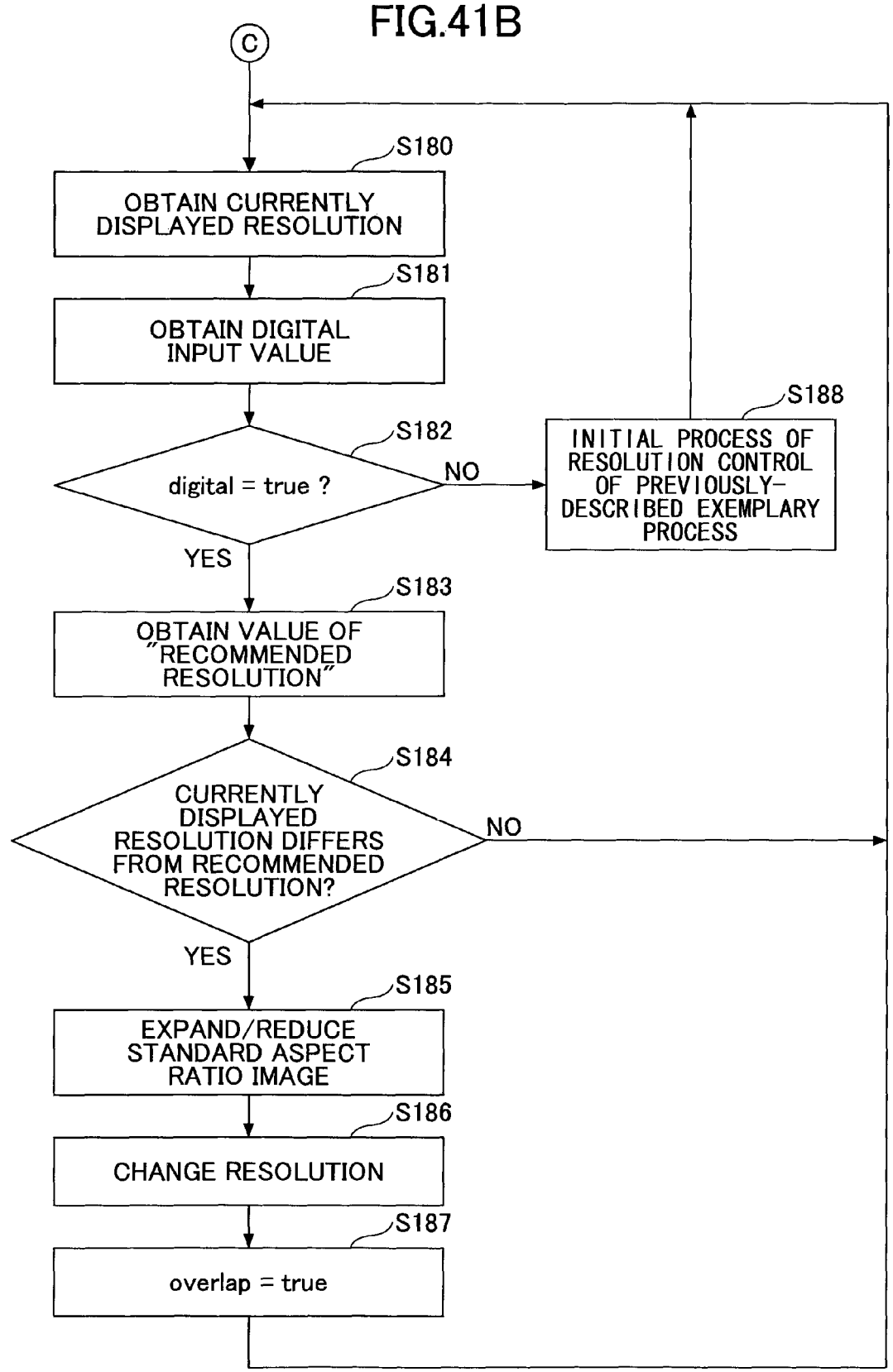

FIGS. 41A and 41B are flow diagrams which show an exemplary process of resolution control by the image display control unit 14b of the transmission terminal 10.

In FIG. 41A, when the process starts with a power ON of the transmission terminal 10, the hardware identification information obtaining and determining unit 14b101 of the image display control unit 14b obtains hardware identification information of the own transmission terminal 10 (step S171) and determines whether the hardware identification information is "TV" (step S172).

If the hardware identification information is "TV" (Yes in step S172), the digital input obtaining and determining unit 14b102 accesses the display 120 to obtain the digital input value (digital) (step S173), and determines whether it is "true".

If the digital input (digital) is "true" (Yes in step S174), the resolution obtaining unit 14b10 accesses the displays 120 to obtain the recommended resolution.

Next, the image processing unit 14b13 expands or reduces image data internally generated with the standard aspect ratio to the recommended resolution obtained (step S175). This case represents an expansion or reduction with the aspect ratio being the same, so that no blank area occurs in either direction of width and height of the image data, so that the segment area is not added.

Next, the resolution of the display 120 is changed to the recommended resolution obtained (step S177).

Next, the flag setting unit 14b14 sets the overlap flag to true (step S178).

Moreover, if the hardware identification information is not "TV" (No in step S172) or the digital input (digital) is not "true" (No in step S174), an initial process of resolution control of the above-described process example, or a process similar to steps S101-S110 in FIG. 31A or steps S141-S152 in FIG. 38A is conducted (step S179).

The foregoing shows an initial process at the time of a power ON of the transmission terminal 10. Thereafter is shown a loop process for responding when the display 120 is replaced after the power ON.

The resolution obtaining unit 14b10 accesses the display 120 to obtain the currently displayed resolution (step S180).

Next, the digital input obtaining and determining unit 14b102 accesses the display 120 to obtain the digital input value (digital) (step S181), and determines whether it is "true" (step S182).

If the digital input (digital) is "true" (Yes in step S182), the resolution obtaining unit 14b10 accesses the display 120 to obtain the recommended resolution (step S183), and the resolution determining unit 14b11 determines whether the currently displayed resolution is different from the recommended resolution (step S184).

If the currently displayed resolution and the recommended resolution obtained are different (Yes in step S184), the image processing unit 14b13 expands or reduces the image data internally generated with the standard aspect ratio to the recommended resolution obtained (step S185).

Next, the resolution changing unit 14b15 changes the resolution of the display 120 to the recommended resolution obtained (step S186).

Next, the flag setting unit 14b14 sets the overlap flag to true (step S187).

If the currently displayed resolution and the recommended resolution obtained are the same (No in step S184), the process in steps S185-S187 is not performed.

Moreover, if the digital input (digital) is not "true" (No in step S182), a part of a loop process of the resolution control of the previously-described exemplary process, or a process similar to steps S112-S123 in FIG. 31B or steps S155-S167 in FIG. 38B is performed (step S188).

The above described process is repeated during the time the program is being launched in a manner similar to the previously-described embodiment. Thus, even when a reconnection is made to a different display 120 with a different resolution, the process in FIGS. 41A and 41B still continues. As described previously, this may also be realized with an event mechanism.

The process of displaying the auxiliary information is similar to what is shown in FIG. 33.

On the assumption that the aspect ratio of the display 120 is the same as the standard aspect ratio if the connected display 120 is in a digital input state, the embodiment makes it possible to set a resolution immediately, making it possible to increase the speed of the resolution control process.

Major Advantageous Effects of the Embodiments

As described above, according to the present embodiments, the storage unit 1000 of the transmission terminal 10aa storing the relay apparatus ID of the relay apparatus 30 which relays image data and voice data makes it possible to transmit display data of documents data stored in the storage unit 4000 of the external input apparatus 40 that is not managed by the transmission control system 50 to the transmission terminal 10db to be a counterpart of the conferencing. In this way, the transmission management system 50 also does not have to perform the process of authenticating the external input apparatus 40, making it possible to reduce the management burden.

Moreover, when it is desired to share a screen displayed in the external input apparatus 40, which does not include a display table obtaining unit 451 and a display data transmitting unit 452, upon connecting to the transmission terminal 40, the display data obtaining unit 451 and the display data transmitting data 452 are included, so that the screen may be shared.

Even if the environment of LAN 2a-2d such as an IP address of the relay apparatus 30 of the communications network 2 may be obtained, it is difficult to obtain the environment of the Internet 2i, so that at least two of multiple relay apparatuses 30 which relay the image data and the voice data are narrowed down from information on the environment which may be obtained. Then, advance transmission information in lieu of the image data and the voice data are transmitted and received before actually transmitting and receiving the image data and the voice data between multiple transmission terminals 10, resulting in an advantageous effect that it is possible to narrow down to one relay apparatus 30 which may actually relay the advance transmission information most quickly.

In other words, relay apparatuses 30 to which are assigned at least two uppermost IP addresses close to any of the IP addresses of the transmission terminal 10 are selected to retain at least two candidates for the relay apparatuses 30 to be used eventually. Thereafter, in this way, the advance transmission information may actually be transmitted and received between the request-originating terminal 10A and the destination terminal 10B via the respective relay apparatuses 30 as the candidates to narrow down to the relay apparatus 30 which relayed the advance transmission information for which time required for transmission and reception is shortest. Thus, this results in the advantageous effect that transmission and reception of high quality image data or voice data may be realized as much as possible under the current communications network 2 environment.

Moreover, in the present embodiment, when narrowing down the relay apparatuses 30, not only a relay apparatus 30 with an IP address close to an IP address of the transmission terminal 10 which conducts teleconferencing may be preferentially selected, but at least two relay apparatuses 30 are selected, also taking into account the maximum data transmission speed in the respective relay apparatuses 30. This leads to an advantageous effect that the candidates for the relay apparatuses 30 may be narrowed down in line with the real communications network environment 2.

Furthermore, in the present embodiment, when the relay apparatuses 30 are narrowed down, they are narrowed down from the relay apparatuses with the operating state of ON line, making it possible to narrow down the candidates of the relay apparatus 30 further in line with the real network 2 environment.

Moreover, in the present embodiment, image data and auxiliary information may be appropriately displayed depending on capabilities of a display connected to a transmission terminal to increase viewability of information necessary for conferencing, etc., to ensure displaying of the information. Moreover, this makes it possible to effectively utilize the screen area.

Supplements to Embodiments

The process of obtaining display data may be one using a mirror driver. The mirror driver makes it possible to transmit generated display data directly to a USB driver without causing them to go through a program. In this case, the mirror driver generates display data and the USB driver transmits the generated display data to the transmission terminal 10 via the external apparatus I/F 118. In this case, the program does not have to obtain the display data, making it possible to reduce resources for executing the program.

Moreover, in the above-described embodiment, while an example is described of the program obtaining and transmitting to the transmission terminal 10 the generated image data by the display driver, the program may obtain a drawing command generated by a GDI for transmitting to the transmission terminal 10aa. The drawing command has a smaller size relative to the image data, making it possible to reduce a network burden. Furthermore, the display data obtaining unit 451 may obtain only display data displayed on a predetermined screen out of multiple screens on a virtual display for transmitting by the display data transmitting unit 452. In this way, the image data displayed on a screen other than a predetermined screen is not shared with the conferencing counterpart, making it possible to enhance security (e.g., ensuring that highly confidential documents are not revealed).

Moreover, the transmission management system 50, the program provision system 90, and the maintenance system 100 in the above-described respective embodiments may be constructed by a single computer, or may be constructed by multiple computers arbitrarily allocated with the respective units (functions or means) being divided. Moreover, when the program provision system 90 is constructed by a single computer, the program transmitted by the program provision system 90 may be transmitted such that they are divided into multiple modules or they may be transmitted without dividing thereinto. Furthermore, when the program provision system 90 is constructed by multiple computers, it may be transmitted from the respective computers such that it is divided into multiple modules.

Moreover, a recording medium having stored thereon the program for the transmission terminal, the program for the relay apparatus, and the program for transmission management; the HD 204 having stored thereon these programs; and the program provision system 90 including this HD 204 according to the present embodiments are all used as program products when the above-described program for the transmission terminal, the program for the relay apparatus, and the program for transmission management are provided to a user, etc., within or outside the country.

Furthermore, while, in the above-described embodiments, management is performed with attention being paid to a resolution of an image of image data as an example of quality of the image of the image data relayed by the relay apparatus 30 using the change quality management table shown in FIG. 7 and the quality management table shown in FIG. 15, it is not limited thereto, so that management may be performed with attention being paid to the depth of image quality of the image data; sampling frequency in a voice of the voice data; a bit length in the voice of the voice data, etc., as other examples of quality.

Moreover, while the received date/time is managed in FIGS. 8, 10, and 12, it is not limited thereto, so that at least the received time out of the received date/time may be managed.

Furthermore, in the above-described embodiments, the IP address of the relay apparatus is managed in FIG. 8 and the IP address of the transmission terminal is managed in FIG. 10, but it is not limited thereto, so that respective FQDNs (fully qualified domain names) may be managed for a relay apparatus specifying information for specifying the relay apparatus 30 on the communications network 2 or terminal specifying information for specifying the transmission terminal 10 on the communications network 2. In this case, an IP address corresponding to the FQDN is obtained by a well-known DNS (domain name system) server. The "relay apparatus specifying information for specifying the relay apparatus 30 on the communications network 2" may also be expressed as "relay apparatus connecting destination information indicating a destination connecting to the relay apparatus 30 on the communications network 2" or "relay apparatus destination information indicating a destination to the relay apparatus 30 on the communications network 2". Similarly, the "terminal specifying information for specifying the transmission terminal 10 on the communications network 2" may also be expressed as "terminal connecting destination information indicating a destination connecting to the relay apparatus 10 on the communications network 2" or "terminal destination information indicating a destination to the relay apparatus 10 on the communications network 2".

Moreover, while a case of the teleconferencing system is described as an example of the transmission system 1, it is not limited thereto, so that it may be a telephone system such as an IP (Internet protocol) telephone, an Internet telephone, etc. Furthermore, the transmission system 1 may be a car navigation system. In this case, one of the transmission terminals 30 corresponds to a car navigation apparatus installed in an automobile, and the other of the transmission terminals 30 correspond to a management server or a management terminal of a management center which manages car navigation, or a car navigation apparatus installed in a different automobile.

Moreover, in a process of obtaining display data, only a portion displayed on an area (a window) within a screen, not the whole screen may be obtained as described below. FIG. 26 shows an example of a screen which is caused to be displayed by the external input apparatus 40aa. In this example, an area (a window) (a) and an area (b) are displayed on the screen. Of these, an area desired to be shared with the transmission terminal 10db is indicated by operating a pointer shown with (c) in FIG. 27 with the mouse 212. Here, display data related to the indicated area (a) is obtained by the display data obtaining unit 451.

Furthermore, the external input apparatus may include in advance the display data obtaining unit 451 and the display data transmitting unit 452 for use by the external input apparatus that are stored in the storage unit 1000 of the transmission terminal 10. This makes it possible to eliminate the process of transmitting and receiving the display data obtaining unit 451 and the display data transmitting unit 452 and reduce the burden on the transmission terminal 10 and the external input apparatus 40.

Moreover, while a case of displaying data on the display apparatus 400 is described for the external input apparatus 40, the display apparatus 400 may be a different apparatus from the external input apparatus 40, or the external input apparatus 40 may be provided with the display apparatus 400.

Furthermore, it may be arranged for the installation determining unit 43 to determine whether the display data obtaining unit 451 and the display data transmitting unit 452 have already been installed in the process in the above-described step S71. In this case, in step S71, if it is determined that the display data transmitting unit 452 has not been installed, the program obtaining unit 44 obtains and installs the display data obtaining unit 451 and the data transmitting unit 452 stored in the transmission terminal 10aa (step S73).

Moreover, the external input apparatus 40aa may include the display data obtaining unit 451 in advance, so that the process by the installation determining unit 43 is not provided. It may also been arranged to write display data obtained by the display data obtaining unit 451 into the storage unit 1000 of the mounted transmission terminal 10aa, so as to not provide the display data transmitting unit 452.

The present invention has been described in the foregoing according to preferred embodiments of the present invention. While specific examples have been shown to describe the present invention, it is evident that various modifications and changes may be applied thereto without departing from broader spirits and scope of the present invention as defined in the claims. In other words, the present invention should not be construed to be limited by the details of the specific examples and the attached drawings.

The present application is based on and claims the benefit of priority of Japanese Patent Application No. 2011-100696 filed on Apr. 28, 2011 and Japanese Patent Application No. 2011-238948 filed on Oct. 31, 2011.

The invention claimed is:

1. A transmission terminal which is connected to a display apparatus for outputting image data for displaying on the display apparatus, comprising:
   circuitry configured to
      obtain one or more resolutions displayable by the display apparatus;
      determine whether the obtained resolutions displayable include a second resolution other than a first resolution having a first aspect ratio of the image data to be transmitted;
      select the second resolution from among the resolutions displayable if the circuitry determines that the second resolution is included, and select the first resolution from among the resolutions displayable if the circuitry determines that the second resolution is not included;
      generate the image data appended with a segment area to have an aspect ratio of the second resolution, by adding the segment area to the image data generated by expanding or reducing the image data based on the first aspect ratio and the aspect ratio of the second resolution, after the second resolution is selected; and
      change the resolution of the display apparatus to the selected resolution.

2. The transmission terminal as claimed in claim 1, wherein the circuitry
   generates one or more rectangular data sets with the first resolution matching a width thereof; and
   adds the rectangular data set in a height direction of the image data, and wherein
   a height of the rectangular data set is such that the height after adding to the image data matches a height of the first resolution.

3. The transmission terminal as claimed in claim 1, wherein the circuitry selects a highest resolution from resolutions selectable.

4. The transmission terminal as claimed in claim 1, wherein when displaying auxiliary information on the display apparatus, the circuitry controls display of the auxiliary information on the segment area when the second resolution is selected and controls display of the auxiliary information on an arbitrary area of the image data such that it overlaps the arbitrary area when the first resolution is selected.

5. A transmission system, comprising:
   the transmission terminal as claimed in claim 1, wherein multiple of the transmission terminals are mutually connected via a network, and wherein
   one of the transmission terminals combines an individual image data set from another of the transmission terminals into the image data.

6. A transmission terminal which is connected to a display apparatus for outputting image data for displaying on the display apparatus, comprising:
   circuitry configured to
      obtain one or more resolutions displayable by the display apparatus;
      successively read, from a resolution management table which includes one or more data lines, the one data line, which data line includes at least a resolution and an overlap flag as elements;

obtain the resolution from the read data line;

determine whether the obtained resolutions displayable include the resolution obtained from the read data line;

obtain the overlap flag from the read data line if the circuitry determines that the resolution obtained from the read data line is included;

perform a process of generating image data appended with a segment area to have an aspect ratio of the resolution obtained from the read data line when the obtained overlap flag is false; and change the resolution of the display apparatus to the resolution obtained from the read data line.

7. The transmission terminal as claimed in claim 6, wherein for all of the data lines read by the circuitry, when the circuitry determines that the resolution obtained from the read data line is not included, the the circuitry determines whether the obtained resolutions displayable include a resolution other than the standard aspect ratio used in transmitting the image data;

the circuitry selects a first resolution other than the standard aspect ratio of the resolutions displayable if the circuitry determines that the resolution other than the standard aspect ratio is included and selects a second resolution of the standard aspect ratio of the resolutions displayable if the circuitry determines that the resolution other than the standard aspect ratio is not included; and the circuitry performs a process of adding a segment area to the image data output by the display apparatus after the first resolution is selected; and the circuitry changes a resolution of the display apparatus to the selected resolution.

8. The transmission terminal as claimed in claim 6, wherein the resolution management table includes elements which specify a size of rectangular data which forms the segment area and a position at which the rectangular data is added to the image data; and wherein the circuitry obtains the size and the position of the rectangular data, generates one or more rectangular data sets specified with the size, and adds the rectangular data set to a position of the image data that is specified with the obtained position.

9. The transmission terminal as claimed in claim 6, wherein when displaying auxiliary information on the display apparatus, the circuitry controls display of the auxiliary information on the segment area when the overlap flag is false and controls display of the auxiliary information on an arbitrary area of the image data such that it overlaps the arbitrary area when the overlap flag is true.

10. The transmission terminal as claimed in claim 1 wherein the circuitry determines whether the display apparatus is in a digital input state, wherein, if it is determined that the display apparatus is in the digital input state, the circuitry obtains a recommended resolution from the display apparatus, and the circuitry changes the resolution of the display apparatus to the recommended resolution obtained from the display apparatus.

11. A method of controlling a transmission terminal which is connected to a display apparatus and which outputs image data for displaying on the display apparatus, comprising:

obtaining, by circuitry of the transmission terminal, one or more resolutions displayable by the display apparatus;

determining, by the circuitry, whether the obtained resolutions displayable include a second resolution other than a first resolution having a first aspect ratio of the image data to be transmitted;

selecting, by the circuitry, the second resolution from among the resolutions displayable if the circuitry determines that the second resolution is included, and select the first resolution from among the resolutions displayable if the circuitry determines that the second resolution is not included;

generating, by the circuitry, the image data appended with a segment area to have an aspect ratio of the second resolution, by adding the segment area to the image data generated by expanding or reducing the image data based on the first aspect ratio and the aspect ratio of the second resolution, after the second resolution is selected; and changing, by the circuitry, the resolution of the display apparatus to the selected resolution.

12. A method of controlling a transmission terminal which is connected to a display apparatus for outputting image data for displaying on the display apparatus, comprising:

obtaining, by circuitry of the transmission terminal, one or more resolutions displayable by the display apparatus;

successively reading, by the circuitry, from a resolution management table which includes one or more data lines, the one data line, which data line includes at least a resolution and an overlap flag as elements;

obtaining, by the circuitry, the resolution from the read data line;

determining, by the circuitry, whether the obtained resolutions displayable include the resolution obtained from the read data line;

obtaining, by the circuitry, the overlap flag from the read data line if the circuitry determines that the resolution obtained from the read data line is included;

performing, by the circuitry, a process of generating image data appended with a segment area to have an aspect ratio of the resolution obtained from the read data line when the obtained overlap flag is false; and changing, by the circuitry, the resolution of the display apparatus to the resolution obtained from the read data line.

* * * * *